US012119974B2

(12) United States Patent
Taherzadeh Boroujeni et al.

(10) Patent No.: US 12,119,974 B2
(45) Date of Patent: Oct. 15, 2024

(54) TECHNIQUES FOR DETERMINING PHASE TRACKING REFERENCE SIGNAL DENSITY

(71) Applicant: QUALCOMM Incorporated, San Diego, CA (US)

(72) Inventors: Mahmoud Taherzadeh Boroujeni, San Diego, CA (US); Tao Luo, San Diego, CA (US); Gokul Sridharan, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 439 days.

(21) Appl. No.: 17/554,946

(22) Filed: Dec. 17, 2021

(65) Prior Publication Data
US 2022/0321389 A1    Oct. 6, 2022

Related U.S. Application Data

(60) Provisional application No. 63/170,227, filed on Apr. 2, 2021, provisional application No. 63/169,736, filed on Apr. 1, 2021.

(51) Int. Cl.
*H04L 27/26*    (2006.01)
*H04L 5/00*    (2006.01)
*H04L 25/02*    (2006.01)
*H04L 1/00*    (2006.01)

(52) U.S. Cl.
CPC ........ *H04L 27/2613* (2013.01); *H04L 5/0048* (2013.01); *H04L 5/0094* (2013.01); *H04L 25/0224* (2013.01); *H04L 27/26025* (2021.01); *H04L 1/0003* (2013.01)

(58) Field of Classification Search
CPC .......... H04L 27/2613; H04L 27/26025; H04L 5/0048; H04L 5/0094; H04L 25/0224; H04L 1/0003
See application file for complete search history.

(56) References Cited

U.S. PATENT DOCUMENTS

2020/0007369 A1 *  1/2020  Ciochina-Duchesne ...................
                                        H04L 27/2607
2024/0163011 A1 *  5/2024  Hasegawa ............. H04L 1/0071

* cited by examiner

*Primary Examiner* — Wayne H Cai
(74) *Attorney, Agent, or Firm* — Holland & Hart LLP

(57) ABSTRACT

Methods, systems, and devices for wireless communications are described. A user equipment (UE) may receive control signaling indicating a first set of thresholds corresponding to a first set of reference signal densities and a second set of thresholds corresponding to a second set of reference signal densities. The first set of thresholds may be associated with enabled uplink demodulation reference signal (DMRS) bundling, and the second set of thresholds may be associated with disabled uplink DMRS bundling. The UE may select a reference signal density from the first set or the second set based on a DMRS bundling status and map reference signaling (e.g., a DMRS, a phase tracking reference signal (PTRS), or both) to a set of resources based on the reference signal density. Uplink channel repetitions may occur in disjoint symbols and in such cases, DMRS bundling may be activated when PTRSs between repetitions meet a threshold.

30 Claims, 30 Drawing Sheets

TECHNIQUES FOR DETERMINING PHASE TRACKING REFERENCE SIGNAL DENSITY

CROSS REFERENCE

The present Application for Patent claims the benefit of U.S. Provisional Patent Application No. 63/169,736 by Boroujeni et al., entitled "TECHNIQUES FOR DETERMINING PHASE TRACKING REFERENCE SIGNAL DENSITY," filed Apr. 1, 2021, and U.S. Provisional Patent Application No. 63/170,227 by Boroujeni et al., entitled "TECHNIQUES FOR DEMODULATION REFERENCE SIGNAL BUNDLING IN WIRLESS COMMUNICATIONS SYSTEMS," filed Apr. 2, 2021, assigned to the assignee hereof, and expressly incorporated by reference herein.

FIELD OF TECHNOLOGY

The following relates to wireless communications, including techniques for determining phase tracking reference signal (PTRS) density and for demodulation reference signal (DMRS) bundling in wireless communications systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a first device (e.g., base station, UE) may transmit one or more reference signals and a second device (e.g., base station, UE) may be configured to receive the one or more reference signals to estimate a channel or one or more characteristics of a channel between the first device and the second device. The first device and the second device may use the channel estimation or the one or more channel characteristics to increase reliability of communications (e.g., data transmissions, control information transmissions) between the first device and the second device. In some cases, the first device or the second device may support joint channel estimation (e.g., demodulation reference signal (DMRS) bundling). Methods for performing joint channel estimation may be improved.

SUMMARY

The described techniques relate to improved methods, systems, devices, and apparatuses that support techniques for determining phase tracking reference signal (PTRS) density. Generally, the described techniques provide for improved phase continuity maintenance by improving techniques for configuring PTRS transmissions. In some wireless communications systems, wireless devices such as a user equipment (UE) and a base station may be configured to transmit reference signals associated with data channel transmissions. For example, a UE may transmit demodulation reference signals (DMRSs) to the base station which the base station may use to demodulate data transmissions associated with the DMRSs. In some cases, the UE or the base station may be configured to bundle DMRSs such that the DMRSs from multiple transmissions over a set of time resources are jointly considered (e.g., coherently combined at the base station), which may provide a more accurate estimate of the channel or otherwise increase the accuracy of decoding transmissions than if the DMRS of each transmission were considered separately.

In some cases, to support phase continuity maintenance, such as during a DMRS bundling operation, the UE may transmit one or more PTRSs to the base station. The base station may use one or more received PTRSs to lock onto a phase reference being used by the UE. In some cases, based on a DMRS bundling status, the UE may determine a PTRS density (e.g., time density, frequency density) according to one or more thresholds as indicated by a base station. In some examples, the base station may transmit control signaling to the UE including an indication of the one or more thresholds (e.g., modulation and coding scheme thresholds (MCS) thresholds, bandwidth allocation thresholds). A first set of indicated thresholds may correspond to a first set of reference signal densities (e.g., PTRS time and/or frequency densities, DMRS time and/or frequencies densities) and may be associated with enabled DMRS bundling. A second set of indicated thresholds may correspond to a second set of reference signal densities (e.g., PTRS time and/or frequency densities, DMRS time and/or frequencies densities) and may be associated with disabled DMRS bundling.

In some cases, the UE may receive a configuration message from the base station that may indicate an uplink transmission configuration. The uplink transmission configuration may include one or more values corresponding to the sets of thresholds such as an MCS value, a bandwidth allocation value, or both. In some cases, the UE may receive a message indicating, or otherwise determine a DMRS bundling status. Based on the bundling status, the UE may determine whether to use the first set of thresholds, or the second set of thresholds. Upon determining which set of thresholds to use, the UE may compare the one or more values included in the configuration message with the appropriate set of thresholds to select a reference signal density based on the comparison. For example, the UE may select a PTRS time density, a PTRS frequency density, a DMRS time density, or a DMRS frequency density, or a combination thereof, where the selected density may be based on the DMRS bundling status. The UE may map reference signaling (e.g., DMRSs, PTRSs, or both) to a set of resources (e.g., time and frequency resources) based on the selected reference signal density, and the UE may transmit an uplink transmission based on the mapping.

In some examples, the described techniques provide for a device to use PTRSs and an associated configuration to determine whether to perform DMRS bundling. For example, a device may be configured for shared channel repetition, which may include transmitting a repetition of a message over multiple shared channel resources. In some cases, there may be a time domain gap between two shared channel resources carrying different repetitions of the message, which may result in a phase jump, and in some cases phase discontinuity, between the repetitions. In such cases, tracking phase using a PTRS may allow a device to mitigate the effect of phase discontinuity, which may ensure phase continuity and coherent joint channel estimation for the shared channel repetitions.

According to some implementations of the present disclosure, a transmitting device may transmit at least two DMRSs and at least two PTRSs using multiple sets of shared channel resources. A receiving device may receive at least the two DMRSs and at least the two PTRSs and determine whether to perform a joint channel estimation procedure (e.g., using both of the DMRSs) based on a PTRS configuration associated with the PTRSs received from the transmitting device. For example, if a time or frequency density associated with the PTRSs satisfies a threshold, the receiving device may be able to mitigate any phase discontinuity that exists between the multiple sets of shared channel resources. Based on an ability to mitigate phase discontinuity, the receiving device may perform the joint channel estimation procedure accordingly. Implementing various aspects of the present disclosure may enable improved support for joint channel estimation in wireless communication systems.

A method for wireless communications at a UE is described. The method may include receiving control signaling indicating a first set of thresholds corresponding to a first set of reference signal densities and a second set of thresholds corresponding to a second set of reference signal densities, where the first set of thresholds is associated with uplink DMRS bundling being enabled, and the second set of thresholds is associated with uplink DMRS bundling being disabled, selecting a reference signal density from the first set of reference signal densities or the second set of reference signal densities based on an uplink DMRS bundling status, mapping reference signaling to a set of resources based on the reference signal density, the reference signaling including a DMRS, a PTRS, or both, and transmitting an uplink transmission based on the mapping.

An apparatus for wireless communications at a UE is described. The apparatus may include at least one processor, memory coupled with the at least one processor, and instructions stored in the memory. The instructions may be executable by the at least one processor to cause the apparatus to receive control signaling indicating a first set of thresholds corresponding to a first set of reference signal densities and a second set of thresholds corresponding to a second set of reference signal densities, where the first set of thresholds is associated with uplink DMRS bundling being enabled, and the second set of thresholds is associated with uplink DMRS bundling being disabled, select a reference signal density from the first set of reference signal densities or the second set of reference signal densities based on an uplink DMRS bundling status, mapping reference signaling to a set of resources based on the reference signal density, the reference signaling including a DMRS, a PTRS, or both, and transmit an uplink transmission based on the mapping.

Another apparatus for wireless communications at a UE is described. The apparatus may include means for receiving control signaling indicating a first set of thresholds corresponding to a first set of reference signal densities and a second set of thresholds corresponding to a second set of reference signal densities, where the first set of thresholds is associated with uplink DMRS bundling being enabled, and the second set of thresholds is associated with uplink DMRS bundling being disabled, means for selecting a reference signal density from the first set of reference signal densities or the second set of reference signal densities based on an uplink DMRS bundling status, means for mapping reference signaling to a set of resources based on the reference signal density, the reference signaling including a DMRS, a PTRS, or both, and means for transmitting an uplink transmission based on the mapping.

A non-transitory computer-readable medium storing code for wireless communications at a UE is described. The code may include instructions executable by at least one processor to receive control signaling indicating a first set of thresholds corresponding to a first set of reference signal densities and a second set of thresholds corresponding to a second set of reference signal densities, where the first set of thresholds is associated with uplink DMRS bundling being enabled, and the second set of thresholds is associated with uplink DMRS bundling being disabled, select a reference signal density from the first set of reference signal densities or the second set of reference signal densities based on an uplink DMRS bundling status, mapping reference signaling to a set of resources based on the reference signal density, the reference signaling including a DMRS, a PTRS, or both, and transmit an uplink transmission based on the mapping.

Some examples of the method, apparatuses, and non-transitory computer-readable medium described herein may further include operations, features, means, or instructions for receiving a message indicating that the uplink DMRS bundling status may be enabled and selecting the reference signal density from the first set of reference signal densities based on the uplink DMRS bundling status being enabled.

In some examples of the method, apparatuses, and non-transitory computer-readable medium described herein, receiving the control signaling indicating the first set of thresholds may include operations, features, means, or instructions for receiving an indication of the first set of thresholds, where the first set of thresholds includes a set of modulation and coding scheme thresholds corresponding to a set of PTRS time density values.

Some examples of the method, apparatuses, and non-transitory computer-readable medium described herein may further include operations, features, means, or instructions for receiving a configuration message indicating a configuration of the uplink transmission, the configuration message including a modulation and coding scheme value and identifying a modulation and coding scheme threshold from the set of modulation and coding scheme thresholds based on the modulation and coding scheme value, where the reference signal density may be based on a PTRS time density value corresponding to the identified modulation and coding scheme threshold.

In some examples of the method, apparatuses, and non-transitory computer-readable medium described herein, receiving the control signaling indicating the first set of thresholds may include operations, features, means, or instructions for receiving an indication of the first set of thresholds, where the first set of thresholds includes a set of bandwidth allocation thresholds corresponding to a set of frequency density values.

Some examples of the method, apparatuses, and non-transitory computer-readable medium described herein may further include operations, features, means, or instructions for receiving a configuration message indicating a configuration of the uplink transmission, the configuration message including a bandwidth allocation value for transmitting the uplink transmission and identifying a bandwidth allocation threshold from the set of bandwidth allocation thresholds based on the bandwidth allocation value, where the reference signal density may be based on a frequency density value corresponding to the bandwidth allocation threshold.

Some examples of the method, apparatuses, and non-transitory computer-readable medium described herein may further include operations, features, means, or instructions for receiving a message indicating that the uplink DMRS bundling status may be disabled and selecting the reference signal density from the second set of reference signal densities based on the uplink DMRS bundling status being disabled.

In some examples of the method, apparatuses, and non-transitory computer-readable medium described herein, the reference signal density corresponds to a PTRS density and the method, apparatuses, and non-transitory computer-readable medium may include further operations, features, means, or instructions for identifying a DMRS density based on the PTRS density.

In some examples of the method, apparatuses, and non-transitory computer-readable medium described herein, receiving the control signaling indicating the first set of thresholds may include operations, features, means, or instructions for receiving a set of multiple subsets of reference signal thresholds, each subset of the set of multiple subsets associated with a bundling parameter of the uplink transmission and selecting the reference signal density from a subset of reference signal thresholds based on the uplink DMRS bundling status being enabled and the bundling parameter.

In some examples of the method, apparatuses, and non-transitory computer-readable medium described herein, the bundling parameter corresponds to uplink shared channel repetition, uplink control channel repetition, adjacent slot bundling, multi-slot bundling, multi-segment bundling, contiguous bundling, non-contiguous bundling, or a combination thereof.

Some examples of the method, apparatuses, and non-transitory computer-readable medium described herein may further include operations, features, means, or instructions for transmitting an indication of a capability of the UE associated with phase continuity maintenance, where the uplink DMRS bundling status may be based on the capability of the UE.

In some examples of the method, apparatuses, and non-transitory computer-readable medium described herein, the first set of reference signal densities and the second set of reference signal densities include PTRS densities, and the reference signaling includes PTRS signaling.

In some examples of the method, apparatuses, and non-transitory computer-readable medium described herein, the first set of reference signal densities and the second set of reference signal densities include DMRS densities, and the reference signaling includes DMRS signaling.

A method for wireless communications at a base station is described. The method may include transmitting control signaling indicating a first set of thresholds corresponding to a first set of reference signal densities and a second set of thresholds corresponding to a second set of reference signal densities, where the first set of thresholds is associated with uplink DMRS bundling being enabled, and the second set of thresholds is associated with uplink DMRS bundling being disabled, identifying a reference signal density from the first set of reference signal densities or the second set of reference signal densities based on an uplink DMRS bundling status, receiving, from a UE, an uplink transmission, the uplink transmission including reference signaling in a set of resources according to the identified reference signal density, the reference signaling including a DMRS, a PTRS, or both, and decoding the uplink transmission based on the identified reference signal density.

An apparatus for wireless communications at a base station is described. The apparatus may include at least one processor, memory coupled with the at least one processor, and instructions stored in the memory. The instructions may be executable by the at least one processor to cause the apparatus to transmit control signaling indicating a first set of thresholds corresponding to a first set of reference signal densities and a second set of thresholds corresponding to a second set of reference signal densities, where the first set of thresholds is associated with uplink DMRS bundling being enabled, and the second set of thresholds is associated with uplink DMRS bundling being disabled, identify a reference signal density from the first set of reference signal densities or the second set of reference signal densities based on an uplink DMRS bundling status, receive, from a UE, an uplink transmission, the uplink transmission including reference signaling in a set of resources according to the identified reference signal density, the reference signaling including a DMRS, a PTRS, or both, and decode the uplink transmission based on the identified reference signal density.

Another apparatus for wireless communications at a base station is described. The apparatus may include means for transmitting control signaling indicating a first set of thresholds corresponding to a first set of reference signal densities and a second set of thresholds corresponding to a second set of reference signal densities, where the first set of thresholds is associated with uplink DMRS bundling being enabled, and the second set of thresholds is associated with uplink DMRS bundling being disabled, means for identifying a reference signal density from the first set of reference signal densities or the second set of reference signal densities based on an uplink DMRS bundling status, means for receiving, from a UE, an uplink transmission, the uplink transmission including reference signaling in a set of resources according to the identified reference signal density, the reference signaling including a DMRS, a PTRS, or both, and means for decoding the uplink transmission based on the identified reference signal density.

A non-transitory computer-readable medium storing code for wireless communications at a base station is described. The code may include instructions executable by at least one processor to transmit control signaling indicating a first set of thresholds corresponding to a first set of reference signal densities and a second set of thresholds corresponding to a second set of reference signal densities, where the first set of thresholds is associated with uplink DMRS bundling being enabled, and the second set of thresholds is associated with uplink DMRS bundling being disabled, identify a reference signal density from the first set of reference signal densities or the second set of reference signal densities based on an uplink DMRS bundling status, receive, from a UE, an uplink transmission, the uplink transmission including reference signaling in a set of resources according to the identified reference signal density, the reference signaling including a DMRS, a PTRS, or both, and decode the uplink transmission based on the identified reference signal density.

Some examples of the method, apparatuses, and non-transitory computer-readable medium described herein may further include operations, features, means, or instructions for transmitting a message indicating that the uplink DMRS bundling status may be enabled and identifying the reference signal density from the first set of reference signal densities based on the uplink DMRS bundling status being enabled.

Some examples of the method, apparatuses, and non-transitory computer-readable medium described herein may further include operations, features, means, or instructions for transmitting a message indicating that the uplink DMRS bundling status may be disabled and identifying the reference signal density from the second set of reference signal densities based on the uplink DMRS bundling status being disabled.

In some examples of the method, apparatuses, and non-transitory computer-readable medium described herein, transmitting the control signaling indicating the first set of thresholds may include operations, features, means, or instructions for transmitting an indication of the first set of thresholds, where the first set of thresholds includes a set of modulation and coding scheme thresholds corresponding to a set of PTRS time density values.

In some examples of the method, apparatuses, and non-transitory computer-readable medium described herein, transmitting the control signaling indicating the first set of thresholds may include operations, features, means, or instructions for transmitting an indication of the first set of thresholds, where the first set of thresholds includes a set of bandwidth allocation thresholds corresponding to a set of frequency density values.

Some examples of the method, apparatuses, and non-transitory computer-readable medium described herein may further include operations, features, means, or instructions for transmitting a configuration message indicating a configuration of the uplink transmission, the configuration message including a modulation and coding scheme value, or a bandwidth allocation value for the uplink transmission, or both.

In some examples of the method, apparatuses, and non-transitory computer-readable medium described herein, transmitting the control signaling indicating the first set of thresholds may include operations, features, means, or instructions for transmitting a set of multiple subsets of reference signal thresholds, each subset of the set of multiple subsets associated with a bundling parameter of the uplink transmission and identifying the reference signal density from a subset of reference signal thresholds based on the uplink DMRS bundling status being enabled and the bundling parameter.

In some examples of the method, apparatuses, and non-transitory computer-readable medium described herein, the bundling parameter corresponds to uplink shared channel repetition, uplink control channel repetition, adjacent slot bundling, multi-slot bundling, multi-segment bundling, contiguous bundling, non-contiguous bundling, or a combination thereof.

Some examples of the method, apparatuses, and non-transitory computer-readable medium described herein may further include operations, features, means, or instructions for receiving an indication of a capability of the UE associated with phase continuity maintenance, where the uplink DMRS bundling status may be based on the capability of the UE.

In some examples of the method, apparatuses, and non-transitory computer-readable medium described herein, the first set of reference signal densities and the second set of reference signal densities include PTRS densities.

In some examples of the method, apparatuses, and non-transitory computer-readable medium described herein, the first set of reference signal densities and the second set of reference signal densities include DMRS densities.

A method for wireless communication is described. The method may include receiving, using a first set of physical shared channel resources, a first DMRS and a first PTRS based on a PTRS configuration, receiving, using a second set of physical shared channel resources, a second DMRS and a second PTRS based on the PTRS configuration, and performing a channel estimation procedure using the first DMRS and the second DMRS based on the first PTRS and the second PTRS.

An apparatus for wireless communication is described. The apparatus may include at least one processor, memory coupled with the at least one processor, and instructions stored in the memory. The instructions may be executable by the at least one processor to cause the apparatus to receive, using a first set of physical shared channel resources, a first DMRS and a first PTRS based on a PTRS configuration, receive, using a second set of physical shared channel resources, a second DMRS and a second PTRS based on the PTRS configuration, and perform a channel estimation procedure using the first DMRS and the second DMRS based on the first PTRS and the second PTRS.

Another apparatus for wireless communication is described. The apparatus may include means for receiving, using a first set of physical shared channel resources, a first DMRS and a first PTRS based on a PTRS configuration, means for receiving, using a second set of physical shared channel resources, a second DMRS and a second PTRS based on the PTRS configuration, and means for performing a channel estimation procedure using the first DMRS and the second DMRS based on the first PTRS and the second PTRS.

A non-transitory computer-readable medium storing code for wireless communication is described. The code may include instructions executable by at least one processor to receive, using a first set of physical shared channel resources, a first DMRS and a first PTRS based on a PTRS configuration, receive, using a second set of physical shared channel resources, a second DMRS and a second PTRS based on the PTRS configuration, and perform a channel estimation procedure using the first DMRS and the second DMRS based on the first PTRS and the second PTRS.

Some examples of the method, apparatuses, and non-transitory computer-readable medium described herein may further include operations, features, means, or instructions for determining that at least one parameter associated with the PTRS configuration satisfies a threshold, where performing the channel estimation procedure may be based on the determining.

In some examples of the method, apparatuses, and non-transitory computer-readable medium described herein, the at least one parameter includes a time density of PTRSs, or a frequency density of the PTRSs, or both.

Some examples of the method, apparatuses, and non-transitory computer-readable medium described herein may further include operations, features, means, or instructions for determining a subcarrier spacing associated with the first set of physical shared channel resources, or the second set of physical shared channel resources, or both, where the determining that the at least one parameter associated with the PTRS configuration satisfies the threshold may be based on the subcarrier spacing.

Some examples of the method, apparatuses, and non-transitory computer-readable medium described herein may further include operations, features, means, or instructions for determining a radio frequency band associated with the first set of physical shared channel resources, or the second set of physical shared channel resources, or both, where the determining that the at least one parameter associated with the PTRS configuration satisfies the threshold may be based on the radio frequency band.

Some examples of the method, apparatuses, and non-transitory computer-readable medium described herein may further include operations, features, means, or instructions for determining a modulation and coding scheme associated with the first set of physical shared channel resources, or the second set of physical shared channel resources, or both, where performing the channel estimation procedure may be based on the modulation and coding scheme.

Some examples of the method, apparatuses, and non-transitory computer-readable medium described herein may further include operations, features, means, or instructions for determining a transmission continuity capability, where performing the channel estimation procedure may be based on the transmission continuity capability.

In some examples of the method, apparatuses, and non-transitory computer-readable medium described herein, the transmission continuity capability includes one or more of a power continuity capability, a power accuracy capability, or a phase continuity capability.

Some examples of the method, apparatuses, and non-transitory computer-readable medium described herein may further include operations, features, means, or instructions for transmitting a request to maintain a transmission continuity based on a transmission continuity capability and the PTRS configuration, where receiving the first DMRS and the second DMRS may be based on transmitting the request.

Some examples of the method, apparatuses, and non-transitory computer-readable medium described herein may further include operations, features, means, or instructions for determining that a transmission continuity capability does not satisfy a threshold, where performing the channel estimation procedure may be based on the determining and the PTRS configuration.

In some examples of the method, apparatuses, and non-transitory computer-readable medium described herein, the second set of physical shared channel resources includes a repetition of the first set of physical shared channel resources.

In some examples of the method, apparatuses, and non-transitory computer-readable medium described herein, performing the channel estimation procedure may include operations, features, means, or instructions for performing a joint channel estimation procedure using the first DMRS and the second DMRS based on the first PTRS and the second PTRS.

Some examples of the method, apparatuses, and non-transitory computer-readable medium described herein may further include operations, features, means, or instructions for receiving the first DMRS includes receiving the first DMRS including a cover code and receiving the second DMRS includes receiving the second DMRS including the cover code.

Some examples of the method, apparatuses, and non-transitory computer-readable medium described herein may further include operations, features, means, or instructions for transmitting signaling on a third set of physical shared channel resources subsequent to the first set of physical shared channel resources and prior to the second set of physical shared channel resources, where performing the channel estimation procedure may be based on the transmitting the signaling and the PTRS configuration.

Some examples of the method, apparatuses, and non-transitory computer-readable medium described herein may further include operations, features, means, or instructions for receiving signaling on a third set of physical shared channel resources subsequent to the first set of physical shared channel resources and prior to the second set of physical shared channel resources, where performing the channel estimation procedure may be based on the receiving the signaling and the PTRS configuration.

Some examples of the method, apparatuses, and non-transitory computer-readable medium described herein may further include operations, features, means, or instructions for communicating signaling based on performing the channel estimation procedure.

A method for wireless communication is described. The method may include determining, based on a PTRS configuration, a first set of physical shared channel resources for transmitting a first DMRS and a first PTRS and a second set of physical shared channel resources for transmitting a second DMRS and a second PTRS, transmitting, using the first set of physical shared channel resources, the first PTRS and the first DMRS including a cover code, and transmitting, using the second set of physical shared channel resources, the second PTRS and the second DMRS including the cover code.

An apparatus for wireless communication is described. The apparatus may include at least one processor, memory coupled with the at least one processor, and instructions stored in the memory. The instructions may be executable by the at least one processor to cause the apparatus to determine, based on a PTRS configuration, a first set of physical shared channel resources for transmitting a first DMRS and a first PTRS and a second set of physical shared channel resources for transmitting a second DMRS and a second PTRS, transmit, using the first set of physical shared channel resources, the first PTRS and the first DMRS including a cover code, and transmit, using the second set of physical shared channel resources, the second PTRS and the second DMRS including the cover code.

Another apparatus for wireless communication is described. The apparatus may include means for determining, based on a PTRS configuration, a first set of physical shared channel resources for transmitting a first DMRS and a first PTRS and a second set of physical shared channel resources for transmitting a second DMRS and a second PTRS, means for transmitting, using the first set of physical shared channel resources, the first PTRS and the first DMRS including a cover code, and means for transmitting, using the second set of physical shared channel resources, the second PTRS and the second DMRS including the cover code.

A non-transitory computer-readable medium storing code for wireless communication is described. The code may include instructions executable by at least one processor to determine, based on a PTRS configuration, a first set of physical shared channel resources for transmitting a first DMRS and a first PTRS and a second set of physical shared channel resources for transmitting a second DMRS and a second PTRS, transmit, using the first set of physical shared channel resources, the first PTRS and the first DMRS including a cover code, and transmit, using the second set of physical shared channel resources, the second PTRS and the second DMRS including the cover code.

Some examples of the method, apparatuses, and non-transitory computer-readable medium described herein may further include operations, features, means, or instructions for determining that at least one parameter associated with the PTRS configuration satisfies a threshold, where the second DMRS includes the cover code based on the at least one parameter satisfying the threshold.

In some examples of the method, apparatuses, and non-transitory computer-readable medium described herein, the at least one parameter includes a time density of PTRSs, or a frequency density of the PTRSs, or both.

Some examples of the method, apparatuses, and non-transitory computer-readable medium described herein may further include operations, features, means, or instructions for determining a subcarrier spacing associated with the first set of physical shared channel resources, or the second set of physical shared channel resources, or both, where the determining that the at least one parameter associated with the PTRS configuration satisfies the threshold may be based on the subcarrier spacing.

Some examples of the method, apparatuses, and non-transitory computer-readable medium described herein may further include operations, features, means, or instructions for determining a radio frequency band associated with the first set of physical shared channel resources, or the second set of physical shared channel resources, or both, where the determining that the at least one parameter associated with the PTRS configuration satisfies the threshold may be based on the radio frequency band.

Some examples of the method, apparatuses, and non-transitory computer-readable medium described herein may further include operations, features, means, or instructions for determining a modulation and coding scheme associated with the first set of physical shared channel resources, or the second set of physical shared channel resources, or both, where the second DMRS includes the cover code based on the modulation and coding scheme.

In some examples of the method, apparatuses, and non-transitory computer-readable medium described herein, the second set of physical shared channel resources includes a repetition of the first set of physical shared channel resources.

Some examples of the method, apparatuses, and non-transitory computer-readable medium described herein may further include operations, features, means, or instructions for determining a transmission continuity capability, where the PTRS configuration may be based on the determining.

In some examples of the method, apparatuses, and non-transitory computer-readable medium described herein, the transmission continuity capability includes one or more of a power continuity capability, a power accuracy capability, or a phase continuity capability.

Some examples of the method, apparatuses, and non-transitory computer-readable medium described herein may further include operations, features, means, or instructions for receiving a request to maintain a transmission continuity based on a transmission continuity capability and the PTRS configuration, where transmitting the first DMRS and the second DMRS may be based on receiving the request.

Some examples of the method, apparatuses, and non-transitory computer-readable medium described herein may further include operations, features, means, or instructions for determining that a transmission continuity capability does not satisfy a threshold, where the PTRS configuration may be based on the determining.

DETAILED DESCRIPTION

Figure 1:
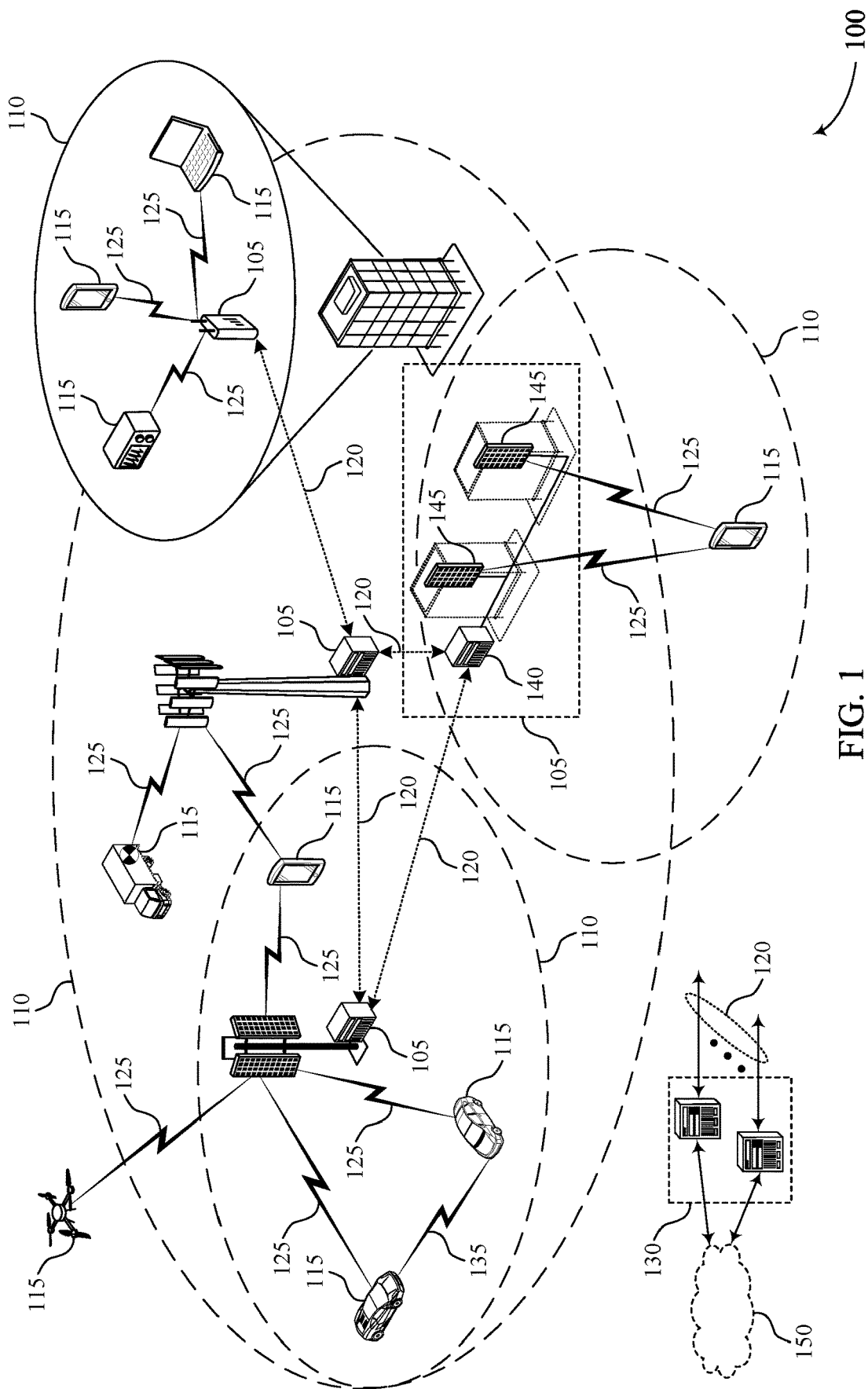
FIG. 1 illustrates an example of a wireless communications system that supports techniques for determining phase tracking reference signal (PTRS) density in accordance with aspects of the present disclosure.

In some wireless communications systems, devices (e.g., a user equipment (UE), a base station) may be configured to transmit reference signals to other devices (e.g., UE, base station), where reference signals may be associated with corresponding data channel transmissions. For example, a UE may transmit demodulation reference signals (DMRSs) to a base station, and the base station may use the received DMRSs to estimate channel characteristics (e.g., via channel quality measurements) of corresponding wireless channels over which the base station and the UE may communicate. The base station may use the estimated channel characteristics to demodulate transmissions received from the UE.

In some examples, a DMRS may be specific to a particular transmission or time period (e.g., slot-specific), such that a receiving device may receive one or more DMRSs in a slot, estimate the channel based on the received DMRSs, and decode the information included in that slot based on the received DMRSs in that slot. In some implementations, a transmitting device and receiving device may be configured to support bundling of DMRSs (e.g., DMRS bundling) in the time domain across one or more transmission or time periods (e.g., transmission time intervals (TTIs), time slots, slot segments). That is, when DMRS bundling is configured, a receiving device such as a UE or base station may perform (joint) channel estimation based on DMRS(s) received across multiple slots or segments, as opposed to performing channel estimation separately for each individual slot based on the DMRS(s) received in that slot. For example, a UE or base station may group DMRSs between multiple transmissions over a corresponding set of time resources and may then use the grouped DMRSs to perform channel estimation to demodulate received transmissions.

In some cases, the ability of the UE to support DMRS bundling across multiple transmission or time periods may be based on a capability of the UE to support phase continuity maintenance across those transmission or time periods. For example, physical uplink shared channel (PUSCH) transmissions, physical uplink control channel (PUCCH) transmissions, or the like, may not be contiguous and, in some cases, the gap between non-contiguous transmissions may be relatively long, resulting in potential phase discontinuity between the UE and a receiving device (e.g., the base station). In such cases, the UE may be unable to reliably maintain phase continuity and as such, the UE may not support DMRS bundling. However, the UE may be configured to transmit phase tracking reference signals (PTRSs) to the base station, and the base station may use the PTRSs to lock onto a phase reference being used by the UE. As the base station may use the PTRSs to determine phase reference, the UE may be configured to support DMRS bundling or not regardless of the UEs ability to maintain phase tracking.

To determine resources in which to transmit PTRSs, a UE may be configured with one or more PTRS density tables. For example, the UE may be configured with a set of tables where a first table of the set may map MCS thresholds to PTRS time densities, and a second table of the set may map bandwidth allocation thresholds (e.g., a number of contiguous resource blocks) to PTRS frequency densities. Accordingly, a UE may determine time and frequency resources for transmitting PTRSs for an uplink transmission based on the set of tables and a particular MCS value and bandwidth allocation value for the uplink transmission. Phase tracking may be improved by increasing PTRS density in at least the time domain. However, the densities included in the first and second tables may be configured based on non-DMRS bundling and may not support high PTRS density.

Techniques are provided herein to support PTRS densities based on a DMRS bundling status. For example, based on a DMRS bundling status, the UE may determine a PTRS density (e.g., time density, frequency density) according to one or more thresholds or parameters as indicated by a base station. In some examples, the base station may transmit control signaling to the UE including an indication of the one or more thresholds (e.g., modulation and coding scheme (MCS) thresholds, bandwidth allocation thresholds). For example, the control signaling may include at least two sets of thresholds. A first set of thresholds may correspond to a first set of reference signal densities and may be associated with enabled DMRS bundling. The first set of thresholds may include a set of MCS thresholds associated with PTRS time densities and a set of bandwidth allocation thresholds associated with PTRS frequency densities. The second set of thresholds may correspond to a second set of reference signal densities and may be associated with disabled DMRS bundling. The second set of thresholds may include a set of MCS thresholds associated with PTRS time densities and a set of bandwidth allocation thresholds associated with PTRS frequency densities. In some cases, one or more of the PTRS densities (e.g., time density, or frequency density, or both) associated with the first set of thresholds may be higher than a corresponding density associated with the second set of thresholds so as to increase PTRS density when DMRS bundling is enabled. In some cases, DMRS density may decrease as PTRS density increases to reduce reference signal overhead.

In some cases, the UE may receive a configuration message that may indicate an uplink transmission configuration including an MCS value, a bandwidth allocation value (e.g., a resource block allocation size), some other transmission parameter, or a combination thereof. The UE may receive a message indicating, or otherwise determine the DMRS bundling status (e.g., enabled, disabled). Based on the bundling status, the UE may select the first set of thresholds or the second set of thresholds. Upon selecting a set of thresholds, the UE may compare the MCS value to the set of MCS thresholds to select a PTRS time density and/or compare the bandwidth allocation to the set of bandwidth allocation thresholds to select a PTRS frequency density. The UE 115 may map reference signaling (e.g., DMRSs, PTRSs, or both) to a set of resources (e.g., time and frequency resources) based on the selected reference signal densities, and the UE 115 may transmit an uplink transmission based on the mapping.

In some cases, a capability of a device (e.g., a transmitting or a receiving device) to support joint channel estimation or DMRS bundling may be based on a continuity capability of the transmitting device. For example, if the transmitting device is unable to maintain a threshold phase continuity over multiple shared channel transmissions (e.g., due to a time domain gap between the transmissions), then a receiving device may be unable to perform joint channel estimation from the DMRS included in the shared channel transmissions. In some examples, resources for shared channel transmissions (e.g., shared channel transmissions implementing shared channel repetition) may be scheduled with a time domain gap between some of the scheduled resources. The time domain gap between the resources may introduce a phase jump or phase discontinuity across the transmissions, which may hinder an ability of a receiving device to perform DMRS bundling. Some systems may implement a PTRS for phase tracking and management to mitigate the effects of phase discontinuity and to enable a receiving device to determine phase information associated with transmissions which are not consecutive. It may be beneficial to implement techniques using PTRSs to improve support for DMRS bundling in wireless communications systems.

As described in the present disclosure, a wireless communications system may implement DMRS bundling based on a PTRS configuration to ensure phase continuity across shared channel transmissions. In some cases, these techniques may be applied to provide phase continuity across repetitions of a shared channel transmission, such as when the repetitions are scheduled with a time domain gap between repetitions. For example, a transmitting device (e.g., a UE or a base station) may determine shared channel resources (e.g., multiple sets of shared channel resources) for transmitting multiple transmissions, such as multiple repetitions, of a shared channel transmission. With each of the repetitions, the transmitting device may transmit one or more DMRS and PTRS. In some cases, the transmitting device may apply a same cover code to the DMRS in the different repetitions, or transmit a same DMRS in the different repetitions, to support joint channel estimation using DMRS bundling at the receiver.

DMRS bundling may be applied be based on a presence or a configuration of one or more PTRSs. The transmitting device may determine whether to apply DMRS bundling based on a PTRS configuration. For example, DMRS bundling may be applied based on a density of the PTRSs (e.g., time or frequency densities for the PTRS) in shared channel resources. If there is at least a minimum density of PTRSs in the shared channel repetitions in time, or frequency, or both, the transmitting and receiving devices may apply DMRS bundling.

A receiving device (e.g., a UE or a base station) may receive the shared channel repetitions including the DMRSs and the PTRSs determine whether to perform a joint channel estimation procedure using DMRS bundling. For example, the receiver may perform joint channel estimation using a first set of DMRS in a first shared channel transmission repetition and a second set of DMRS in a second shared channel transmission repetition, using the PTRS in the repetitions to maintain phase continuity across the repetitions. In some cases, the receiving device may determine that a parameter (e.g., a time or frequency density of the PTRS, or both) associated with the PTRS satisfies a threshold such that the receiving device is capable to perform joint channel estimation using the DMRSs in the multiple sets of shared channel resources.

In some examples, the receiving device may determine to perform joint channel estimation based on a transmission continuity capability of the transmitting device. For example, if a transmission continuity capability (e.g., a power continuity or accuracy capability or a phase continuity capability) of the transmitting device does not satisfy a capability level, the receiving device may perform joint channel estimation based on the PTRS configuration (e.g., if a time or frequency density of the PTRS satisfies a threshold). Implementing various aspects of the present disclosure may lead to improved support for joint channel estimation (e.g., DMRS bundling) in wireless communications systems, which may lead to an increased efficiency or an increased reliability, among other benefits. Additionally, aspects of the subject matter described herein may be implemented to realize one or more advantages. The techniques described herein may provide for a UE to determine a density for PTRSs, such that the UE may mitigate reference signal overhead, while improving communication reliability, such as while operating according to DMRS bundling, among other advantages. As such, supported techniques may include improved network operations and, in some examples, may promote network efficiencies, among other benefits.

Aspects of the disclosure are initially described in the context of wireless communications systems. Aspects are then described with reference to example resource allocations, and process flows. Aspects of the disclosure are further illustrated by and described with reference to apparatus diagrams, system diagrams, and flowcharts that relate to techniques for determining PTRS density.

FIG. 1 illustrates an example of a wireless communications system 100 that supports techniques for determining PTRS density in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_S=1/(\Delta f_{max} \cdot N_f)$ seconds, where $\Delta f_{max}$ may represent the maximum supported subcarrier spacing, and $N_f$ may represent the maximum supported discrete Fourier transform (DFT) size.

Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, the wireless communication system 100 may implement PTRSs to mitigate effects of phase discontinuity of transmissions between devices. For example, a UE 115 may transmit a PTRS embedded in a PUSCH transmission or a base station 105 may transmit a PTRS embedded in a physical downlink shared channel (PDSCH) transmissions. In some implementations, the UE 115 or the base station 105 may be configured to use up to two ports and may transmit PTRS using either a cyclic prefix OFDM (CP-OFDM) waveform or a DFT-S-OFDM waveform. In some implementations, the UE 115 or the base station 105 may include the PTRS or may use a PTRS density (e.g., a time or frequency density indicating how many resource blocks or symbols are to contain the PTRS) based on a modulation and coding scheme or resource block allocation size associated with shared channel transmissions. In such implementations, locations of the PTRS in the shared channel transmissions may be determined or derived from the scheduled resource blocks and an associated frequency density. In some implementations, a PTRS may have one port mapped onto a subcarrier carrying one or more DRMS ports in any resource block.

In some examples, the UE 115 may be configured (e.g., via RRC signaling) with modulation and coding schemes and bandwidth thresholds (e.g., and associated time or frequency PTRS densities) for each associated BWP. In some implementations, scheduled modulation and coding scheme may be associated with PTRS time densities and scheduled bandwidths may be associated with PTRS frequency densities. For CP-OFDM, time densities for PTRS may include every fourth, every second, or every symbol. Similarly, for CP-OFDM, frequency densities for PTRS may include one subcarrier in every fourth, every second, or every resource block. In some implementations, if a scheduled modulation and coding scheme increases, then a time density of the PTRS may also increase. Similarly, if a scheduled bandwidth increases, then a frequency density of the PTRS may also increase. In some implementations the UE 115 may indicate a capability (e.g., based on phase noise characteristics) associated with preferred modulation and coding scheme or bandwidth thresholds. If the UE 115 or the base station 105 is not configured with PTRS densities and if the PTRS is present in a transmissions (e.g., if UL-PTRS-present or DL-PTRS-present is enabled) then one PTRS port may be present in each symbol and every second resource block.

Based on PTRS configurations, devices in the wireless communications system 100 may perform joint channel estimation (e.g., DMRS bundling) such that the devices use DMRSs in multiple shared channel transmissions to determine an estimate of a channel between the devices. For example, a base station 105 or a UE 115 may receive DMRSs and PTRSs in multiple shared channel transmissions (e.g., multiple repetitions of a shared channel transmissions) and may determine whether to perform joint channel estimation based on a configuration of the PTRSs (e.g., based on determining that a time or frequency density of the PTRS satisfies a threshold). In some implementations, the PTRS configuration may affect a devices capability to perform joint channel estimation by determining whether the device is able to compensate for or otherwise mitigate phase discontinuities or jumps between shared channel transmissions. Accordingly, if a PTRS density satisfies a threshold, a UE 115 or a base station 105 may be capable to perform joint channel estimation even if a transmission or phase continuity of a transmitting device is low. Implementing various aspects of the present disclosure may enable improved support for joint channel estimation in a wireless communications system 100 which may lead to an increased efficiency or reliability, among other benefits.

In some cases, UE 115 may determine a PTRS density (e.g., time density, frequency density) according to one or more thresholds as indicated by a base station 105 based on a DMRS bundling status. In some examples, the base station 105 may transmit control signaling to the UE 115 including an indication of the one or more thresholds (e.g., MCS thresholds, bandwidth allocation thresholds). For example, the control signaling may include or otherwise indicate at least two sets of thresholds. A first set of thresholds may correspond to a first set of reference signal densities (e.g., PTRS time and/or frequency densities, DMRS time and/or frequencies densities) and may be associated with enabled DMRS bundling. A second set of thresholds may correspond to a second set of reference signal densities (e.g., PTRS time and/or frequency densities, DMRS time and/or frequencies densities) and may be associated with disabled DMRS bundling.

The UE 115 may receive a configuration message from the base station 105 that may indicate an uplink transmission configuration, where the uplink transmission configuration may include one or more values corresponding to the sets of thresholds such as an MCS value, a bandwidth allocation value, or both. In some cases, the UE 115 may receive a message indicating, or otherwise determine a DMRS bundling status. Based on the bundling status, the UE 115 may determine whether to use the first set of thresholds, or the second set of thresholds. Upon determining which set of thresholds to use, the UE 115 may compare the one or more values included in the configuration message with the appropriate set of thresholds to select a reference signal density based on the comparison. For example, the UE 115 may select a PTRS time density, a PTRS frequency density, a DMRS time density, or a DMRS frequency density, or a combination thereof, where the selected density may be based on the DMRS bundling status. The UE 115 may map reference signaling (e.g., DMRSs, PTRSs, or both) to a set of resources (e.g., time and frequency resources) based on the selected reference signal density, and the UE 115 may transmit an uplink transmission based on the mapping.

Figure 2:
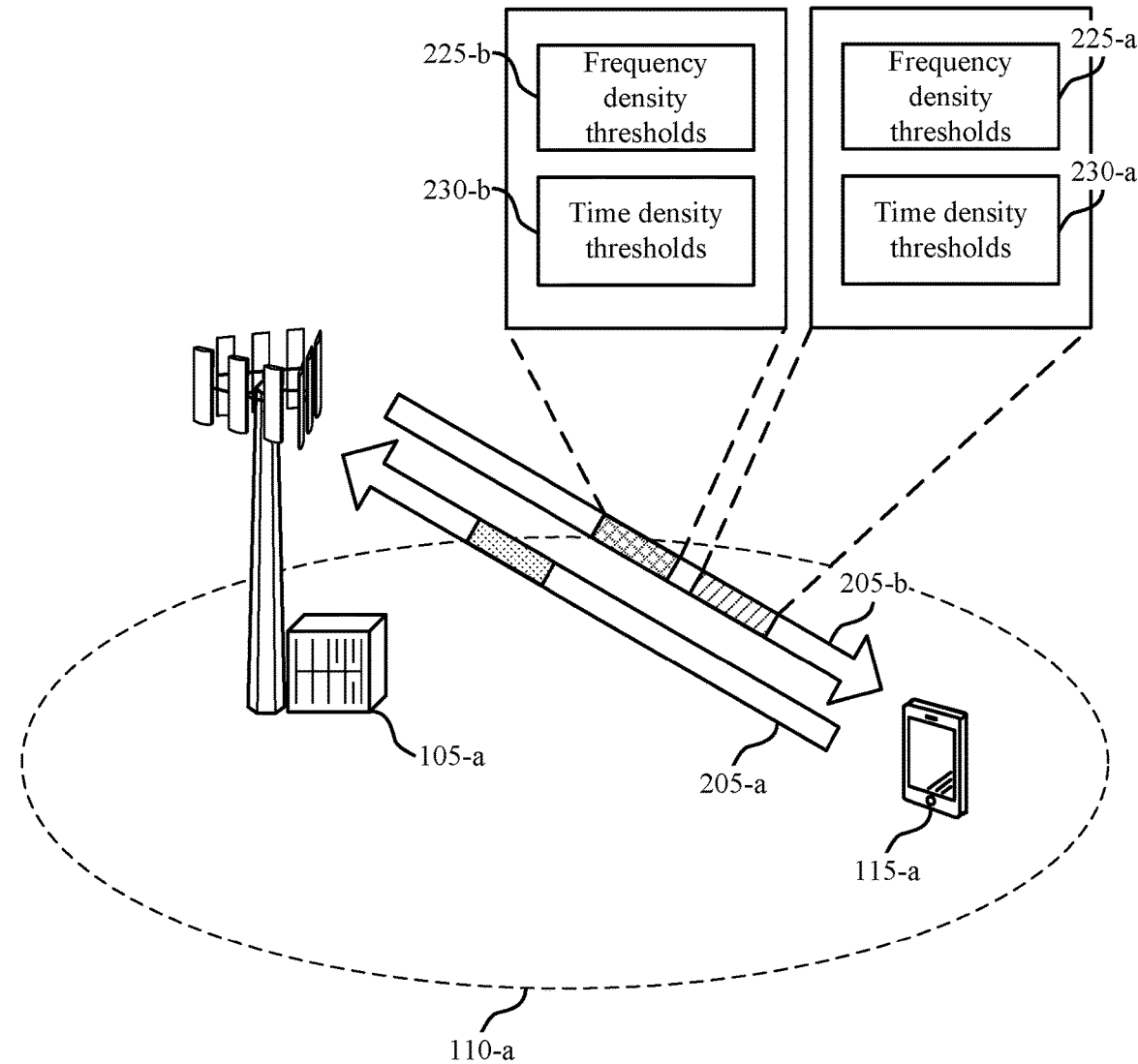
FIG. 2 illustrates an example of a wireless communications system that supports techniques for determining PTRS density in accordance with aspects of the present disclosure.

FIG. 2 illustrates an example of a wireless communications system 200 that supports techniques for determining PTRS density in accordance with aspects of the present disclosure. The wireless communications system 200 may include base station 105-a and UE 115-a, which may be examples of a base station 105 and a UE 115 as described with reference to FIG. 1. Base station 105-a may serve a geographic coverage area 110-a. In some cases, base station 105-a may implement a reference signal density indication procedure to configure UE 115-a with sets of reference signal thresholds based on a DMRS bundling status. Additionally or alternatively, other wireless devices, such as UEs 115-a, may implement the same or a similar reference signal density indication procedure.

UE 115-a may be connected to or otherwise may communicate with base station 105-a. For example, base station 105-a may transmit one or more downlink signals to UE 115-a via communication link 205-b (e.g., a downlink communications link, a beam formed communications link, a channel) and UE 115-a may transmit one or more uplink signals to base station 105-a via communication link 205-a (e.g., an uplink communications link, a beam formed communications link, a channel). In some implementations, UE 115-a may be configured to transmit reference signals to base station 105-a. In some cases, the reference signals may be associated with corresponding uplink channel transmissions. For example, UE 115-a may transmit, to base station 105-a, a DMRS, where the DMRS is included in an uplink control channel transmission (e.g., PUCCH) or an uplink shared channel transmission (e.g., PUSCH). The base station 105-a may use the DMRS to estimate channel characteristics (e.g., via channel quality measurements, such as SINR, SNR, RSRP, RSRQ) of corresponding wireless channels over which base station 105-a and UE 115-a may communicate. Base station 105-a may use the estimated channel characteristics to demodulate and decode the uplink channel transmissions.

In some cases, UE 115-a and/or base station 105-a may be configured to perform joint channel estimation. That is, UE 115-a and base station 105-a may be configured to perform DMRS bundling in which a set of DMRSs may be grouped across multiple transmissions over a corresponding set of time resources. For example, UE 115-a may group DMRSs between multiple transmissions over a corresponding set of time resources and a receiving device, such as base station 105-a, may then use the grouped DMRSs to perform channel estimation to demodulate transmissions received from UE 115-a. For example, base station 105-a may group the DMRSs in nearby, or adjacent REs in the time domain, the frequency domain, or a combination thereof. For example, a set of DMRSs may be grouped based on segments (e.g., a portion of a slot), such that a receiving device may receive DMRSs in defined segments of a set of slots, and the receiving device may estimate the channel based on the set of received DMRSs to demodulate the information included in at least each of the corresponding segments. In another example, a set of DMRSs may be grouped based on slots, such that a receiving device may receive DMRSs in a set of slots, and the receiving device may estimate the channel based on the set of received DMRSs to demodulate the information included in the corresponding slots. As such, when DMRS bundling is configured, a receiving device may perform (joint) channel estimation based on DMRS(s) received across multiple slots or segments, as opposed to performing channel estimation separately for each individual slot based on the DMRS(s) received in that slot.

In some cases, UE 115-a may be configured to transmit an uplink transmission according to a bundling parameter. The bundling parameter may correspond to uplink shared channel repetition, such that the uplink shared transmission may be transmitted according to DMRS bundling. The bundling parameter may correspond uplink control channel repetition, such that the uplink control transmission may be transmitted according to DMRS bundling. The bundling parameter may correspond to adjacent slot bundling, multi-slot bundling, multi-segment bundling, contiguous bundling, non-contiguous bundling, or a combination thereof.

In some implementations, the ability of UE 115-a to support DMRS bundling may depend on a capability of UE 115-a to perform phase continuity maintenance. When a wave form is generated by an oscillator, the initial angle of a sinusoidal function of the waveform may be referred to as a phase. In some cases, oscillators of a device may experience intermittent fluctuations in the phase of a waveform and these fluctuations may be referred to as phase noise. Phase noise may impact the transmission and/or reception of a signal. In some cases, PUSCH transmissions, PUCCH transmissions, or the like, may not be contiguous and, in some cases, a gap between non-contiguous transmissions may be relatively long, resulting in potential phase discontinuity (e.g., unsynchronized local oscillators) between UE 115-a and base station 105-a. As such, the ability of UE 115-a to maintain phase continuity may be based on whether an uplink transmission (e.g., PUCCH, PUSCH) is contiguous or not, and/or the gap (e.g., the duration of the gap, the usage of the gap). In such cases, UE 115-a may be unable to reliably maintain phase continuity and as such, UE 115-a may not support DMRS bundling. In some cases, UE 115-a may transmit an indication of a capability of UE 115-a associated with phase continuity maintenance and base station 105-a may enable or disable DMRS bundling based on the capability of UE 115-a.

However, in some cases, the UE 115-a may be configured to transmit one or more PTRSs to base station 105-a for phase tracking. For example, base station 105-a may use the one or more PTRSs to lock onto a phase reference being used by UE 115-a. In some cases, base station 105-a may use the one or more PTRSs to estimate phase jumps (e.g., potential phase jumps) across slots. As base station 105-a may use the PTRSs to determine phase reference and thus may reduce phase discontinuity, UE 115-a may be configured to support DMRS bundling or not regardless of the ability of the UEs 115 to maintain phase tracking.

A transmitting device may include (e.g., embed) PTRSs in one or more resources of a transmission, such as a PDSCH, where the transmitting device is a base station 105, or a PUSCH (CP-OFDM and DFT-S-OFDM), where the transmitting device is a UE 115. In some implementations, PTRSs may be activated when some channels (e.g., data channels) are activated for a UE 115. The resource allocation and density of a PTRS in a transmission may be based on a resource block allocation size. In some cases, UE 115-a may be configured to allocate PTRSs to resource elements of a resource block based on one or more scheduled resource blocks and a time and/or frequency density associated with the PTRS. UE 115-a may not allocate PTRSs to resource blocks that are not scheduled for UE 115-a. In some cases, for a given resource block, UE 115-a may map one PTRS port to one subcarrier carrying one or more DMRS ports of the associated DMRS port group. In some cases, each PTRS port may be associated with a corresponding DMRS port group, where one DMRS port in the DMRS port group may be used for transmitting the PTRS. In some cases, up to two ports may be configured for uplink PTRS transmission, and up to two ports may be configured for downlink PTRS transmission.

In some implementations, the UE 115 may receive an indication or otherwise determine whether PTRS is activated or not. For example, if DL-PTRS-present and/or UL-PTRS-present is enabled, the UE 115 may map one PTRS port to every symbol (e.g., OFDM) of a resource allocation and every second resource block unless the UE 115 receives PTRS density tables. For example, in some cases (e.g., SU-MIMO), UE 115-a may allocate PTRSs according to a threshold configuration included in control signaling (e.g., RRC signaling) from base station 105-a. In some cases, the threshold configuration may be preconfigured and/or determined by a base station 105. Accordingly, base station 105-a may transmit a control message including an indication of one or more thresholds (e.g., density tables) for the UE 115-a to determine PTRS resource allocation. The thresholds may correspond to an MCS, a resource block (RB) allocation size, and the like. For example, the control message may include a first set of MCS thresholds mapped to PTRS densities in the time domain (e.g., M={ptrsthMCSj, j=1, 2, 3, 4}), according to Table 1. Additionally or alternatively, the control message may include a second set of bandwidth allocation (e.g., resource block) thresholds mapped to PTRS densities in the frequency domain R={ptrsthRBn, n=0, 2, 4}), according to Table 2. $I_{MCS}$ may refer to the MCS configured for the uplink transmission, and $N_{RB}$ may refer to the bandwidth allocated for the uplink transmission. ptrs-MCS$_1$, ptrs-MCS$_2$, ptrs-MCS$_3$, and ptrs-MCS$_4$ may refer to the MCS thresholds and $N_{RB0}$ and $N_{RB1}$ may refer to the bandwidth allocation thresholds.

TABLE 1

| Scheduled MCS | Time Density |
| --- | --- |
| $I_{MCS}$ < ptrs-MCS$_1$ | PTRS is not present |
| ptrs-MCS$_1$ ≤ $I_{MCS}$ < ptrs-MCS$_2$ | 4 |
| ptrs-MCS$_2$ ≤ $I_{MCS}$ < ptrs-MCS$_3$ | 2 |
| ptrs-MCS$_3$ ≤ $I_{MCS}$ < ptrs-MCS$_4$ | 1 |

TABLE 2

| Contiguous Scheduled BW | Frequency Density (1/n) |
| --- | --- |
| $N_{RB}$ < $N_{RB0}$ | PTRS is not present |
| $N_{RB0}$ ≤ $N_{RB}$ < $N_{RB1}$ | 4 |
| $N_{RB1}$ ≤ $N_{RB}$ | 2 |

In some implementations, such as for CP-OFDM, the time densities may include a PTRS in every fourth, second, or every symbol, based on a scheduled MCS. In some implementations, such as for CP-OFDM, the frequency densities may include a PTRS occupying one subcarrier (e.g., in some or all resource elements based on the time density of the PTRS) in each resource block, every second resource block, or every fourth resource block based on the bandwidth allocated to the UE 115. The time density of the PTRS may be configured to increase with increasing MCS (e.g., except for reserved MCSs). The frequency density of the PTRS may be expected to decrease with increasing the scheduled BW (e.g., the number of scheduled RBs).

In some cases, the transmitting device (e.g., UE 115-a) may be configured with one or more thresholds independently per BWP, by dedicated RRC signaling (e.g., uplink RRC signaling, or downlink RRC signaling based on the transmitting device). For example, base station 105-a may configure UE 115-a with a first set of one or more thresholds for a first BWP and a second set of one or more thresholds for second BWP. The first set and the second set may indicate a mapping of thresholds to PTRS densities, and the first set and the second set may include different thresholds, or the same or similar thresholds and may include different PTRS densities, or the same or similar PTRS densities. In some cases, the base station 105 may configure the one or more thresholds based on a capability of the UE 115. For example, UE 115-a may report to base station 105-a preferred MCS and/or BW thresholds based on phase noise characteristics of UE 115-a. In some cases, UE 115-a may report one or more MCS and/or BW thresholds based on a modulation order (e.g., a maximum ModOrder) supported by UE 115-a. For example, at a given carrier frequency, for each subcarrier spacing applicable to a data channel at a corresponding carrier frequency, UE 115-a may report MCS and/or BW thresholds (e.g., preferred MCS and/or BW thresholds) based on phase noise characteristics of UE 115-a. Base station 105-a may receive the report and configure the one or more thresholds based on the report. For example, base station 105-a may configure UE 115-a with MCS thresholds including a maximum MCS supported by UE 115-a, or a set of thresholds with the maximum MCS threshold less than or equal to the maximum MCS supported by UE 115-a, or a combination thereof.

Accordingly, UE 115-a may receive an indication or otherwise determine an MCS and a bandwidth allocation associated with an uplink transmission. The UE 115 may compare the scheduled MCS to the MCS thresholds (e.g., MCS thresholds included in Table 1) and select a PTRS time density based on the comparison. The UE 115 may compare the scheduled bandwidth allocation to the bandwidth allocation thresholds (e.g., bandwidth allocation thresholds includes in Table 2) and select a PTRS frequency density based on the comparison. The UE 115 may map the PTRSs to the allocated resources in accordance with the selected time and frequency densities prior to transmitting the uplink transmission.

Phase tracking, and thus DMRS bundling operations, may be improved by increasing PTRS density such as in the time domain and/or the frequency domain. However, the densities included in the one or more thresholds (e.g., time densities of Table 1 and frequency densities of Table 2) may be configured based on non-DMRS bundling or irrespective of DMRS bundling and as such, may not support high PTRS density. Thus, the densities included in the or more thresholds may not support reliable phase tracking while operating according to DMRS bundling. As increased PTRS densities may be useful for some scenarios, such as DMRS bundling, and not others, such as non-DMRs bundling operations, UE 115-a may be configured with multiple sets of thresholds to improve phase tracking for DMRS bundling while mitigating PTRS overhead in non-DMRS bundling scenarios. UE 115-a may determine which set of thresholds to use based on a DMRS bundling status (e.g., DMRS bundling enabled, DMRS bundling disabled).

For example, UE 115-a may be configured with a first set of thresholds 210 (e.g., a first set of density tables) and a second set of thresholds 215 (e.g., a second set of density tables). The first set of thresholds 210 may correspond to a first set of reference signal densities (e.g., frequency densities, time densities) and may be associated with enabled DMRS bundling. For example, the first set of thresholds 210 may include a set of time density thresholds 230-a (e.g., a time density table), such as a set of MCS thresholds associated with PTRS time densities. Additionally or alternatively, the first set of thresholds 210 may include a set of frequency density thresholds 225-a (e.g., a frequency density table), such as a set bandwidth allocation thresholds associated with PTRS frequency densities. A second set of thresholds 215 may correspond to a second set of reference signal densities (e.g., frequency densities, time densities) and may be associated with disabled DMRS bundling. For example, the second set of thresholds 215 may include a set of time density thresholds 230-b (e.g., a time density table), such as a set of MCS thresholds associated with PTRS time densities. Additionally or alternatively, the second set of thresholds 215 may include a set of frequency density thresholds 225-b (e.g., a frequency density table), such as a set bandwidth allocation thresholds associated with PTRS frequency densities.

In some cases, the first set of thresholds may include multiple subsets of thresholds. Each subset may include MCS thresholds associated with PTRS time densities (e.g., a PTRS time density table) and include bandwidth allocation thresholds associated with PTRS frequency densities (e.g., a PTRS frequency density table). Each subset may be associated with a bundling parameter, where the bundling parameter corresponds to uplink shared channel repetition, uplink control channel repetition, adjacent slot bundling, multi-slot bundling, multi-segment bundling, contiguous bundling, non-contiguous bundling, or a combination thereof. For example, a first subset may be for use by UE 115-a when DMRS bundling is enabled and when UE 115-a is configured to bundle DMRSs across multiple slots according to a bundling parameter.

The PTRS time densities associated with time density thresholds 230-a of the first set of thresholds 210 may be relatively higher than the corresponding PTRS time densities associated with time density thresholds 230-b of the second set of thresholds 215, such that the PTRS density is increased in the time domain when DMRS bundling is enabled. For example, one or more time densities associated with the first set of thresholds 210 may be higher than one or more of the time densities associated with the second set of thresholds 215. In another example, each time density associated with the first set of thresholds 210 may be higher than any of the time densities associated with the second set of thresholds 215. Additionally or alternatively, the PTRS frequency densities associated with frequency density thresholds 225-a of the first set of thresholds 210 may be relatively higher than the PTRS frequency densities associated with frequency density thresholds 225-b of the second set of thresholds 215, such that the PTRS density is increased in the frequency domain when DMRS bundling is enabled. For example, one or more frequency densities associated with the first set of thresholds 210 may be higher than one or more of the frequency densities associated with the second set of thresholds 215. In another example, each frequency density associated with the first set of thresholds 210 may be higher than any of the frequency densities associated with the second set of thresholds 215. In some cases, the thresholds and/or densities included in the first set of thresholds 210 may be indicated as a differential based on the thresholds and/or densities included in the second set of thresholds 215, respectively, or vice versa. In some cases, the second set of thresholds 215 may include Table 1 and Table 2.

In some cases, due to phase noise properties, PTRSs may be useful (e.g., most useful) to a receiving device in the time domain because time has a relatively higher impact on phase discontinuity than frequency. As such, in some cases, the PTRS density configuration for DMRS bundling enabled and/or bundling disabled may be based on a relatively high PTRS density in the time domain compared to the frequency domain. In some cases, the PTRS frequency densities may be the same for when DMRS is enabled and when DMRS is disabled. In such cases, UE 115-a may be configured with a single set of frequency density thresholds (e.g., bandwidth allocation thresholds) associated with a signal set of PTRS frequency densities for UE 115-a to use to select a PTRS frequency density when DMRS bundling is enabled, and disabled.

In some cases, the frequency density thresholds 225, such as the bandwidth allocation thresholds (e.g., $N_{RB0}$, $N_{RB1}$), may be the same for the first set of thresholds 210 and the second set of thresholds 215. In some cases, the frequency density thresholds 225, such as the bandwidth allocation thresholds, may be different for the first set of thresholds 210 and the second set of thresholds 215, such that the bandwidth allocation thresholds may be based on the DMRS bundling status. For example, $N_{RB0}$ may be the same or different in frequency density thresholds 225-a and 225-b. Similarly, the time density thresholds 230, such as the MCS thresholds (e.g., ptrs-$MCS_1$, ptrs-$MCS_2$, ptrs-$MCS_3$, ptrs-$MCS_4$), may be the same for the first set of thresholds 210 and the second set of thresholds 215. In some cases, the time density thresholds 230, such as the MCS thresholds, may be different for the first set of thresholds 210 and the second set of thresholds 215, such that the MCS thresholds may be based on the DMRS bundling status. For example, ptrs-$MCS_1$ may be the same or different in time density thresholds 230-a and 230-b.

As such, based on a DMRS bundling status, UE 115-a may determine a PTRS density (e.g., time density, frequency density) according to one or more thresholds. In some examples, the thresholds and the corresponding densities associated with the first set of thresholds 210 and the second set of thresholds 215 may be configured by base station 105-a. Base station 105-a may dynamically, semi-persistently, or aperiodically determine each threshold and/or each density associated with the first set of thresholds 210 and the second set of thresholds. In some cases, the thresholds and the corresponding densities associated with the first set of thresholds 210 and the second set of thresholds 215 may be preconfigured. Base station 105-a may transmit an indication of the first set of thresholds 210 (e.g., an indication of a PTRS time density table, and/or an indication of a PTRS frequency density table) to UE 115-a via communications link 205-b. Base station 105-a may transmit an indication of the second set of thresholds 215 (e.g., an indication of a PTRS time density table, and/or an indication of a PTRS frequency density table) to UE 115-a via communications link 205-b. Base station 105-a may transmit the indication of the first set of thresholds 210 and the second set of thresholds 215 via aperiodic, semi-persistent, or dynamic control signaling (e.g., RRC, MAC control element (MAC-CE), downlink control information (DCI)). In some cases, the indication of the first set of thresholds 210 and the indication of the second set of thresholds 215 may be included in the same message, or different messages.

UE 115-a may receive a configuration message that may indicate, or UE 115-a may otherwise determine an uplink transmission configuration such as an MCS value, a bandwidth allocation value, some other transmission parameter, or a combination thereof. UE 115-a may receive a message indicating, or otherwise determine the DMRS bundling status (e.g., enabled, disabled). If DMRS bundling is enabled, UE 115-a may select the first set of thresholds 210. If DMRS bundling is disabled, UE 115-a may select the second set of thresholds 215. Upon selecting a set of thresholds, the UE may compare the MCS value (e.g., $I_{MCS}$) to the set of MCS thresholds (e.g., time density thresholds 230) to select a PTRS time density from the selected first set of thresholds 210 or second set of thresholds 215. Additionally or alternatively, UE 115-a may compare the bandwidth allocation (e.g., $N_{RB}$) to the set of bandwidth allocation thresholds (e.g., frequency density thresholds 225) to select a PTRS frequency density from the selected first set of thresholds 210 or second set of thresholds 215. The UE 115 may map reference signaling (e.g., DMRSs, PTRSs, or both) to a set of resources (e.g., time and frequency resources) based on the PTRS time and/or frequency densities, and the UE 115 may transmit an uplink transmission 220 based on the mapping, where the uplink transmission 220 may include at least the mapped PTRSs, control information, data information, or a combination thereof.

Figure 3:
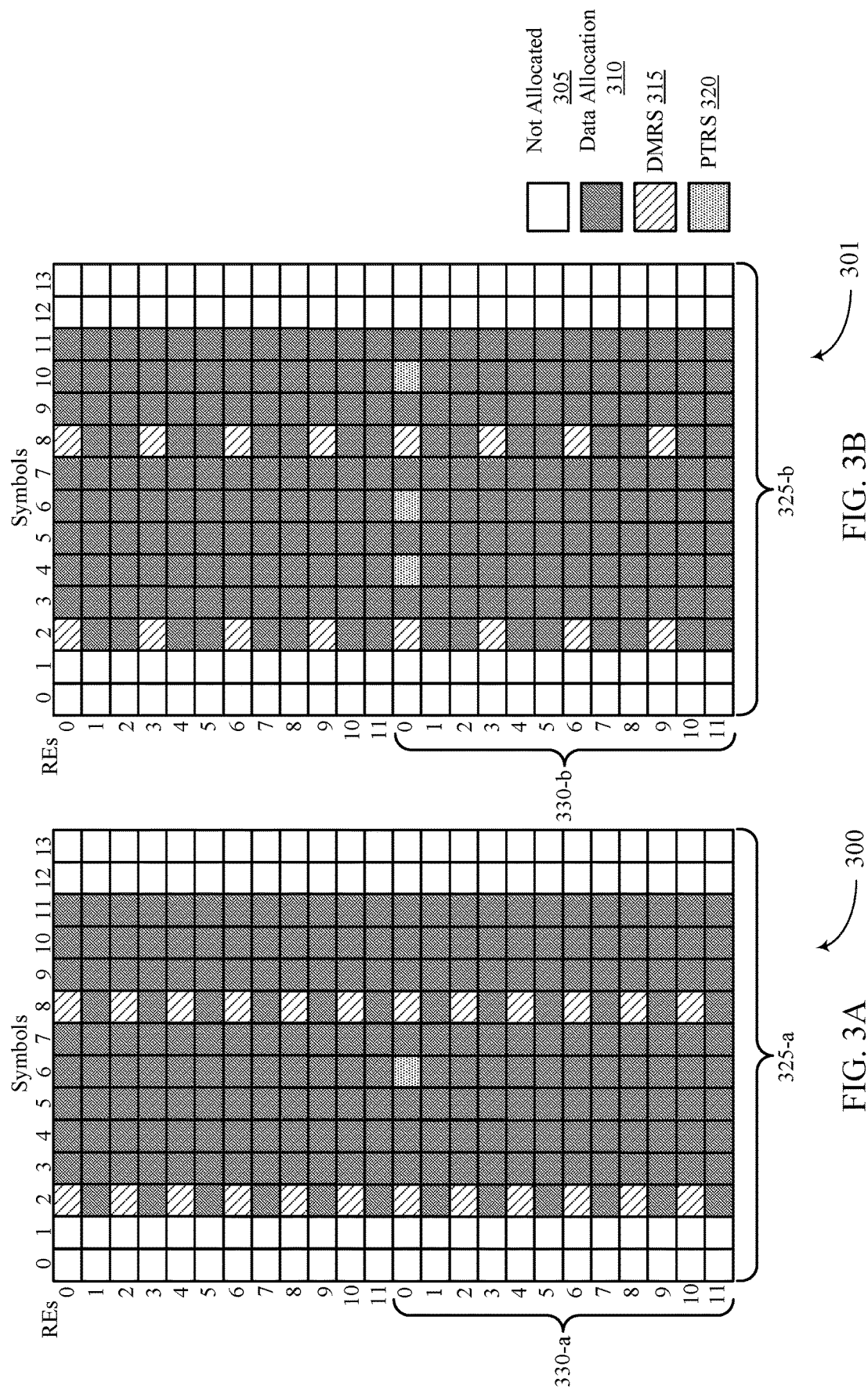
FIGS. 3A and 3B illustrate examples of resource allocations that support techniques for determining PTRS density in accordance with aspects of the present disclosure.

FIGS. 3A and 3B illustrate examples of resource allocations 300 and 301 that support techniques for determining PTRS density in accordance with aspects of the present disclosure. The resources allocations 300 and 301 may be implemented by a base station, or a UE, or both, which may be examples of a base station and a UE as described with reference to FIGS. 1 and 2. In some cases, a base station may implement a PTRS density indication procedure to configure a UE with sets of reference signal thresholds based on a DMRS bundling status. Resource allocations 300 and 301 may be based on the reference signal density indication procedure. Resource allocations 300 and 301 may demonstrate example resource allocations and may include any number of resource elements, and any number of TTIs (e.g., symbols). For example, as depicted in FIGS. 3A and 3B, resource allocations 300 and 301 may each include a slot, such as slot 325-a, and slot 325-b, respectively. Slots 325-a and 325-b may each include symbols 0 through 13. Resource allocations 300 and 301 may each include 24 resource elements, where a set of 12 resource elements (e.g., resource elements 0 through 11) may be referred to as a resource block 330. For example, a first resource block 330-a of resource allocation 300 may include a first set of resource elements 0 through 11 and a second resource block 330-b of resource allocation 301 may include a first set of resource elements 0 through 11.

As described herein, to improve phase continuity maintenance during a DMRS bundling operation, a transmitting device, such as a UE, may be configured with a first set of thresholds (e.g., tables) associated with DMRS bundling being enabled and a second set of thresholds (e.g., tables) associated with DMRS bundling being disabled. As PTRS density in the time and/or frequency domain increases for DMRS bundling being enabled to improve phase continuity maintenance, the reference signal overhead of a resource allocation may increase. For example, the increased PTRSs 320 may be allocated to resource elements that may otherwise be used for information transmission (e.g., control information, date information). As such, reference signal overhead may increase and throughput may decrease. To mitigate reference signal overhead and maintain throughout while increasing PTRS time density and/or PTRS frequency density, a UE may be configured to reduce DMRS density in the time and/or frequency domain. For example, the UE may be configured to reduce the DMRS density in the frequency domain to increase PTRS density in at least the time domain to reduce reference signal overhead.

In some implementations, a UE may receive an indication of, or otherwise identify a DMRS time and/or frequency density, where, in some cases, the DMRS time and/or frequency density may not be based on DMRS bundling being enabled. As such, upon determining that DMRS bundling is enabled, the UE may be configured to reduce the DMRS density in the time and or frequency domain. In some cases, the UE may receive (e.g., via RRC, MAC-CE, DCI), or be configured with a reduction configuration that may indicate a frequency density reduction, or a time density reduction, or both in the case that DMRS bundling is enabled.

In some implementations, similarly to PTRS 320, a UE may receive an indication of a first set of DMRS thresholds and a second set of DMRS thresholds. The first set of DMRS thresholds may be associated with DMRS bundling being enabled and may indicate DMRS time and/or frequency densities according to transmission parameter thresholds, such as MCS, or bandwidth allocation thresholds, or both. The second set of DMRS thresholds may be associated with DMRS bundling being disabled and may indicate DMRS time and/or frequency densities according to transmission parameter thresholds, such as MCS, or bandwidth allocation thresholds, or both.

In some cases, a PTRS signal applicable to a waveform (e.g., an CP-OFDM waveform) may not be configured with its own scrambling configuration. Rather, the PTRS signal may be a repetition of one of the DMRS signals within the data channel, such as a repetition of a subset of the DMRS resource elements of one DMRS port. For example, modulation values associated with first DMRS symbol before applying the Walsh Orthogonal Cover Code (OCC) may be repeated. In a symbol (e.g., an OFDM) containing DMRS, a PTRS may not be inserted but the DMRS observation may be used instead for phase noise estimation. The symbol counting for time domain density may be reset at every DMRS symbol. For example, in the case depicted in FIG. 3A, a DMRS 315 may be allocated to symbol 2, resource element 0 of resource block 330-a, and as such, a PTRS 320 may not be allocated there even if it is in accordance with the configured PTRS density. However, the DMRS 315 located at symbol 2, resource element 0 may be used for phase tracking purposes in the cases that a PTRS 320 was supposed to be allocated in symbol 2, resource element 0. As the DMRS 315 may be used for phase tracking purposes, the symbol counting for PTRS time domain density may be reset at the DMRS 315.

In some examples, FIG. 3A may depict a reference signal mapping to resource elements when DMRS bundling is disabled. For example, a UE (or some other transmitting device, such as a base station) may be configured with the first set of thresholds and the second set of thresholds as described with reference to FIG. 2. The UE may identify one or more transmission parameters (e.g., MCS, bandwidth allocation) associated with transmitting an uplink transmission, for example, and the UE may determine DMRS bundling is disabled. As such, the UE may select at least the PTRS time and frequency densities from the second set of thresholds based on the one or more identified communication parameters and DMRS bundling being disabled. In some cases, the UE may determine a DMRS time and/or frequency density similarly (e.g., from a set of thresholds), or the UE may otherwise determine or receive an indication of the DMRS time and/or frequency density. In some cases, the UE may be configured with or receive an indication of the DMRS resource allocation mapping. The UE may map the PTRSs 320 and DMRSs 315, accordingly. For example, the UE may map the DMRSs 315 in symbols 2 and 8, in every other resource element. The UE may map the PTRSs 320 in symbol 6, resource element 0 of a first resource block 330-a. DMRS 315 of symbol 2, resource element 0 of resource block 330-a (e.g., in-line with the PTRS 320) may count as a PTRS 320 in the PTRS time density. As such, the PTRS time density depicted in FIG. 3A may be four. The UE may map information (e.g., control information, date) to one or more of the resources, resulting in data allocation 310 resources. In some cases, one or more of the resources may not be used for transmission (e.g., left empty), resulting in not allocated 305 resources). The UE may transmit the uplink transmission based on the resource allocation mapping depicted in FIG. 3A.

In some examples, FIG. 3B may depict a reference signal mapping to resource elements when DMRS bundling is enabled. For example, a UE (or some other transmitting device, such as a base station) may be configured with the first set of thresholds and the second set of thresholds as described with reference to FIG. 2. The UE may identify one or more transmission parameters (e.g., MCS, bandwidth allocation) associated with transmitting an uplink transmission, for example, and the UE may determine DMRS bundling is enabled. As such, the UE may select at least the PTRS time and frequency densities from the first set of thresholds based on the one or more identified communication parameters and DMRS bundling being enabled. In some cases, the UE may determine a DMRS time and/or frequency density similarly (e.g., from a set of thresholds), or the UE may otherwise determine or receive an indication of the DMRS time and/or frequency density. In some cases, the UE may be configured with or receive an indication of the DMRS resource allocation mapping. The UE may map the PTRSs 320 and DMRSs 315 accordingly. For example, the UE may map the DMRSs 315 in symbols 2 and 8, in every third resource element. The UE may map the PTRSs 320 in symbols 4, 6, and 10 of resource element 0 (of a first resource block 330-b). DMRS 315 of symbols 2 and 8, of resource element 0 (e.g., in-line with the PTRS 320) may count as a PTRS 320 in the PTRS time density. As such, the PTRS time density depicted in FIG. 3A may be two. Therefore, the PTRS 320 density in the time domain increased and the DMRS 315 density in the frequency domain decreased for DMRS bundling being enabled compared to DMRS bundling being disabled. The UE may map information (e.g., control information, date) to one or more of the resources, resulting in data allocation 310 resources. In some cases, one or more of the resources may not be used for transmission (e.g., left empty), resulting in not allocated 305 resources). The UE may transmit the uplink transmission based on the resource allocation mapping depicted in FIG. 3B.

Figure 4:
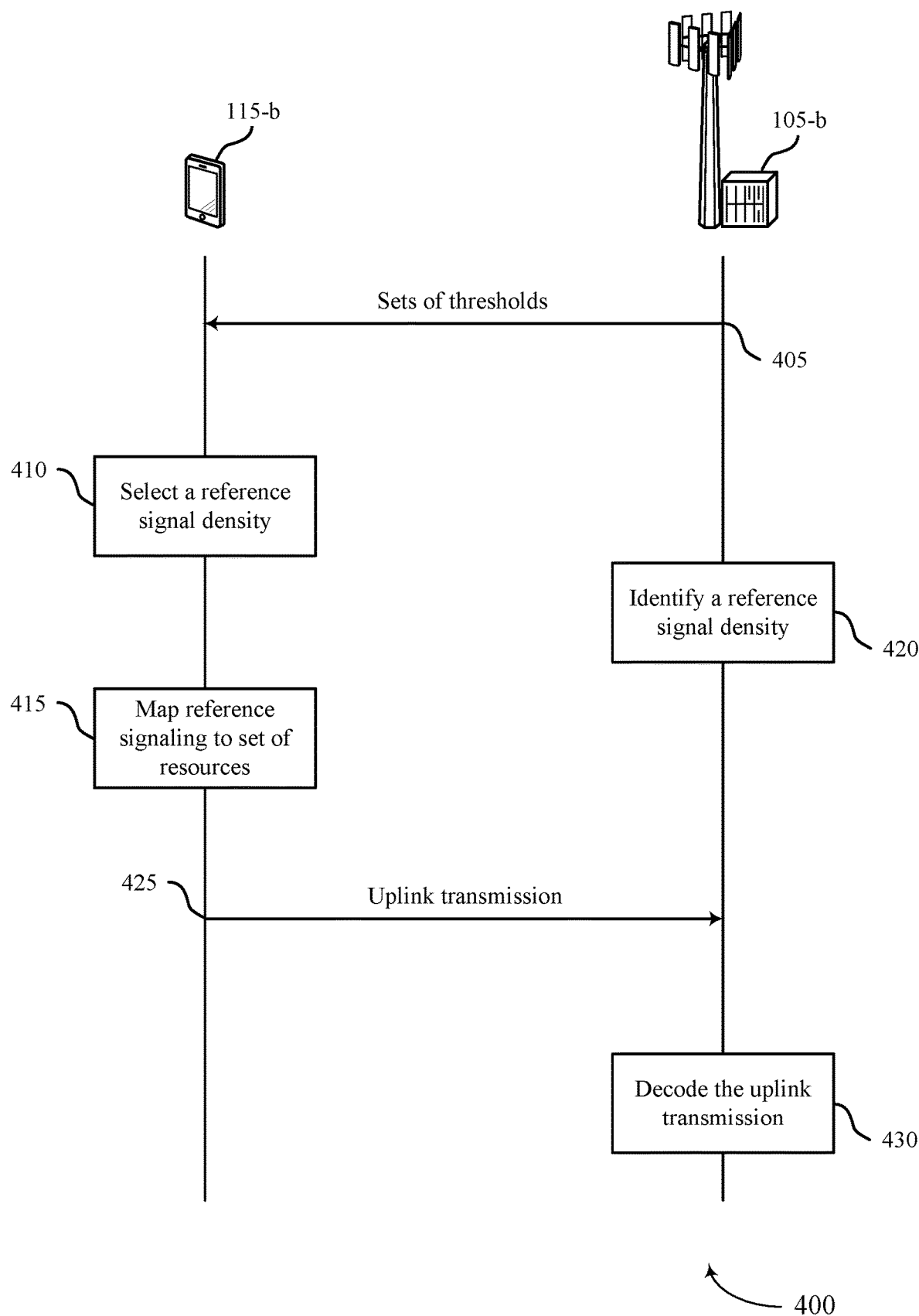
FIG. 4 illustrates an example of a process flow that supports techniques for determining PTRS density in accordance with aspects of the present disclosure.

FIG. 4 illustrates an example of a process flow 400 that supports techniques for determining PTRS density in accordance with aspects of the present disclosure. The process flow 400 may illustrate an example reference signal density determination procedure. For example, base station 105-b may transmit an indication of a set of thresholds associated with reference signal densities that UE 115-b may use to select a reference signal density. Base station 105-b and UE 115-b may be examples of the corresponding wireless devices described with reference to FIGS. 1 through 3. Alternative examples of the following may be implemented, where some steps are performed in a different order than described or are not performed at all. In some cases, steps may include additional features not mentioned below, or further steps may be added.

At 405, UE 115-b may receive, such as from base station 105-b, control signaling (e.g., RRC, DCI, MAC-CE, physical downlink control channel (PDCCH)) indicating a first set of thresholds (e.g., tables) corresponding to a first set of reference signal densities and a second set of thresholds corresponding to a second set of reference signal densities. The first set of thresholds may be associated with uplink DMRS bundling being enabled, and the second set of thresholds may be associated with uplink DMRS bundling being disabled.

At 410, UE 115-b may select a reference signal density from the first set of reference signal densities or the second set of reference signal densities based on an uplink DMRS bundling status (e.g., DMRS bundling enabled, DMRS bundling disabled). In an example, UE 115-b may receive a message indicating that the uplink DMRS bundling status is disabled, and may select the reference signal density from the second set of reference signal densities based on the uplink DMRS bundling status being disabled.

In another example, UE 115-b may receive, such as from base station 105-b, a message indicating that the uplink DMRS bundling status is enabled, and UE 115-b may select the reference signal density from the first set of reference signal densities based on the uplink DMRS bundling status being enabled. In some implementations, UE 115-b may receive an indication of the first set of thresholds, where the first set of thresholds may include a set of modulation and coding scheme thresholds corresponding to a set of PTRS time density values. In some implementations, UE 115-b may receive a configuration message indicating a configuration of the uplink transmission. The configuration message may be a modulation and coding scheme value. UE 115-b may identify a modulation and coding scheme threshold from the set of modulation and coding scheme thresholds based on the modulation and coding scheme value. The selected reference signal density may be based on a PTRS time density value corresponding to the identified modulation and coding scheme threshold.

In some implementations, UE 115-*b* may receive an indication of the first set of thresholds, where the first set of thresholds may include a set of bandwidth allocation thresholds corresponding to a set of frequency density values. UE 115-*b* may receive a configuration message indicating a configuration of the uplink transmission. The configuration message may include a bandwidth allocation value for transmitting the uplink transmission. UE 115-*b* may identify a bandwidth allocation threshold from the set of bandwidth allocation thresholds based on the bandwidth allocation value, where the selected reference signal density may be based on a frequency density value corresponding to the bandwidth allocation threshold.

In some cases, the selected reference signal density may correspond to a PTRS density, and UE 115-*b* may identify a DMRS density based on the PTRS density. For example, the DMRS density may be reduced in the frequency domain based on PTRS density increasing in at least the time domain.

In some cases, UE 115-*b* may receive a plurality of subsets of reference signal thresholds, where each subset of the plurality of subsets may be associated with a bundling parameter of the uplink transmission. UE 115-*b* may select the reference signal density from a subset of reference signal thresholds based on the uplink DMRS bundling status being enabled and the bundling parameter. The bundling parameter may correspond to uplink shared channel repetition, uplink control channel repetition, adjacent slot bundling, multi-slot bundling, multi-segment bundling, contiguous bundling, non-contiguous bundling, or a combination thereof.

In some cases, UE 115-*b* may transmit, such as to base station 105-*b*, an indication of a capability of UE 115-*b* associated with phase continuity maintenance, where the uplink DMRS bundling status may be based on the capability of UE 115-*b*.

At 415, UE 115-*b* may map reference signaling to a set of resources based on the selected reference signal density. The reference signaling may be a DMRS, a PTRS, or both. The first set of reference signal densities and the second set of reference signal densities may include PTRS densities, and where the reference signaling may include PTRS signaling. The first set of reference signal densities and the second set of reference signal densities may include DMRS densities, and where the reference signaling may include DMRS signaling.

At 420, base station 105-*b* may identify a reference signal density from the first set of reference signal densities or the second set of reference signal densities based on an uplink DMRS bundling status.

At 425, UE 115-*b* may transmit an uplink transmission (e.g., PUCCH, PUSCH) based on the mapping.

At 430, base station 105-*b* may decode the uplink transmission based on the identified reference signal density.

Figure 5:
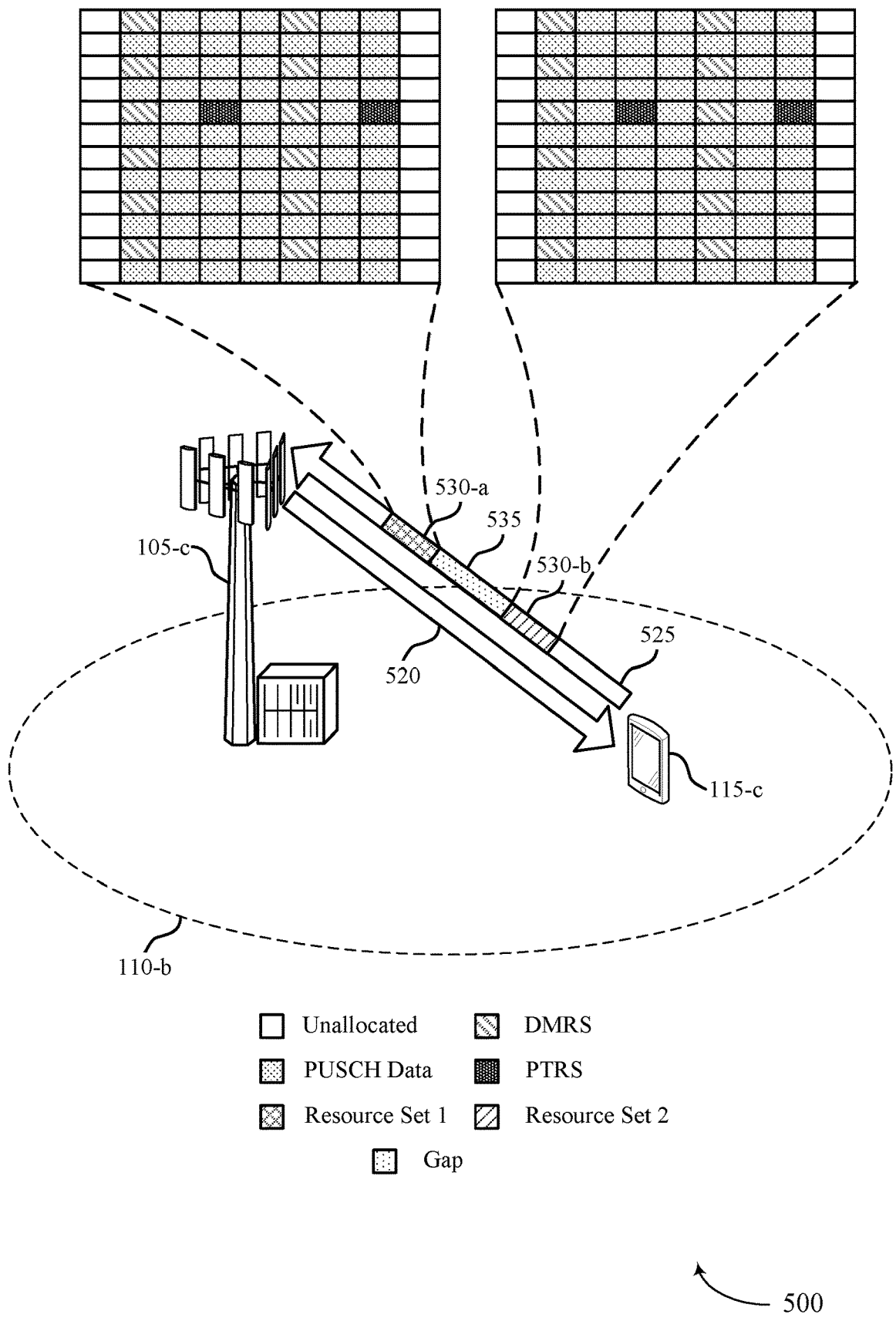
FIG. 5 illustrates an example of a wireless communications system that supports techniques for determining PTRS density in accordance with aspects of the present disclosure.

FIG. 5 illustrates an example of a wireless communications system 500 that supports techniques for determining PTRS density in accordance with aspects of the present disclosure. The wireless communications system 500 may implement aspects of wireless communications system 100 and wireless communications system 200 as described with reference to FIGS. 1 and 2. The wireless communications system 500 may include a UE 115-*c* which may be an example of a UE 115 as described with reference to FIG. 1. The wireless communications system 500 may also include a base station 105-*c* which may be an example of a base station 105 as described with reference to FIG. 1. The base station 105-*c* may be associated with a cell providing wireless communication services within a coverage area 110-*b*. Accordingly, the base station 105-*c* may share information with the UE 115-*c* via a downlink channel 520 and the UE 115-*c* may share information with the base station 105-*c* via the uplink channel 525. In some examples, the wireless communications system 500 may implement PTRSs to mitigate effects of phase discontinuity that may occur between transmissions with a time-domain gap.

For example, the UE 115-*c* or the base station 105-*c* may be configured for shared channel or control channel repetition such that the UE 115-*c* or the base station 105-*c* may transmit multiple repetitions of signaling. In some cases, shared channel repetitions or control channel repetitions may be scheduled to be separated by a time domain gap between two or more of the repetitions. In some cases, channel conditions or conditions at the UE 115-*c* or the base station 105-*c* may change such that some repetitions experience different phase characteristics. In some cases, a receiving device may be unable to perform joint channel estimation using DMRS bundling in the presence of phase discontinuities or phase jumps above a threshold. Implementing a PTRS may enable a receiving device to determine phase characteristics associated with each repetition of a shared channel or control channel transmission such that the receiving device may mitigate the effects of any phase discontinuity. Accordingly, the base station 105-*c* or the UE 115-*c* may perform joint channel estimation (e.g., DMRS bundling) based on PTRS configurations in the wireless communication system 500.

For example, the UE 115-*c* may determine a set of shared channel resources 530-*a* and a set of shared channel resources 530-*b* for transmitting an uplink message including DMRSs and PTRSs. In some implementations, the set of shared channel resources 530-*b* may be a repetition of the set of shared channel resources 530-*a*. In some examples, the UE 115-*c* may use a PTRS configuration which defines parameters associated with transmitting the PTRS in the set of shared channel resources 530-*a* and the set of shared channel resources 530-*b*. For example, the PTRS configuration may indicate a time or frequency density for the PTRS in the set of shared channel resources 530-*a* or the set of shared channel resources 530-*b*. In some implementations, a time density may determine how many symbols a PTRS occupies (e.g., every second, every fourth, etc.) in a slot. Similarly, a frequency density may determine how many resource blocks (e.g., every second, every fourth, etc.) in which a PTRS occupies a subcarrier in a frequency domain. In some examples, the UE 115-*c* may identify the PTRS configuration or a DMRS configuration based on determining to support DMRS bundling for shared channel transmissions. For example, if the UE 115-*c* determines to support DMRS bundling, the UE 115-*c* may transmit a DMRS in the set of shared channel resources 530-*a* with a same cover code as a DMRS in the set of shared channel resources 530-*b*.

In the example of FIG. 5, the PTRS may have a frequency density of one subcarrier per resource block and a time density of every second symbol. In some implementations, time domain density may include symbols containing a DMRS such that symbols which the PTRS occupies are counted from symbols containing a DMRS (e.g., symbol-counting is reset at each instance of the DMRS). The UE 115-*c* may transmit one or more PTRSs and DMRSs (e.g., including at least a first PTRS and a first DMRS) using the set of shared channel resources 530-*a* and one or more PTRSs and DMRSs (e.g., including at least a second PTRS and a second DMRS) using the set of shared channel resources 530-*b*.

The base station 105-*c* may receive the first and second DMRSs and the first and second PTRSs using the set of shared channel resources 530-*a* and the set of shared channel resources 530-*b*. The base station 105-*c* may determine whether to perform joint channel estimation using both the first and second DMRSs based on a PTRS configuration associated with the first and second PTRSs. For example, the base station 105-*c* may determine that a parameter of the PTRS configuration (e.g., a time or frequency density) satisfies a threshold such that the base station 105-*c* can perform joint channel estimation. The base station 105-*c* may perform joint channel estimation for the first set of shared channel resources 530-*a* and the second set of shared channel resources 530-*b* using the DMRS transmitted in both sets of shared channel resources 530. The base station 105-*c* may maintain a phase continuity across the sets of shared channel resources 530 based on the PTRS transmitted in the resources, which may enable coherent joint channel estimation. For example, the joint channel estimation may be coherent despite a gap 535 between the sets of shared channel resources 530, which may affect phase characteristics of the transmissions.

In some examples, if the time or frequency density of the PTRS satisfies a threshold, the base station 105-*c* may perform joint channel estimation even if the UE 115-*c* has a transmission continuity capability (e.g., a power continuity or accuracy capability or a phase continuity capability) that does not satisfy a capability threshold (e.g., is low). In some implementations, the threshold time or frequency density of the PTRS may be based on a subcarrier spacing or a radio frequency spectrum band of the set of shared channel resources 530-*a* or the set of shared channel resources 530-*b*. For example, the threshold time or frequency density of the PTRS may be different if the set of shared channel resources 530-*a* or the set of shared channel resources 530-*b* uses a high subcarrier spacing (e.g., 120 kHz) than the threshold if the set of shared channel resources 530-*a* or the set of shared channel resources 530-*b* uses a low subcarrier spacing (e.g., 15 kHz) due to a differenced in lengths of symbols associated with different subcarrier spacings.

In some implementations, the threshold time or frequency density of the PTRS may be based on a modulation and coding scheme of the set of shared channel resources 530-*a* or the set of shared channel resources 530-*b*. For example, if the set of shared channel resources 530-*a* or the set of shared channel resources 530-*b* uses a low modulation order or coding scheme (e.g., a low rate scheme such as quadrature phase shift keying (QPSK) a low time or frequency density of PTRS may be sufficient to mitigate phase discontinuity. Similarly, if the set of shared channel resources 530-*a* or the set of shared channel resources 530-*b* uses a high modulation order or coding scheme (e.g., a high rate quadrature amplitude modulation (QAM) such as 16-QAM or 256-QAM) then the UE 115-*c* may use a high time or frequency density for PTRS to mitigate phase discontinuity. In some implementations, if the set of shared channel resources 530-*a* or the set of shared channel resources 530-*b* uses a modulation order or coding scheme above a threshold, the base station 105-*c* may be unable to perform DMRS bundling regardless of a time or frequency density of PTRS.

In some cases, the sets of shared channel resources 530 may be scheduled with a gap 535 (e.g., a timing gap) between the set of shared channel resources 530-*a* and the set of shared channel resources 530-*b*. The gap 535 may be used for other signaling. For example, the gap 535 may be scheduled for other types of uplink signaling (e.g., a sounding reference signal transmission by the UE 115-*c*), or resources corresponding the gap 535 may be scheduled for downlink signaling.

In some cases, channel conditions or conditions at the UE 115-*c* may change during the gap 535 such that phase characteristics associated with the set of shared channel resources 530-*a* differ from phase characteristics associated with the set of shared channel resources 530-*b*. The base station 105-*c* may perform joint channel estimation using DMRS bundling based on the PTRS configuration even if there exists a transmission or reception gap between the set of shared channel resources 530-*a* or the set of shared channel resources 530-*b*. For example, if the UE 115-*a* transmits signaling subsequent to the set of shared channel resources 530-*a* and prior to the set of shared channel resources 530-*b* (e.g., in the gap 535), the base station 105-*c* may perform joint channel estimation if a time or frequency density of the PTRS satisfies a threshold. Similarly, if the base station 105-*c* transmits signaling subsequent to receiving signaling using the set of shared channel resources 530-*a* and prior to receiving signaling using the set of shared channel resources 530-*b* (e.g., in the gap 535), the base station 105-*c* may perform joint channel estimation if a time or frequency density of the PTRS satisfies the threshold.

It is noted that although described with reference to a UE 115-*c* operating as a transmitting device and a base station 105-*c* operating as a receiving device, the roles of the device may be reversed such that the base station 105-*c* transmits the DMRS and the PTRS using downlink shared channel resources and the UE 115-*c* performs joint channel estimation accordingly. Implementing various aspects of the present disclosure may enable improved support for joint channel estimation (e.g., DMRS bundling) in the wireless communication system 500 such that the wireless communication system 500 may exhibit an increased efficiency or reliability, among other benefits.

Figure 6:
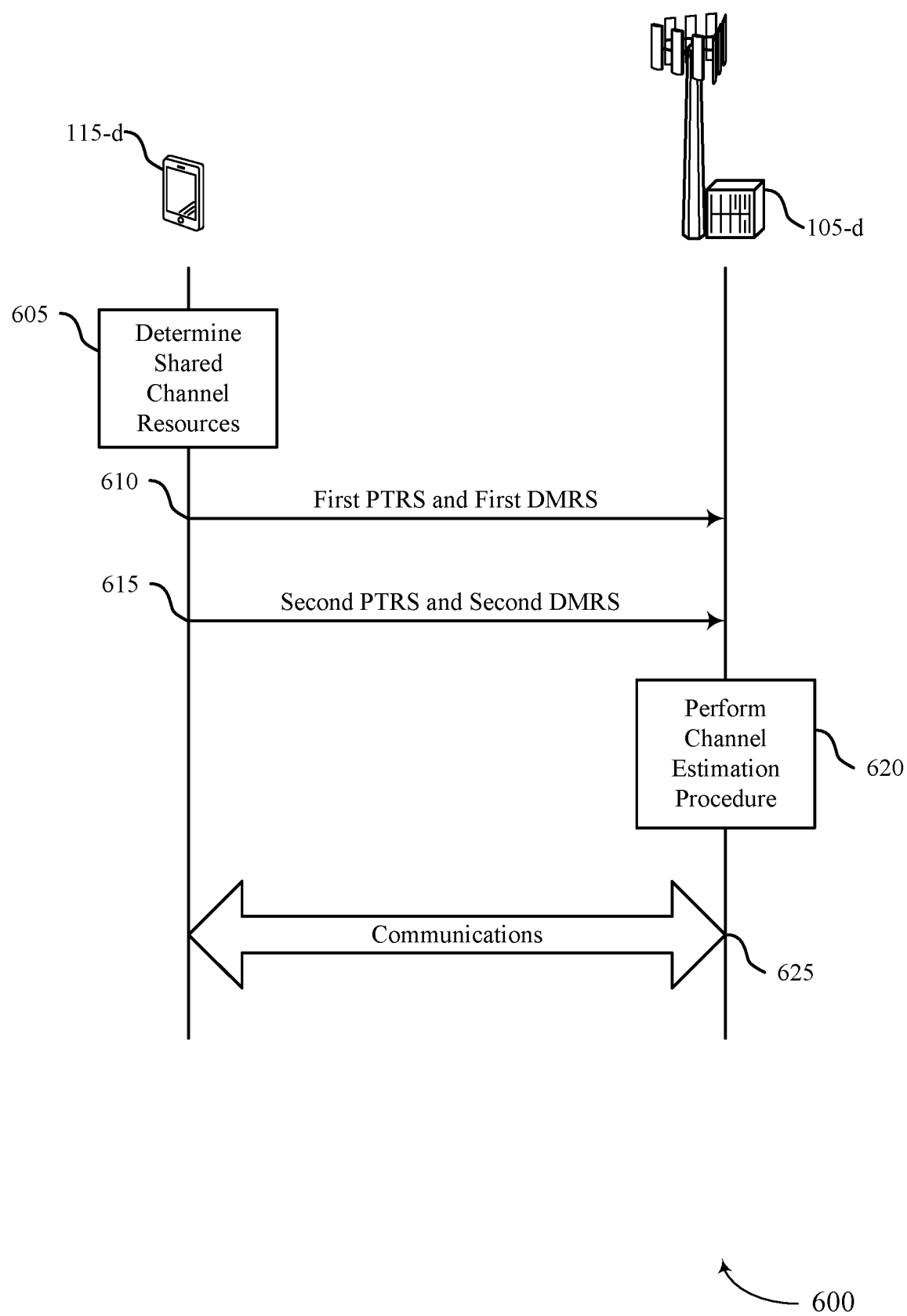
FIG. 6 illustrates an example of a process flow that supports techniques for determining PTRS density in accordance with aspects of the present disclosure.

FIG. 6 illustrates an example of a process flow 600 that supports techniques for determining PTRS density in accordance with aspects of the present disclosure. In some examples, the process flow 600 may be implemented in accordance with aspects of a wireless communications system 100, 200, or 500 as described with reference to FIGS. 1, 2, and 5. The process flow 600 may include a UE 115-*d* and a base station 105-*d* which may be examples of the corresponding devices described herein. Alternative examples of the following may be implemented in which some processes are performed in a different order than described or are not performed at all. In some examples, the processes may include additional features not mentioned below, or further processes may be added.

In some cases, the UE 115-*d* may be configured for shared channel repetition. For example, the UE 115-*d* may be scheduled with multiple sets of uplink shared channel resources, and the UE 115-*d* may transmit repetitions of an uplink shared channel message to the base station 105-*d* using the multiple sets of uplink shared channel resources. In some cases, the sets of uplink shared channel resources may be scheduled with a time domain gap between two or more of the sets of uplink shared channel resources. The UE 115-*d* and the base station 105-*d* may implement techniques to perform DMRS bundling for the uplink shared channel repetitions using PTRS to maintain phase continuity across the repetitions. The base station 105-*d* may perform joint channel estimation on the DMRS in the uplink shared channel transmission repetitions, using the PTRS in the repetitions to maintain phase continuity. Although some aspects of the present disclosure are described in the context of uplink shared channel repetition (e.g., PUSCH repetition or PDSCH repetition), these techniques may be implemented to support DMRS bundling for other types of signaling as well, such as PUSCH and PDSCH signaling which is not configured for repetition or control signaling (e.g., PUCCH or PDCCH repetition), among others.

At 605, the UE 115-d may determine shared channel resources for transmitting signaling to the base station 105-d, including DMRSs and PTRSs. For example, the UE 115-d may determine a first set of shared channel resources (e.g., PUSCH resources) for transmitting a first DMRS and a first PTRS and a second set of shared channel resources for transmitting a second DMRS and a second PTRS. For example, the UE 115-d may be configured for shared channel or control channel repetition such that the first and second sets of shared channel resources include multiple repetitions of a transmission. There may be a gap (e.g., a time domain gap) scheduled between the first and second sets of shared channel resources, which may be used for other uplink or downlink signaling. In some examples, the UE 115-d may transmit or receive signaling during the gap, or not be scheduled for communications during the gap, such that the first and second sets of shared channel resources are not consecutive. Accordingly, the UE 115-d may transmit the first and second PTRSs to mitigate the effects of any difference in phase characteristics between the first and second sets of resources and to enable joint channel estimation across the first and second set of shared channel resources at the base station 105-d.

At 610, the UE 115-d may transmit the first DMRS and the first PTRS to the base station 105-d using the first set of shared channel resources. Similarly, at 615, the UE 115-d may transmit the second DMRS and the second PTRS to the base station 105-d using the second set of shared channel resources. In some examples, the UE 115-d may transmit the first and second DMRSs using a same cover code if the UE 115-d determines to support DMRS bundling. In some implementations, the UE 115-d may determine a configuration of the PTRS or DMRS based on determining to support DMRS bundling. For example, the UE 115-d may determine a phase continuity or coherence between transmissions that will enable the base station 105-d to perform joint channel estimation using DMRS bundling. Accordingly, the UE 115-d may determine a DMRS or PTRS configuration (e.g., PTRS density) such that multiple transmissions will maintain the phase continuity or coherence.

At 620, the base station 105-d may perform a channel estimation procedure based on receiving the first and second DMRSs and the first and second PTRSs from the UE 115-d. For example, the base station 105-d may determine to perform a joint channel estimation procedure (e.g., DMRS bundling) based on a PTRS configuration associated with the first and second PTRSs (e.g., if a time or frequency density of the PTRS satisfies a threshold). In some examples, the base station 105-d may determine to perform the joint channel estimation procedure based on the PTRS configuration even if the UE 115-d exhibits a low transmission continuity capability or a low phase continuity capability (e.g., exhibits large phase differences between transmissions). In some implementations, the joint channel estimation procedure may include the base station 105-b using both the first DMRS and the second DMRS to determine an estimate of a channel between the base station 105-d and the UE 115-d.

At 625, the base station 105-d and the UE 115-d may communicate based on the channel estimate obtained by the base station 105-d. It is noted that, while described with respect to the UE 115-d operating as a transmitting device and the base station 105-d operating as a receiving device, the techniques of the present disclosure may be implemented such that the base station 105-d transmits the DMRSs and PTRSs using shared channel resources and the UE 115-d performs joint channel estimation accordingly. Implementing various aspects of the present disclosure may enable improved support for DMRS bundling in wireless communication systems, which may lead to an increased efficiency or reliability, among other benefits.

Figure 7:
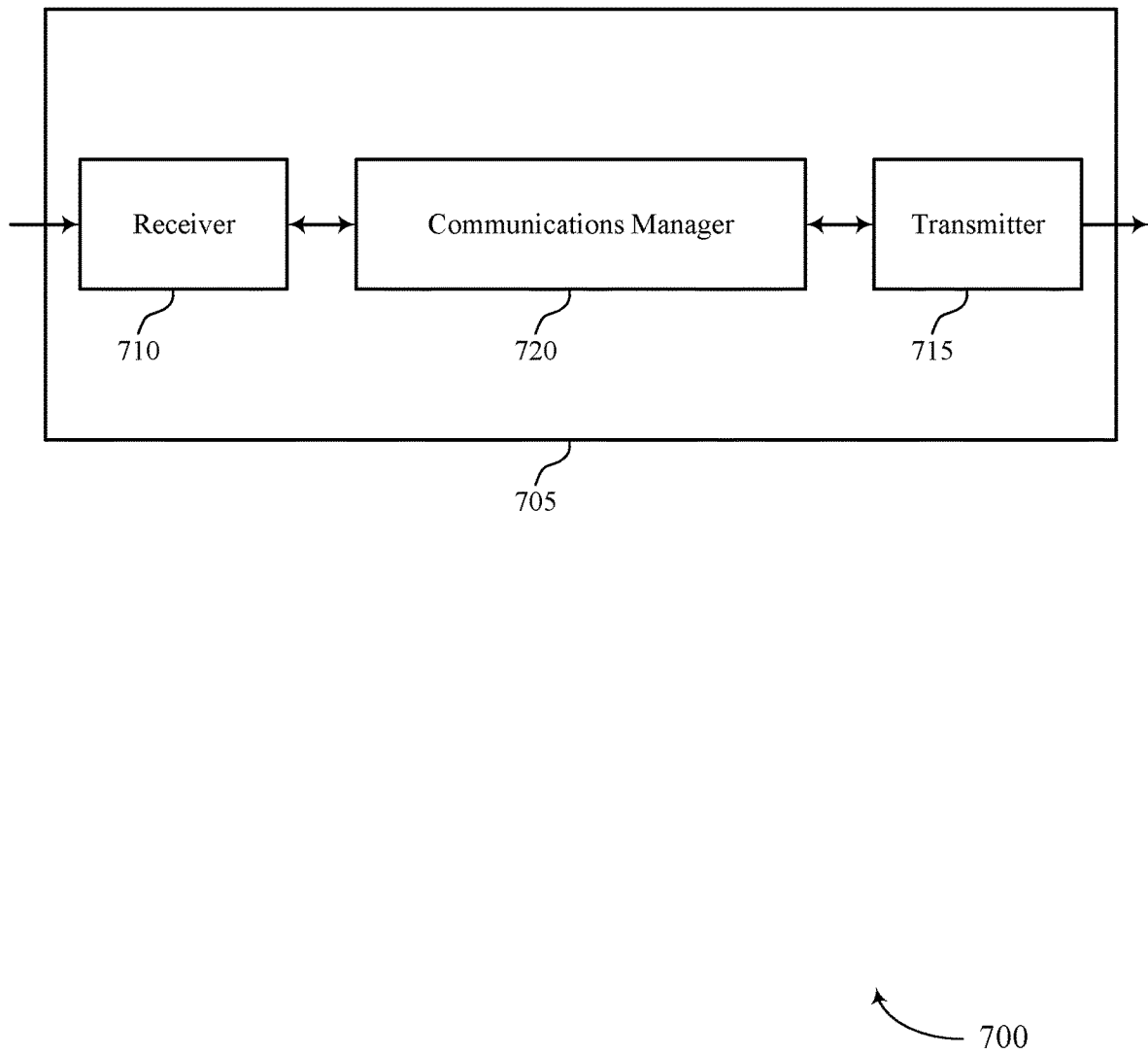
FIGS. 7 and 8 show block diagrams of devices that support techniques for determining PTRS density in accordance with aspects of the present disclosure.

FIG. 7 shows a block diagram 700 of a device 705 that supports techniques for determining PTRS density in accordance with aspects of the present disclosure. The device 705 may be an example of aspects of a UE 115 as described herein. The device 705 may include a receiver 710, a transmitter 715, and a communications manager 720. The device 705 may also include at least one processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for determining PTRS density). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for determining PTRS density). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of techniques for determining PTRS density as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include at least one processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, at least one processor and memory coupled with the at least one processor may be configured to perform one or more of the functions described herein (e.g., by executing, by the at least one processor, instructions stored in the memory).

Additionally or alternatively, in some examples, the communications manager 720, the receiver 710, the transmitter 715, or various combinations or components thereof may be implemented in code (e.g., as communications management software or firmware) executed by at least one processor. If implemented in code executed by at least one processor, the functions of the communications manager 720, the receiver 710, the transmitter 715, or various combinations or components thereof may be performed by a general-purpose processor, a digital signal processor (DSP), a central processing unit (CPU), an supplication-specific integrated circuit (ASIC), a field programmable gate array (FPGA), or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. For example, the communications manager 720 may be configured as or otherwise support a means for receiving control signaling indicating a first set of thresholds corresponding to a first set of reference signal densities and a second set of thresholds corresponding to a second set of reference signal densities, where the first set of thresholds is associated with uplink DMRS bundling being enabled, and the second set of thresholds is associated with uplink DMRS bundling being disabled. The communications manager 720 may be configured as or otherwise support a means for selecting a reference signal density from the first set of reference signal densities or the second set of reference signal densities based on an uplink DMRS bundling status. The communications manager 720 may be configured as or otherwise support a means for mapping reference signaling to a set of resources based on the reference signal density, the reference signaling including a DMRS, a PTRS, or both. The communications manager 720 may be configured as or otherwise support a means for transmitting an uplink transmission based on the mapping.

Additionally or alternatively, the communications manager 720 may support wireless communication in accordance with examples as disclosed herein. For example, the communications manager 720 may be configured as or otherwise support a means for determining, based on a PTRS configuration, a first set of physical shared channel resources for transmitting a first DMRS and a first PTRS and a second set of physical shared channel resources for transmitting a second DMRS and a second PTRS. The communications manager 720 may be configured as or otherwise support a means for transmitting, using the first set of physical shared channel resources, the first PTRS and the first DMRS including a cover code. The communications manager 720 may be configured as or otherwise support a means for transmitting, using the second set of physical shared channel resources, the second PTRS and the second DMRS including the cover code.

By including or configuring the communications manager 720 in accordance with examples as described herein, the device 705 (e.g., at least one processor controlling or otherwise coupled to the receiver 710, the transmitter 715, the communications manager 720, or a combination thereof) may support techniques for more efficient utilization of communication resources.

Figure 8:
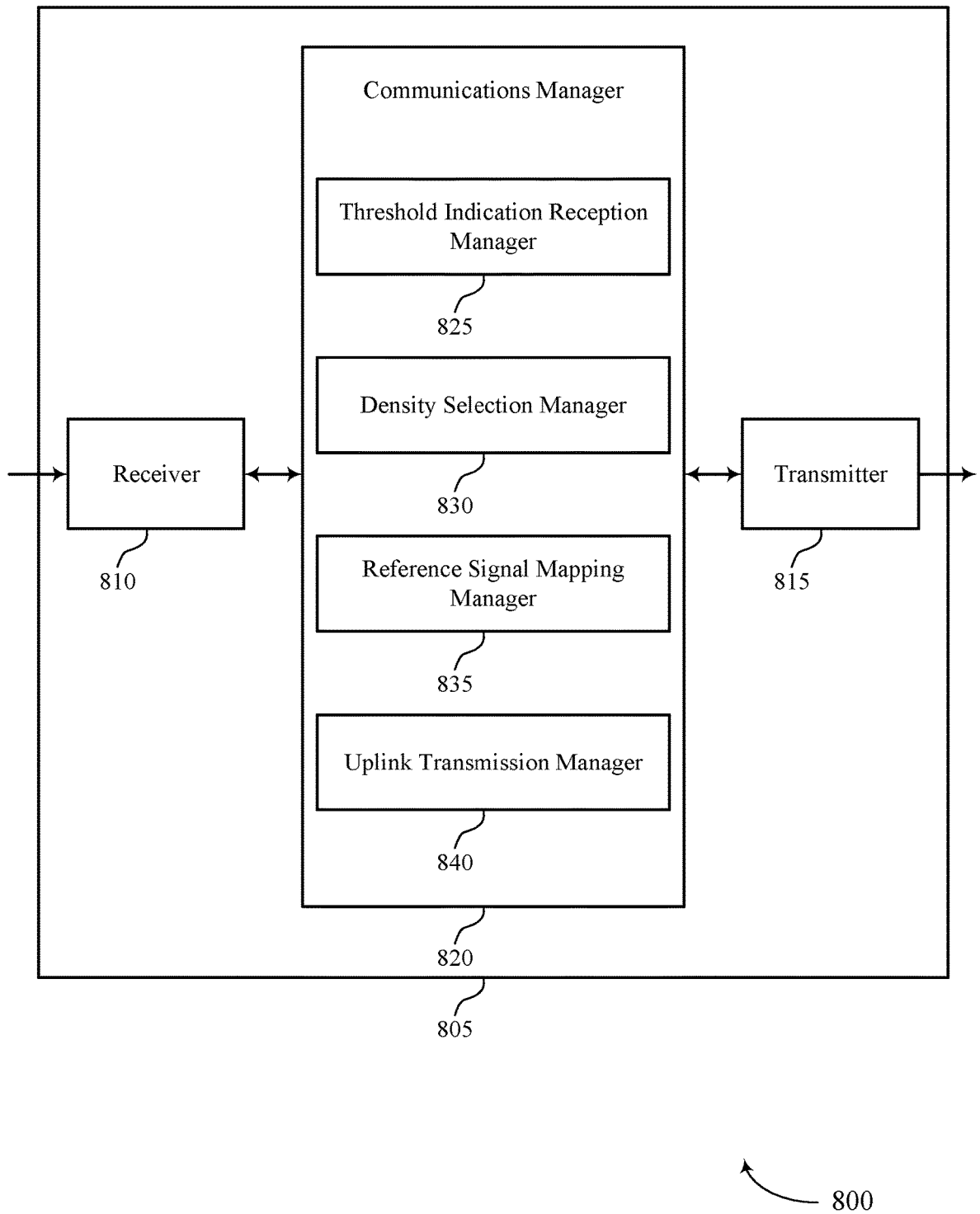

FIG. 8 shows a block diagram 800 of a device 805 that supports techniques for determining PTRS density in accordance with aspects of the present disclosure. The device 805 may be an example of aspects of a device 705 or a UE 115 as described herein. The device 805 may include a receiver 810, a transmitter 815, and a communications manager 820. The device 805 may also include at least one processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for determining PTRS density). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for determining PTRS density). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of techniques for determining PTRS density as described herein. For example, the communications manager 820 may include a threshold indication reception manager 825, a density selection manager 830, a reference signal mapping manager 835, an uplink transmission manager 840, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a UE in accordance with examples as disclosed herein. The threshold indication reception manager 825 may be configured as or otherwise support a means for receiving control signaling indicating a first set of thresholds corresponding to a first set of reference signal densities and a second set of thresholds corresponding to a second set of reference signal densities, where the first set of thresholds is associated with uplink DMRS bundling being enabled, and the second set of thresholds is associated with uplink DMRS bundling being disabled. The density selection manager 830 may be configured as or otherwise support a means for selecting a reference signal density from the first set of reference signal densities or the second set of reference signal densities based on an uplink DMRS bundling status. The reference signal mapping manager 835 may be configured as or otherwise support a means for mapping reference signaling to a set of resources based on the reference signal density, the reference signaling including a DMRS, a PTRS, or both. The uplink transmission manager 840 may be configured as or otherwise support a means for transmitting an uplink transmission based on the mapping.

Additionally or alternatively, the communications manager 820 may support wireless communication in accordance with examples as disclosed herein. The communications manager 820 may be configured as or otherwise support a means for determining, based on a PTRS configuration, a first set of physical shared channel resources for transmitting a first DMRS and a first PTRS and a second set of physical shared channel resources for transmitting a second DMRS and a second PTRS. The communications manager 820 may be configured as or otherwise support a means for transmitting, using the first set of physical shared channel resources, the first PTRS and the first DMRS including a cover code. The communications manager 820 may be configured as or otherwise support a means for transmitting, using the second set of physical shared channel resources, the second PTRS and the second DMRS including the cover code.

Figure 9:
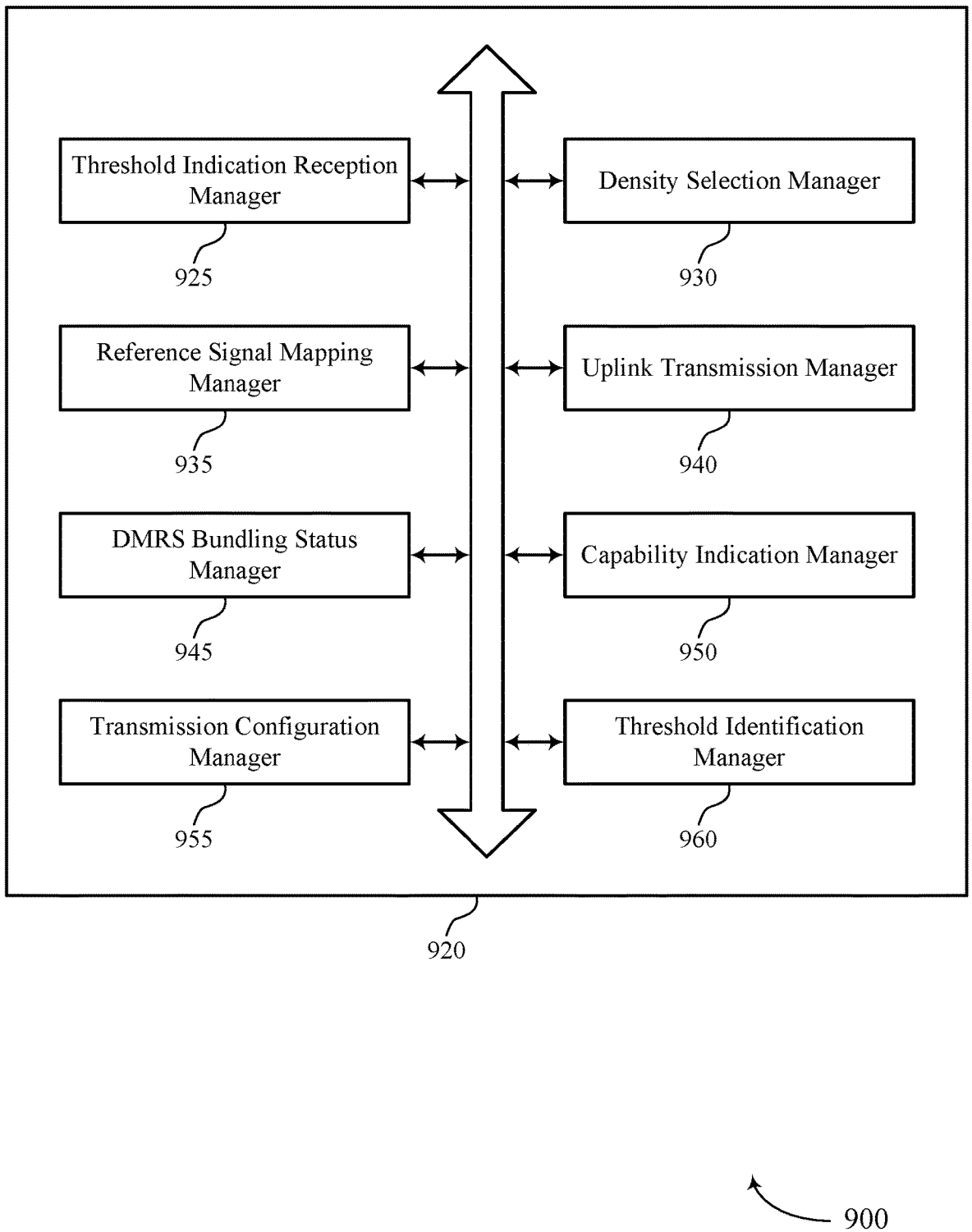
FIG. 9 shows a block diagram of a communications manager that supports techniques for determining PTRS density in accordance with aspects of the present disclosure.

FIG. 9 shows a block diagram 900 of a communications manager 920 that supports techniques for determining PTRS density in accordance with aspects of the present disclosure. The communications manager 920 may be an example of aspects of a communications manager 720, a communications manager 820, or both, as described herein. The communications manager 920, or various components thereof, may be an example of means for performing various aspects of techniques for determining PTRS density as described herein. For example, the communications manager 920 may include a threshold indication reception manager 925, a density selection manager 930, a reference signal mapping manager 935, an uplink transmission manager 940, a DMRS bundling status manager 945, a capability indication manager 950, a transmission configuration manager 955, a threshold identification manager 960, or any combination thereof. Each of these components may communicate, directly or indirectly, with one another (e.g., via one or more buses).

The communications manager 920 may support wireless communications at a UE in accordance with examples as disclosed herein. The threshold indication reception manager 925 may be configured as or otherwise support a means for receiving control signaling indicating a first set of thresholds corresponding to a first set of reference signal densities and a second set of thresholds corresponding to a second set of reference signal densities, where the first set of thresholds is associated with uplink DMRS bundling being enabled, and the second set of thresholds is associated with uplink DMRS bundling being disabled. The density selection manager 930 may be configured as or otherwise support a means for selecting a reference signal density from the first set of reference signal densities or the second set of reference signal densities based on an uplink DMRS bundling status. The reference signal mapping manager 935 may be configured as or otherwise support a means for mapping reference signaling to a set of resources based on the reference signal density, the reference signaling including a DMRS, a PTRS, or both. The uplink transmission manager 940 may be configured as or otherwise support a means for transmitting an uplink transmission based on the mapping.

In some examples, the DMRS bundling status manager 945 may be configured as or otherwise support a means for receiving a message indicating that the uplink DMRS bundling status is enabled. In some examples, the density selection manager 930 may be configured as or otherwise support a means for selecting the reference signal density from the first set of reference signal densities based on the uplink DMRS bundling status being enabled.

In some examples, to support receiving the control signaling indicating the first set of thresholds, the threshold indication reception manager 925 may be configured as or otherwise support a means for receiving an indication of the first set of thresholds, where the first set of thresholds includes a set of modulation and coding scheme thresholds corresponding to a set of PTRS time density values.

In some examples, the transmission configuration manager 955 may be configured as or otherwise support a means for receiving a configuration message indicating a configuration of the uplink transmission, the configuration message including a modulation and coding scheme value. In some examples, the threshold identification manager 960 may be configured as or otherwise support a means for identifying a modulation and coding scheme threshold from the set of modulation and coding scheme thresholds based on the modulation and coding scheme value, where the reference signal density is based on a PTRS time density value corresponding to the identified modulation and coding scheme threshold.

In some examples, to support receiving the control signaling indicating the first set of thresholds, the threshold indication reception manager 925 may be configured as or otherwise support a means for receiving an indication of the first set of thresholds, where the first set of thresholds includes a set of bandwidth allocation thresholds corresponding to a set of frequency density values.

In some examples, the transmission configuration manager 955 may be configured as or otherwise support a means for receiving a configuration message indicating a configuration of the uplink transmission, the configuration message including a bandwidth allocation value for transmitting the uplink transmission. In some examples, the threshold identification manager 960 may be configured as or otherwise support a means for identifying a bandwidth allocation threshold from the set of bandwidth allocation thresholds based on the bandwidth allocation value, where the reference signal density is based on a frequency density value corresponding to the bandwidth allocation threshold.

In some examples, the DMRS bundling status manager 945 may be configured as or otherwise support a means for receiving a message indicating that the uplink DMRS bundling status is disabled. In some examples, the density selection manager 930 may be configured as or otherwise support a means for selecting the reference signal density from the second set of reference signal densities based on the uplink DMRS bundling status being disabled.

In some examples, the reference signal density corresponds to a PTRS density, and the density selection manager 930 may be configured as or otherwise support a means for identifying a DMRS density based on the PTRS density.

In some examples, to support receiving the control signaling indicating the first set of thresholds, the threshold indication reception manager 925 may be configured as or otherwise support a means for receiving a set of multiple subsets of reference signal thresholds, each subset of the set of multiple subsets associated with a bundling parameter of the uplink transmission. In some examples, to support receiving the control signaling indicating the first set of thresholds, the density selection manager 930 may be configured as or otherwise support a means for selecting the reference signal density from a subset of reference signal thresholds based on the uplink DMRS bundling status being enabled and the bundling parameter.

In some examples, the bundling parameter corresponds to uplink shared channel repetition, uplink control channel repetition, adjacent slot bundling, multi-slot bundling, multi-segment bundling, contiguous bundling, non-contiguous bundling, or a combination thereof.

In some examples, the capability indication manager 950 may be configured as or otherwise support a means for transmitting an indication of a capability of the UE associated with phase continuity maintenance, where the uplink DMRS bundling status is based on the capability of the UE.

In some examples, the first set of reference signal densities and the second set of reference signal densities include PTRS densities. In some examples, the reference signaling includes PTRS signaling.

In some examples, the first set of reference signal densities and the second set of reference signal densities include DMRS densities. In some examples, the reference signaling includes DMRS signaling.

Figure 10:
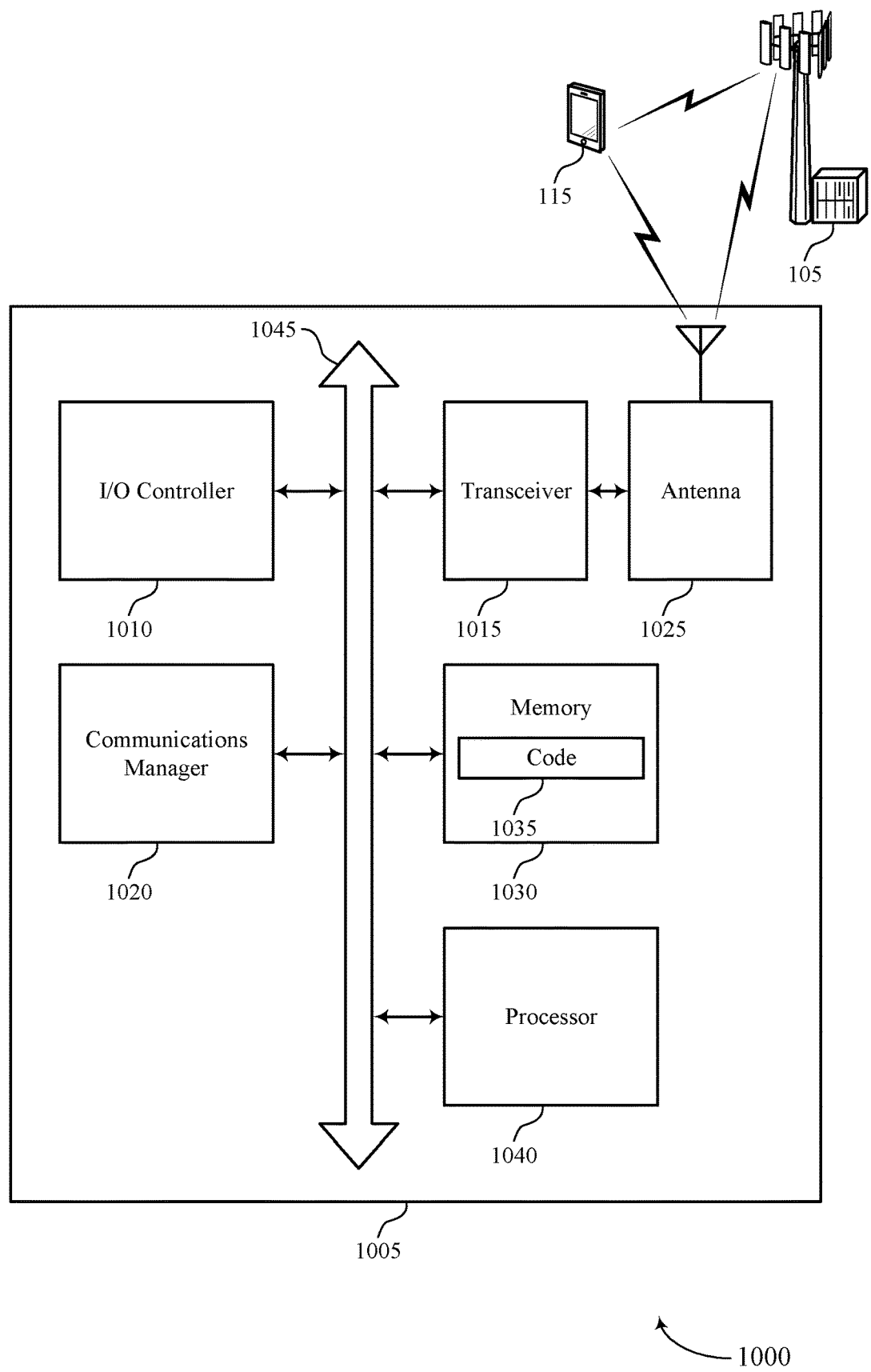
FIG. 10 shows a diagram of a system including a device that supports techniques for determining PTRS density in accordance with aspects of the present disclosure.

FIG. 10 shows a diagram of a system 1000 including a device 1005 that supports techniques for determining PTRS density in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and at least one processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of at least one processor, such as the at least one processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the at least one processor 1040, cause the device 1005 to perform various functions described herein. The code 1035 may be stored in a non-transitory computer-readable medium such as system memory or another type of memory. In some cases, the code 1035 may not be directly executable by the at least one processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The at least one processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 1040 may be configured to operate a memory array using a memory controller. In some other cases, a memory controller may be integrated into the at least one processor 1040. The at least one processor 1040 may be configured to execute computer-readable instructions stored in a memory (e.g., the memory 1030) to cause the device 1005 to perform various functions (e.g., functions or tasks supporting techniques for determining PTRS density). For example, the device 1005 or a component of the device 1005 may include at least one processor 1040 and memory 1030 coupled to the at least one processor 1040, the at least one processor 1040 and memory 1030 configured to perform various functions described herein.

The communications manager 1020 may support wireless communications at a UE in accordance with examples as disclosed herein. For example, the communications manager 1020 may be configured as or otherwise support a means for receiving control signaling indicating a first set of thresholds corresponding to a first set of reference signal densities and a second set of thresholds corresponding to a second set of reference signal densities, where the first set of thresholds is associated with uplink DMRS bundling being enabled, and the second set of thresholds is associated with uplink DMRS bundling being disabled. The communications manager 1020 may be configured as or otherwise support a means for selecting a reference signal density from the first set of reference signal densities or the second set of reference signal densities based on an uplink DMRS bundling status. The communications manager 1020 may be configured as or otherwise support a means for mapping reference signaling to a set of resources based on the reference signal density, the reference signaling including a DMRS, a PTRS, or both. The communications manager 1020 may be configured as or otherwise support a means for transmitting an uplink transmission based on the mapping.

By including or configuring the communications manager 1020 in accordance with examples as described herein, the device 1005 may support techniques for improved communication reliability, more efficient utilization of communication resources, and improved coordination between devices.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the at least one processor 1040, the memory 1030, the code 1035, or any combination thereof. For example, the code 1035 may include instructions executable by the at least one processor 1040 to cause the device 1005 to perform various aspects of techniques for determining PTRS density as described herein, or the at least one processor 1040 and the memory 1030 may be otherwise configured to perform or support such operations.

Figure 11:
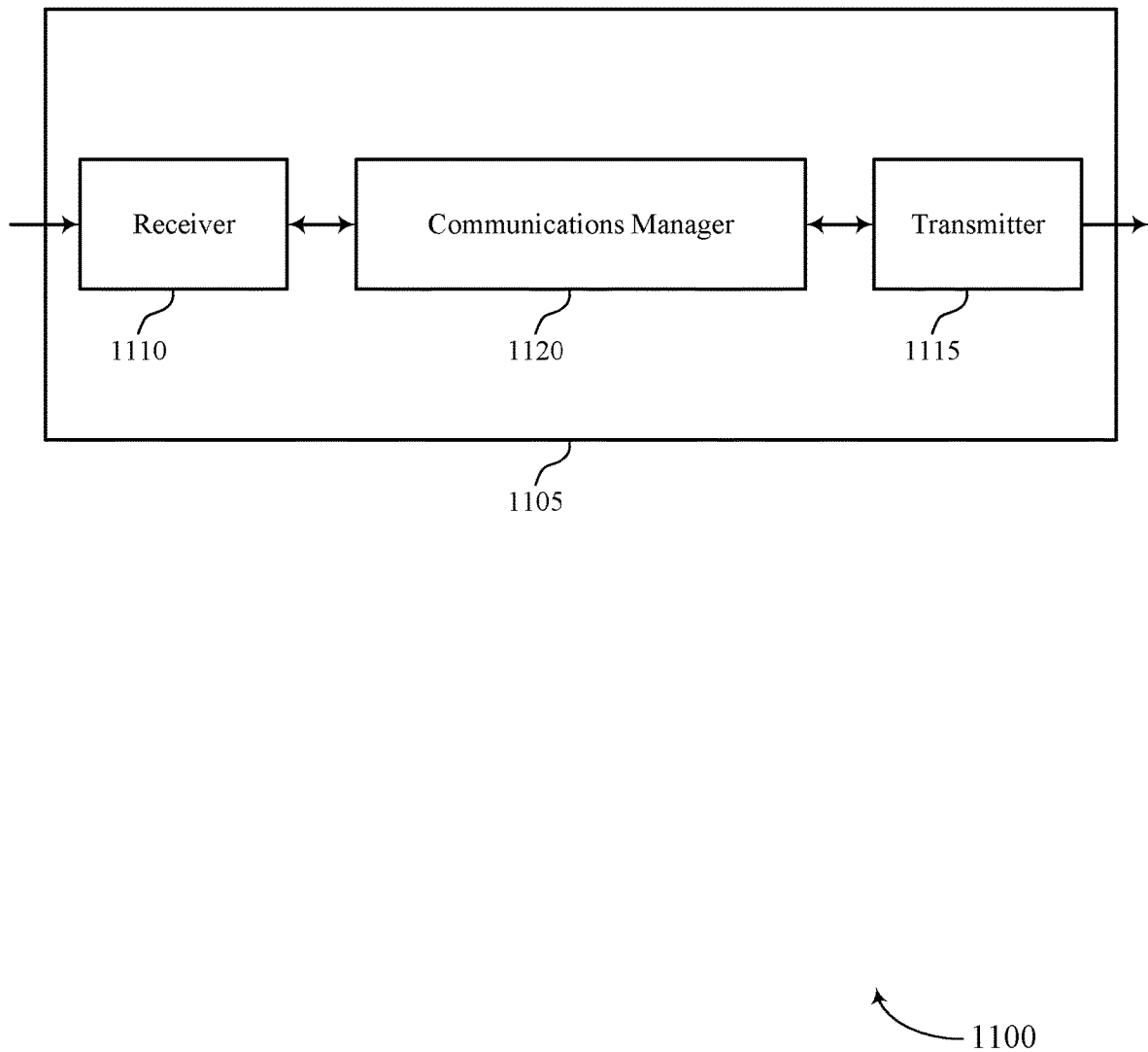
FIGS. 11 and 12 show block diagrams of devices that support techniques for determining PTRS density in accordance with aspects of the present disclosure.

FIG. 11 shows a block diagram 1100 of a device 1105 that supports techniques for determining PTRS density in accordance with aspects of the present disclosure. The device 1105 may be an example of aspects of a base station 105 as described herein. The device 1105 may include a receiver 1110, a transmitter 1115, and a communications manager 1120. The device 1105 may also include at least one processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for determining PTRS density). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for determining PTRS density). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of techniques for determining PTRS density as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include at least one processor, a DSP, an ASIC, an FPGA or other programmable logic device, a discrete gate or transistor logic, discrete hardware components, or any combination thereof configured as or otherwise supporting a means for performing the functions described in the present disclosure. In some examples, at least one processor and memory coupled with the at least one processor may be configured to perform one or more of the functions described herein (e.g., by executing, by the at least one processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by at least one processor. If implemented in code executed by at least one processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a base station in accordance with examples as disclosed herein. For example, the communications manager 1120 may be configured as or otherwise support a means for transmitting control signaling indicating a first set of thresholds corresponding to a first set of reference signal densities and a second set of thresholds corresponding to a second set of reference signal densities, where the first set of thresholds is associated with uplink DMRS bundling being enabled, and the second set of thresholds is associated with uplink DMRS bundling being disabled. The communications manager 1120 may be configured as or otherwise support a means for identifying a reference signal density from the first set of reference signal densities or the second set of reference signal densities based on an uplink DMRS bundling status. The communications manager 1120 may be configured as or otherwise support a means for receiving, from a UE, an uplink transmission, the uplink transmission including reference signaling in a set of resources according to the identified reference signal density, the reference signaling including a DMRS, a PTRS, or both. The communications manager 1120 may be configured as or otherwise support a means for decoding the uplink transmission based on the identified reference signal density.

By including or configuring the communications manager 1120 in accordance with examples as described herein, the device 1105 (e.g., at least one processor controlling or otherwise coupled to the receiver 1110, the transmitter 1115, the communications manager 1120, or a combination thereof) may support techniques for more efficient utilization of communication resources.

Figure 12:
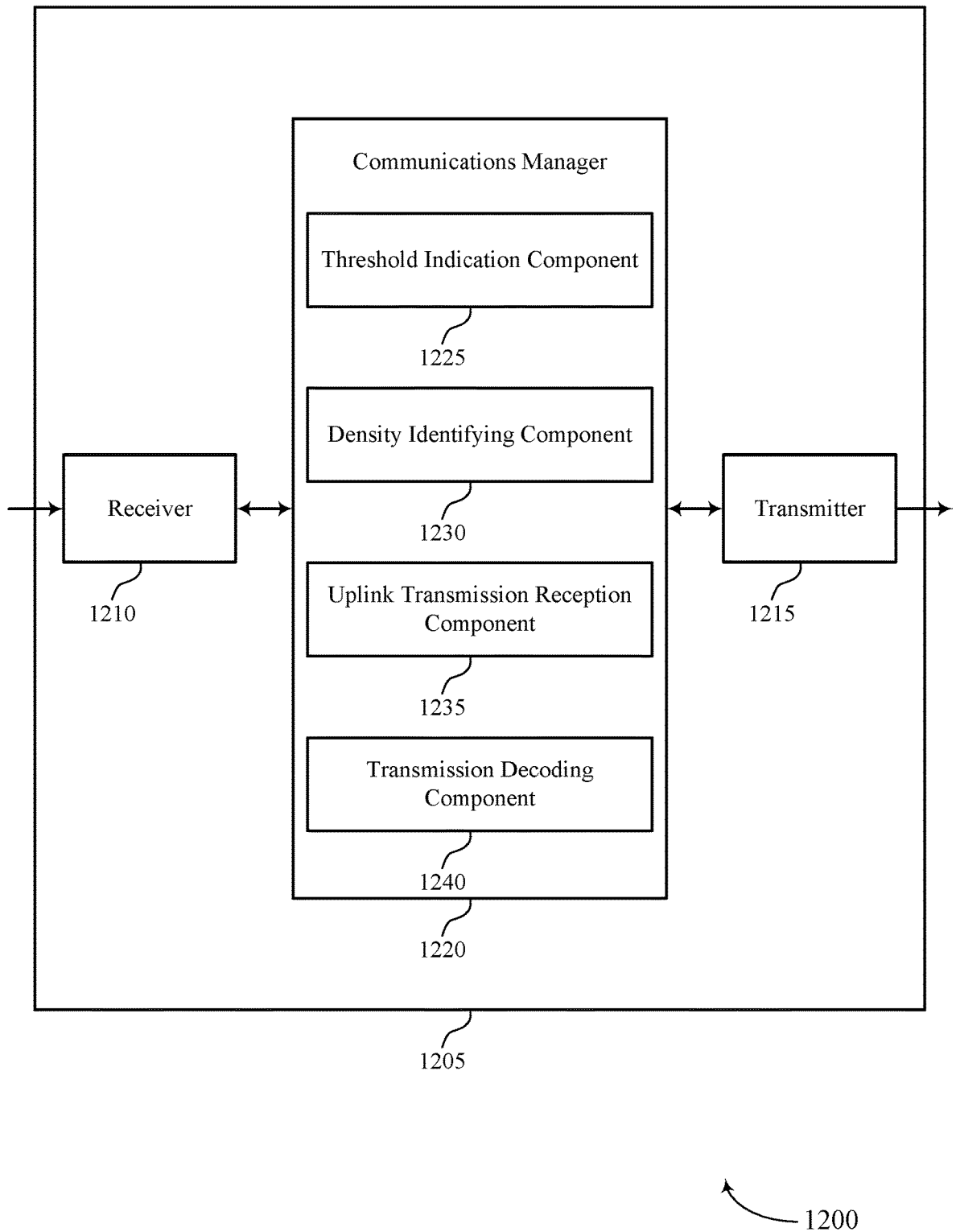

FIG. 12 shows a block diagram 1200 of a device 1205 that supports techniques for determining PTRS density in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include at least one processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to techniques for determining PTRS density). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to techniques for determining PTRS density). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of techniques for determining PTRS density as described herein. For example, the communications manager 1220 may include a threshold indication component 1225, a density identifying component 1230, an uplink transmission reception component 1235, a transmission decoding component 1240, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a base station in accordance with examples as disclosed herein. The threshold indication component 1225 may be configured as or otherwise support a means for transmitting control signaling indicating a first set of thresholds corresponding to a first set of reference signal densities and a second set of thresholds corresponding to a second set of reference signal densities, where the first set of thresholds is associated with uplink DMRS bundling being enabled, and the second set of thresholds is associated with uplink DMRS bundling being disabled. The density identifying component 1230 may be configured as or otherwise support a means for identifying a reference signal density from the first set of reference signal densities or the second set of reference signal densities based on an uplink DMRS bundling status. The uplink transmission reception component 1235 may be configured as or otherwise support a means for receiving, from a UE, an uplink transmission, the uplink transmission including reference signaling in a set of resources according to the identified reference signal density, the reference signaling including a DMRS, a PTRS, or both. The transmission decoding component 1240 may be configured as or otherwise support a means for decoding the uplink transmission based on the identified reference signal density.

Figure 13:
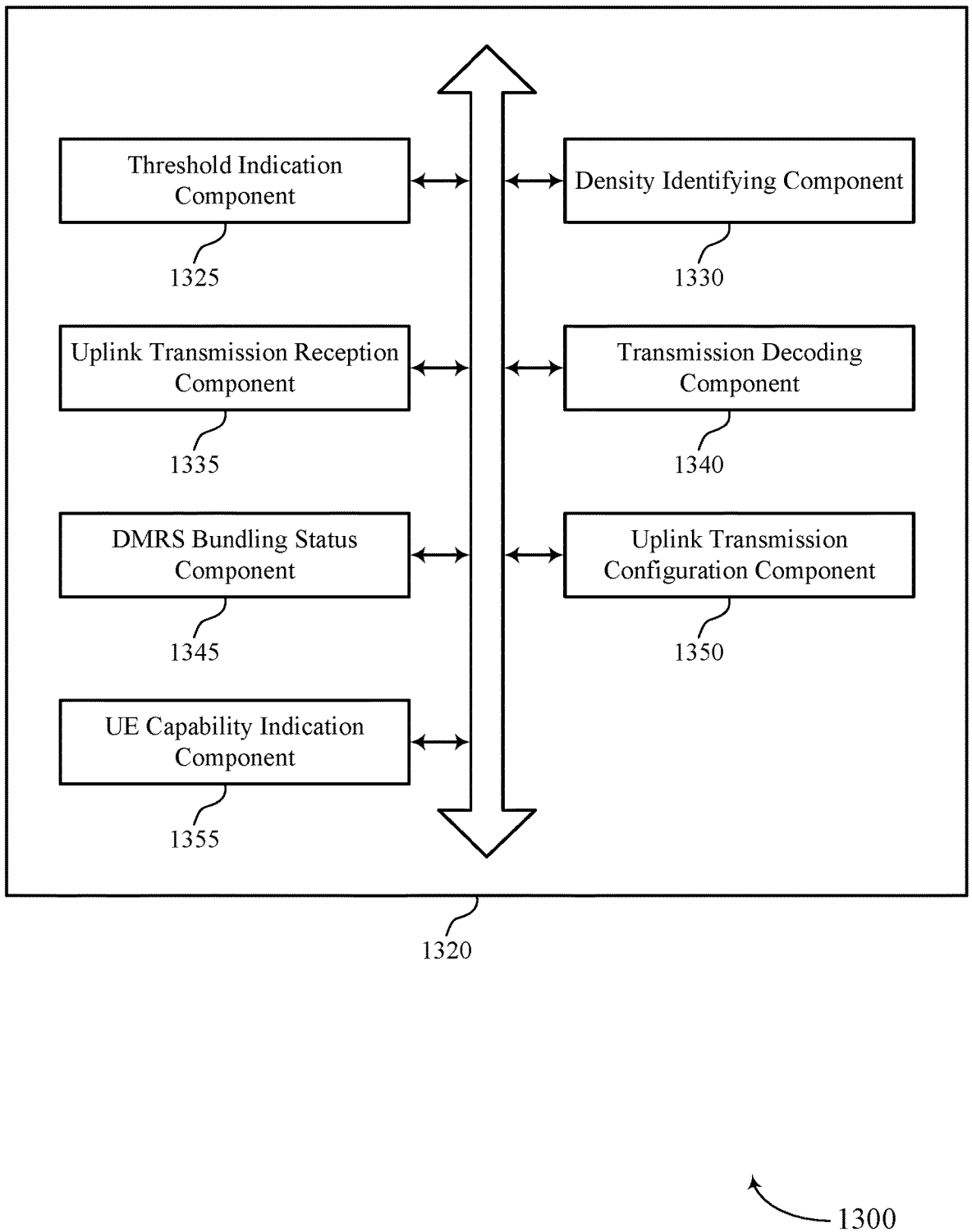
FIG. 13 shows a block diagram of a communications manager that supports techniques for determining PTRS density in accordance with aspects of the present disclosure.

FIG. 13 shows a block diagram 1300 of a communications manager 1320 that supports techniques for determining PTRS density in accordance with aspects of the present disclosure. The communications manager 1320 may be an example of aspects of a communications manager 1120, a communications manager 1120, or both, as described herein. The communications manager 1320, or various components thereof, may be an example of means for performing various aspects of techniques for determining PTRS density as described herein. For example, the communications manager 1320 may include a threshold indication component 1325, a density identifying component 1330, an uplink transmission reception component 1335, a transmission decoding component 1340, a DMRS bundling status component 1345, an uplink transmission configuration component 1350, a UE capability indication component 1355, or any combination thereof. Each of these components may communicate, directly or indirectly, with one another (e.g., via one or more buses).

The communications manager 1320 may support wireless communications at a base station in accordance with examples as disclosed herein. The threshold indication component 1325 may be configured as or otherwise support a means for transmitting control signaling indicating a first set of thresholds corresponding to a first set of reference signal densities and a second set of thresholds corresponding to a second set of reference signal densities, where the first set of thresholds is associated with uplink DMRS bundling being enabled, and the second set of thresholds is associated with uplink DMRS bundling being disabled. The density identifying component 1330 may be configured as or otherwise support a means for identifying a reference signal density from the first set of reference signal densities or the second set of reference signal densities based on an uplink DMRS bundling status. The uplink transmission reception component 1335 may be configured as or otherwise support a means for receiving, from a UE, an uplink transmission, the uplink transmission including reference signaling in a set of resources according to the identified reference signal density, the reference signaling including a DMRS, a PTRS, or both. The transmission decoding component 1340 may be configured as or otherwise support a means for decoding the uplink transmission based on the identified reference signal density.

In some examples, the DMRS bundling status component 1345 may be configured as or otherwise support a means for transmitting a message indicating that the uplink DMRS bundling status is enabled. In some examples, the density identifying component 1330 may be configured as or otherwise support a means for identifying the reference signal density from the first set of reference signal densities based on the uplink DMRS bundling status being enabled.

In some examples, the DMRS bundling status component 1345 may be configured as or otherwise support a means for transmitting a message indicating that the uplink DMRS bundling status is disabled. In some examples, the density identifying component 1330 may be configured as or otherwise support a means for identifying the reference signal density from the second set of reference signal densities based on the uplink DMRS bundling status being disabled.

In some examples, to support transmitting the control signaling indicating the first set of thresholds, the threshold indication component 1325 may be configured as or otherwise support a means for transmitting an indication of the first set of thresholds, where the first set of thresholds includes a set of modulation and coding scheme thresholds corresponding to a set of PTRS time density values.

In some examples, to support transmitting the control signaling indicating the first set of thresholds, the threshold indication component 1325 may be configured as or otherwise support a means for transmitting an indication of the first set of thresholds, where the first set of thresholds includes a set of bandwidth allocation thresholds corresponding to a set of frequency density values.

In some examples, the uplink transmission configuration component 1350 may be configured as or otherwise support a means for transmitting a configuration message indicating a configuration of the uplink transmission, the configuration message including a modulation and coding scheme value, or a bandwidth allocation value for the uplink transmission, or both.

In some examples, to support transmitting the control signaling indicating the first set of thresholds, the threshold indication component 1325 may be configured as or otherwise support a means for transmitting a set of multiple subsets of reference signal thresholds, each subset of the set of multiple subsets associated with a bundling parameter of the uplink transmission. In some examples, to support transmitting the control signaling indicating the first set of thresholds, the density identifying component 1330 may be configured as or otherwise support a means for identifying the reference signal density from a subset of reference signal thresholds based on the uplink DMRS bundling status being enabled and the bundling parameter.

In some examples, the bundling parameter corresponds to uplink shared channel repetition, uplink control channel repetition, adjacent slot bundling, multi-slot bundling, multi-segment bundling, contiguous bundling, non-contiguous bundling, or a combination thereof.

In some examples, the UE capability indication component 1355 may be configured as or otherwise support a means for receiving an indication of a capability of the UE associated with phase continuity maintenance, where the uplink DMRS bundling status is based on the capability of the UE.

In some examples, the first set of reference signal densities and the second set of reference signal densities include PTRS densities.

In some examples, the first set of reference signal densities and the second set of reference signal densities include DMRS densities.

Figure 14:
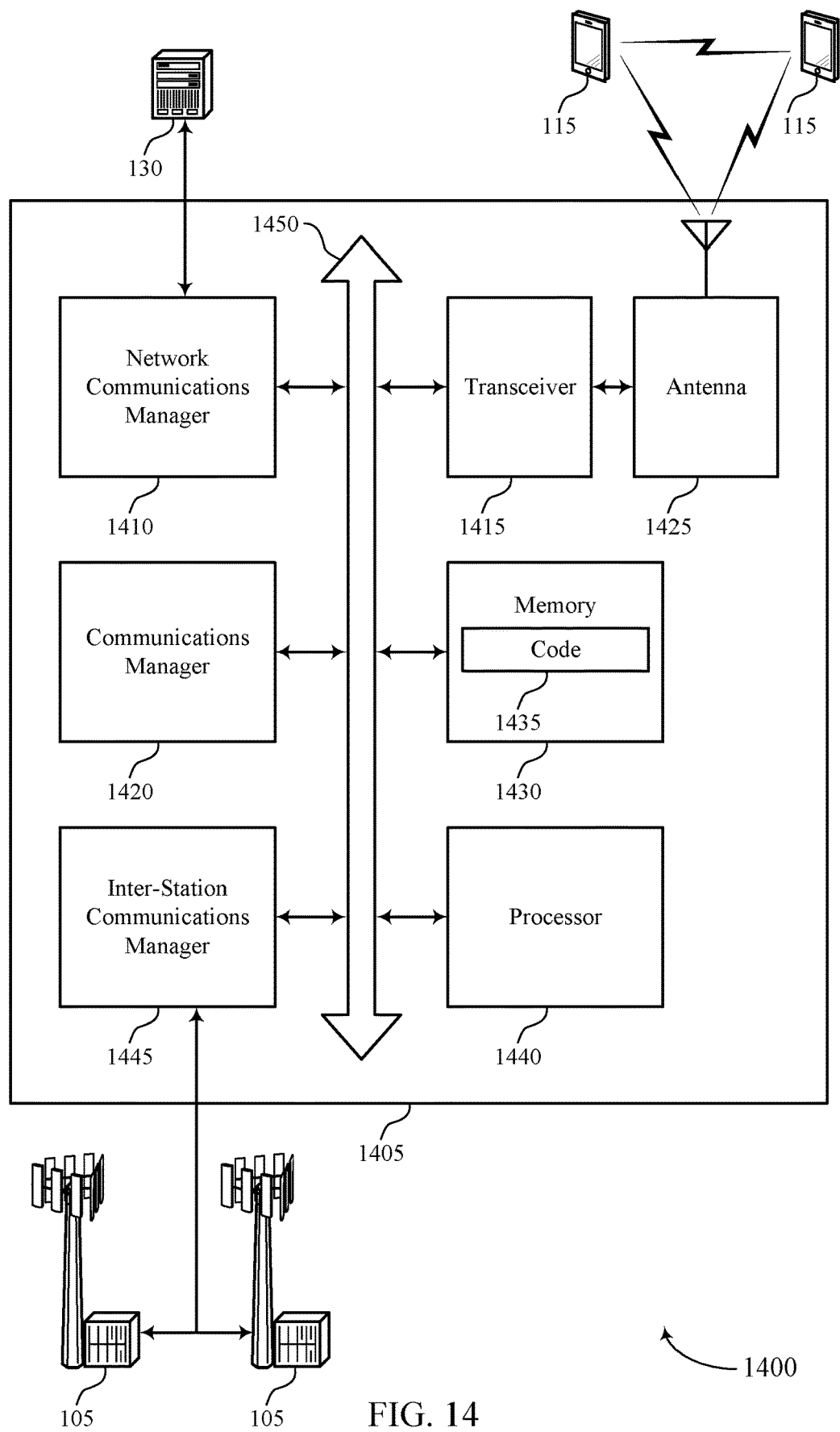
FIG. 14 shows a diagram of a system including a device that supports techniques for determining PTRS density in accordance with aspects of the present disclosure.

FIG. 14 shows a diagram of a system 1400 including a device 1405 that supports techniques for determining PTRS density in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, at least one processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the at least one processor 1440, cause the device 1405 to perform various functions described herein. The code 1435 may be stored in a non-transitory computer-readable medium such as system memory or another type of memory. In some cases, the code 1435 may not be directly executable by the at least one processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The at least one processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 1440 may be configured to operate a memory array using a memory controller. In some other cases, a memory controller may be integrated into the at least one processor 1440. The at least one processor 1440 may be configured to execute computer-readable instructions stored in a memory (e.g., the memory 1430) to cause the device 1405 to perform various functions (e.g., functions or tasks supporting techniques for determining PTRS density). For example, the device 1405 or a component of the device 1405 may include at least one processor 1440 and memory 1430 coupled to the at least one processor 1440, the at least one processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communications at a base station in accordance with examples as disclosed herein. For example, the communications manager 1420 may be configured as or otherwise support a means for transmitting control signaling indicating a first set of thresholds corresponding to a first set of reference signal densities and a second set of thresholds corresponding to a second set of reference signal densities, where the first set of thresholds is associated with uplink DMRS bundling being enabled, and the second set of thresholds is associated with uplink DMRS bundling being disabled. The communications manager 1420 may be configured as or otherwise support a means for identifying a reference signal density from the first set of reference signal densities or the second set of reference signal densities based on an uplink DMRS bundling status. The communications manager 1420 may be configured as or otherwise support a means for receiving, from a UE, an uplink transmission, the uplink transmission including reference signaling in a set of resources according to the identified reference signal density, the reference signaling including a DMRS, a PTRS, or both. The communications manager 1420 may be configured as or otherwise support a means for decoding the uplink transmission based on the identified reference signal density.

By including or configuring the communications manager 1420 in accordance with examples as described herein, the device 1405 may support techniques for improved communication reliability, more efficient utilization of communication resources, and improved utilization of processing capability.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the at least one processor 1440, the memory 1430, the code 1435, or any combination thereof. For example, the code 1435 may include instructions executable by the at least one processor 1440 to cause the device 1405 to perform various aspects of techniques for determining PTRS density as described herein, or the at least one processor 1440 and the memory 1430 may be otherwise configured to perform or support such operations.

Figure 15:
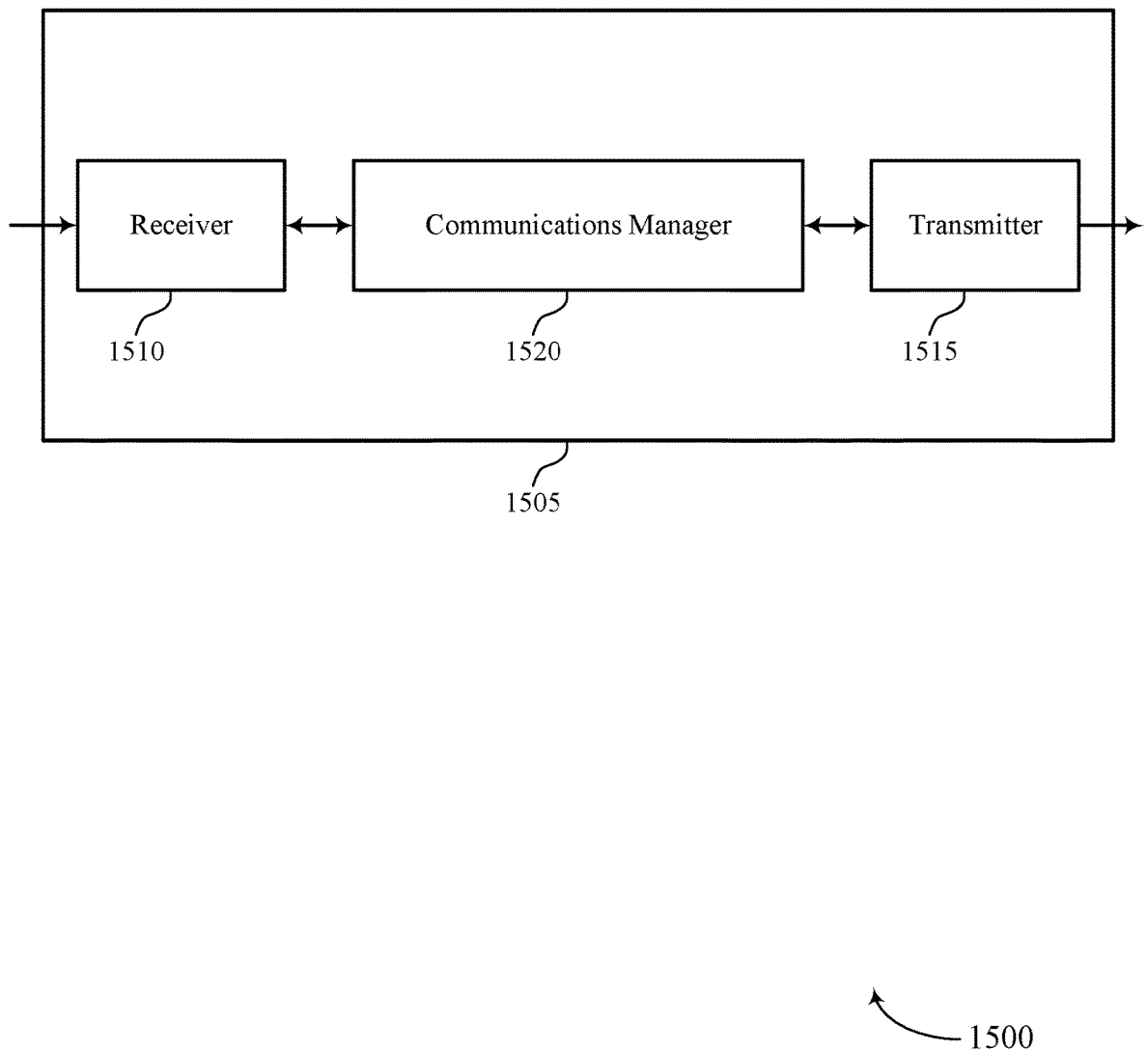
FIGS. 15 and 16 show block diagrams of devices that support techniques for determining PTRS density in accordance with aspects of the present disclosure.

FIG. 15 shows a block diagram 1500 of a device 1505 that supports techniques for DMRS bundling in wireless communications systems in accordance with aspects of the present disclosure. The device 1505 may be an example of aspects of a base station 105 or a UE 115 as described herein. The device 1505 may include a receiver 1510, a transmitter 1515, and a communications manager 1520. The device 1505 may also include at least one processor. Each of these components may be in communication with one another (e.g., via one or more buses).

The receiver 1510 may provide a means for receiving information such as packets, user data, control information, or any combination thereof associated with various information channels (e.g., control channels, data channels, information channels related to techniques for DMRS bundling in wireless communications systems). Information may be passed on to other components of the device 1505. The receiver 1510 may utilize a single antenna or a set of multiple antennas.

The transmitter 1515 may provide a means for transmitting signals generated by other components of the device 1505. For example, the transmitter 1515 may transmit information such as packets, user data, control information, or any combination thereof associated with various information channels (e.g., control channels, data channels, information channels related to techniques for DMRS bundling in wireless communications systems). In some examples, the transmitter 1515 may be co-located with a receiver 1510 in a transceiver module. The transmitter 1515 may utilize a single antenna or a set of multiple antennas.

The communications manager 1520, the receiver 1510, the transmitter 1515, or various combinations thereof or various components thereof may be examples of means for performing various aspects of techniques for DMRS bundling in wireless communications systems as described herein. For example, the communications manager 1520, the receiver 1510, the transmitter 1515, or various combinations or components thereof may support a method for performing one or more of the functions described herein.

In some examples, the communications manager 1520, the receiver 1510, the transmitter 1515, or various combinations or components thereof may be implemented in hardware (e.g., in communications management circuitry). The hardware may include at least one processor, a DSP, an ASIC, an FPGA or other programmable logic device, a discrete gate or transistor logic, discrete hardware components, or any combination thereof configured as or otherwise supporting a means for performing the functions described in the present disclosure. In some examples, at least one processor and memory coupled with the at least one processor may be configured to perform one or more of the functions described herein (e.g., by executing, by the at least one processor, instructions stored in the memory).

Additionally or alternatively, in some examples, the communications manager 1520, the receiver 1510, the transmitter 1515, or various combinations or components thereof may be implemented in code (e.g., as communications management software or firmware) executed by at least one processor. If implemented in code executed by at least one processor, the functions of the communications manager 1520, the receiver 1510, the transmitter 1515, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1520 may be configured to perform various operations (e.g., receiving, monitoring, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to receive information, transmit information, or perform various other operations as described herein.

The communications manager 1520 may support wireless communication in accordance with examples as disclosed herein. For example, the communications manager 1520 may be configured as or otherwise support a means for receiving, using a first set of physical shared channel resources, a first DMRS and a first PTRS based on a PTRS configuration. The communications manager 1520 may be configured as or otherwise support a means for receiving, using a second set of physical shared channel resources, a second DMRS and a second PTRS based on the PTRS configuration. The communications manager 1520 may be configured as or otherwise support a means for performing a channel estimation procedure using the first DMRS and the second DMRS based on the first PTRS and the second PTRS.

By including or configuring the communications manager 1520 in accordance with examples as described herein, the device 1505 (e.g., at least one processor controlling or otherwise coupled to the receiver 1510, the transmitter 1515, the communications manager 1520, or a combination thereof) may support techniques for DMRS bundling based on PTRS configuration, such that the device 1505 may exhibit a reduced processing, a reduced power consumption, an increased efficiency or reliability, or an increased resource utilization, among other benefits.

Figure 16:
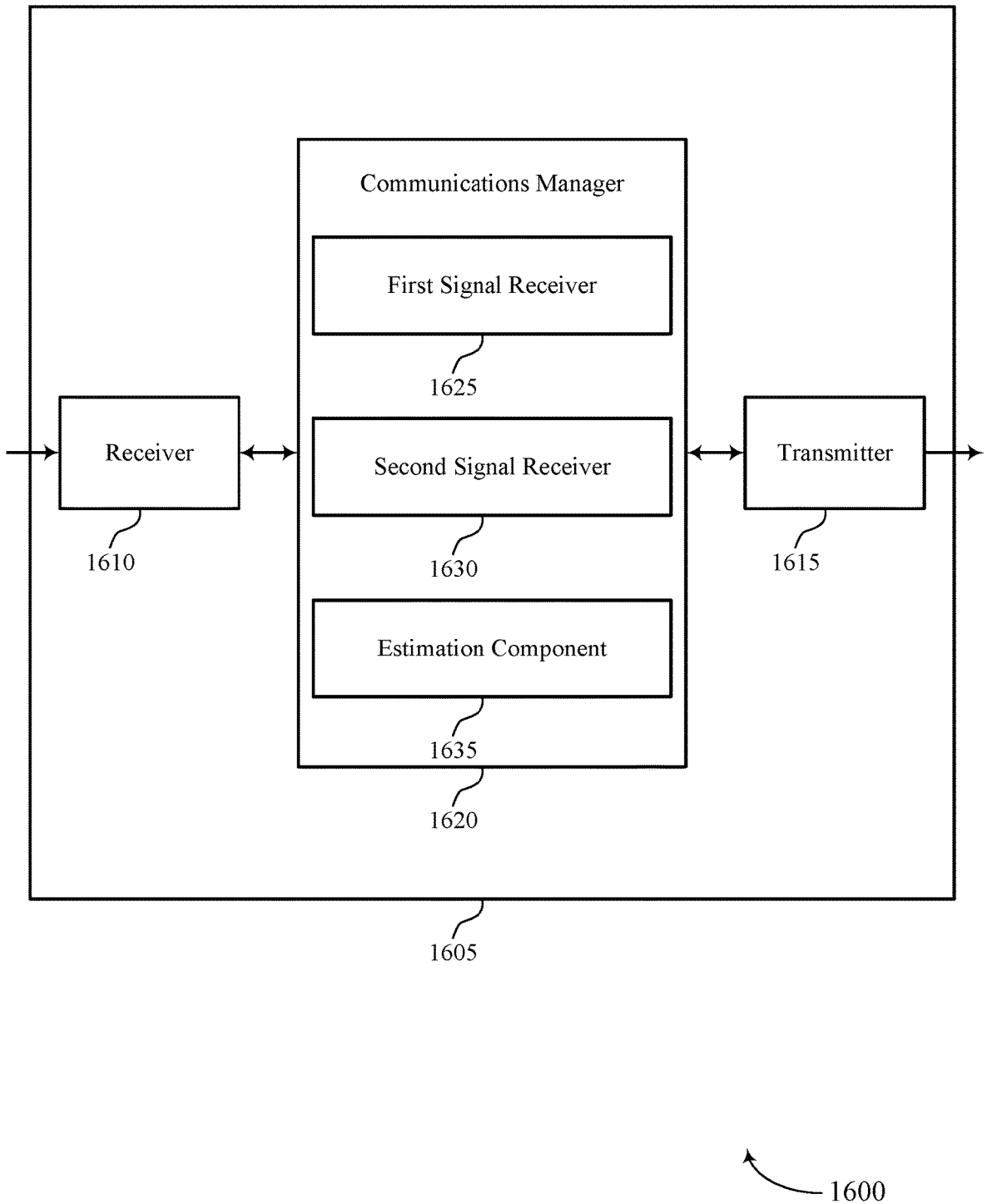

FIG. 16 shows a block diagram 1600 of a device 1605 that supports techniques for DMRS bundling in wireless communications systems in accordance with aspects of the present disclosure. The device 1605 may be an example of aspects of a device 1505, a base station 105, or a UE 115 as described herein. The device 1605 may include a receiver 1610, a transmitter 1615, and a communications manager 1620. The device 1605 may also include at least one processor. Each of these components may be in communication with one another (e.g., via one or more buses).

The receiver 1610 may provide a means for receiving information such as packets, user data, control information, or any combination thereof associated with various information channels (e.g., control channels, data channels, information channels related to techniques for DMRS bundling in wireless communications systems). Information may be passed on to other components of the device 1605. The receiver 1610 may utilize a single antenna or a set of multiple antennas.

The transmitter 1615 may provide a means for transmitting signals generated by other components of the device 1605. For example, the transmitter 1615 may transmit information such as packets, user data, control information, or any combination thereof associated with various information channels (e.g., control channels, data channels, information channels related to techniques for DMRS bundling in wireless communications systems). In some examples, the transmitter 1615 may be co-located with a receiver 1610 in a transceiver module. The transmitter 1615 may utilize a single antenna or a set of multiple antennas.

The device 1605, or various components thereof, may be an example of means for performing various aspects of techniques for DMRS bundling in wireless communications systems as described herein. For example, the communications manager 1620 may include a first signal receiver 1625, a second signal receiver 1630, an estimation component 1635, or any combination thereof. The communications manager 1620 may be an example of aspects of a communications manager 1520 as described herein. In some examples, the communications manager 1620, or various components thereof, may be configured to perform various operations (e.g., receiving, monitoring, transmitting) using or otherwise in cooperation with the receiver 1610, the transmitter 1615, or both. For example, the communications manager 1620 may receive information from the receiver 1610, send information to the transmitter 1615, or be integrated in combination with the receiver 1610, the transmitter 1615, or both to receive information, transmit information, or perform various other operations as described herein.

The communications manager 1620 may support wireless communication in accordance with examples as disclosed herein. The first signal receiver 1625 may be configured as or otherwise support a means for receiving, using a first set of physical shared channel resources, a first DMRS and a first PTRS based on a PTRS configuration. The second signal receiver 1630 may be configured as or otherwise support a means for receiving, using a second set of physical shared channel resources, a second DMRS and a second PTRS based on the PTRS configuration. The estimation component 1635 may be configured as or otherwise support a means for performing a channel estimation procedure using the first DMRS and the second DMRS based on the first PTRS and the second PTRS.

Figure 17:
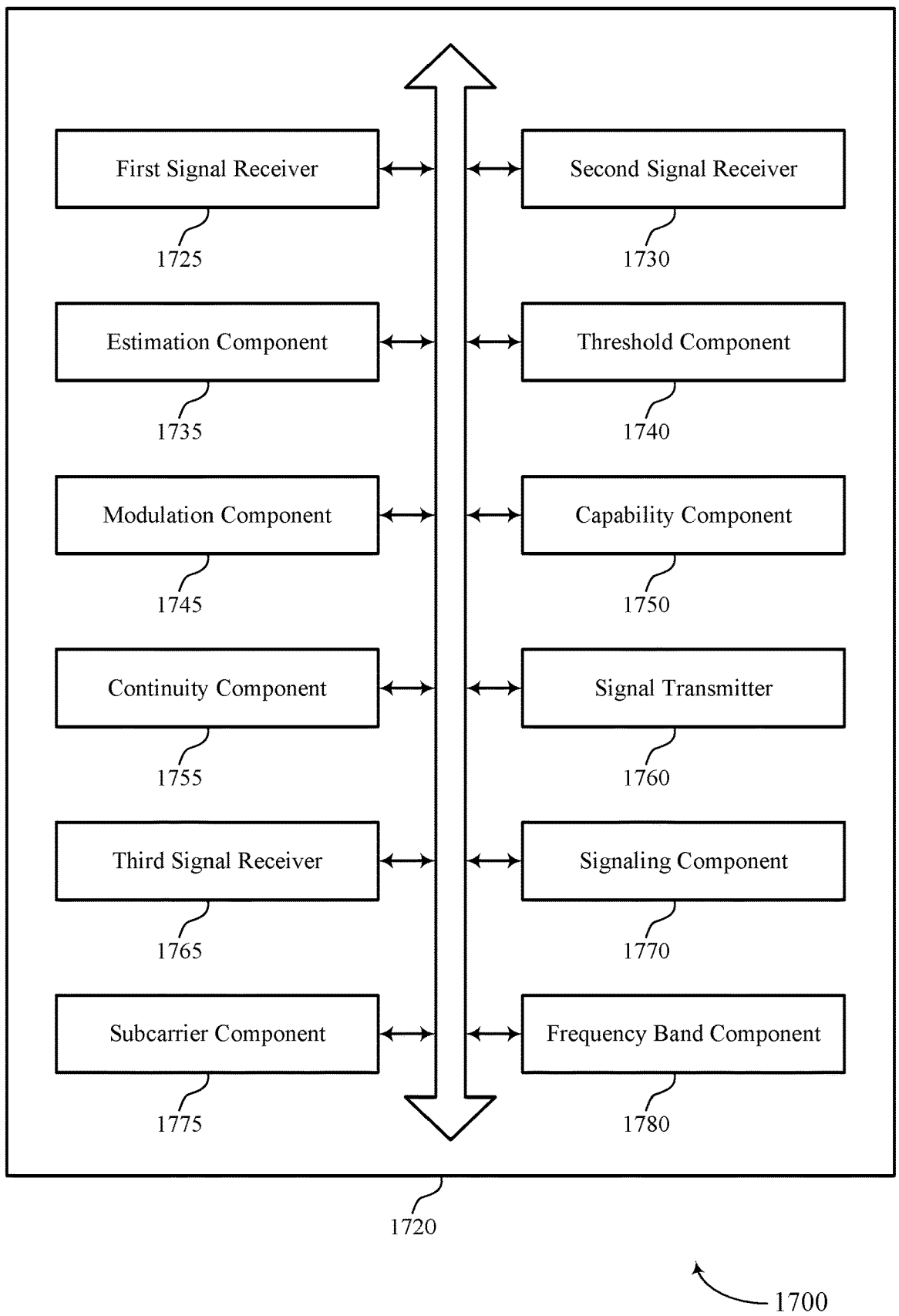
FIG. 17 shows a block diagram of a communications manager that supports techniques for determining PTRS density in accordance with aspects of the present disclosure.

FIG. 17 shows a block diagram 1700 of a communications manager 1720 that supports techniques for DMRS bundling in wireless communications systems in accordance with aspects of the present disclosure. The communications manager 1720 may be an example of aspects of a communications manager 1520, a communications manager 1620, or both, as described herein. The communications manager 1720, or various components thereof, may be an example of means for performing various aspects of techniques for DMRS bundling in wireless communications systems as described herein. For example, the communications manager 1720 may include a first signal receiver 1725, a second signal receiver 1730, an estimation component 1735, a threshold component 1740, a modulation component 1745, a capability component 1750, a continuity component 1755, a signal transmitter 1760, a third signal receiver 1765, a signaling component 1770, a subcarrier component 1775, a frequency band component 1780, or any combination thereof. Each of these components may communicate, directly or indirectly, with one another (e.g., via one or more buses).

The communications manager 1720 may support wireless communication in accordance with examples as disclosed herein. The first signal receiver 1725 may be configured as or otherwise support a means for receiving, using a first set of physical shared channel resources, a first DMRS and a first PTRS based on a PTRS configuration. The second signal receiver 1730 may be configured as or otherwise support a means for receiving, using a second set of physical shared channel resources, a second DMRS and a second PTRS based on the PTRS configuration. The estimation component 1735 may be configured as or otherwise support a means for performing a channel estimation procedure using the first DMRS and the second DMRS based on the first PTRS and the second PTRS.

In some examples, the threshold component 1740 may be configured as or otherwise support a means for determining that at least one parameter associated with the PTRS configuration satisfies a threshold, where performing the channel estimation procedure is based on the determining.

In some examples, the at least one parameter includes a time density of PTRSs, or a frequency density of the PTRSs, or both.

In some examples, the subcarrier component 1775 may be configured as or otherwise support a means for determining a subcarrier spacing associated with the first set of physical shared channel resources, or the second set of physical shared channel resources, or both, where the determining that the at least one parameter associated with the PTRS configuration satisfies the threshold is based on the subcarrier spacing.

In some examples, the frequency band component 1780 may be configured as or otherwise support a means for determining a radio frequency band associated with the first set of physical shared channel resources, or the second set of physical shared channel resources, or both, where the determining that the at least one parameter associated with the PTRS configuration satisfies the threshold is based on the radio frequency band.

In some examples, the modulation component 1745 may be configured as or otherwise support a means for determining a modulation and coding scheme associated with the first set of physical shared channel resources, or the second set of physical shared channel resources, or both, where performing the channel estimation procedure is based on the modulation and coding scheme.

In some examples, the capability component 1750 may be configured as or otherwise support a means for determining a transmission continuity capability, where performing the channel estimation procedure is based on the transmission continuity capability.

In some examples, the transmission continuity capability includes one or more of a power continuity capability, a power accuracy capability, or a phase continuity capability.

In some examples, the continuity component 1755 may be configured as or otherwise support a means for transmitting a request to maintain a transmission continuity based on a transmission continuity capability and the PTRS configuration, where receiving the first DMRS and the second DMRS is based on transmitting the request.

In some examples, the capability component 1750 may be configured as or otherwise support a means for determining that a transmission continuity capability does not satisfy a threshold, where performing the channel estimation procedure is based on the determining and the PTRS configuration.

In some examples, the second set of physical shared channel resources includes a repetition of the first set of physical shared channel resources.

In some examples, to support performing the channel estimation procedure, the estimation component 1735 may be configured as or otherwise support a means for performing a joint channel estimation procedure using the first DMRS and the second DMRS based on the first PTRS and the second PTRS.

In some examples, receiving the first DMRS includes receiving the first DMRS including a cover code. In some examples, receiving the second DMRS includes receiving the second DMRS including the cover code.

In some examples, the signal transmitter 1760 may be configured as or otherwise support a means for transmitting signaling on a third set of physical shared channel resources subsequent to the first set of physical shared channel resources and prior to the second set of physical shared channel resources, where performing the channel estimation procedure is based on the transmitting the signaling and the PTRS configuration.

In some examples, the third signal receiver 1765 may be configured as or otherwise support a means for receiving signaling on a third set of physical shared channel resources subsequent to the first set of physical shared channel resources and prior to the second set of physical shared channel resources, where performing the channel estimation procedure is based on the receiving the signaling and the PTRS configuration.

In some examples, the signaling component 1770 may be configured as or otherwise support a means for communicating signaling based on performing the channel estimation procedure.

Figure 18:
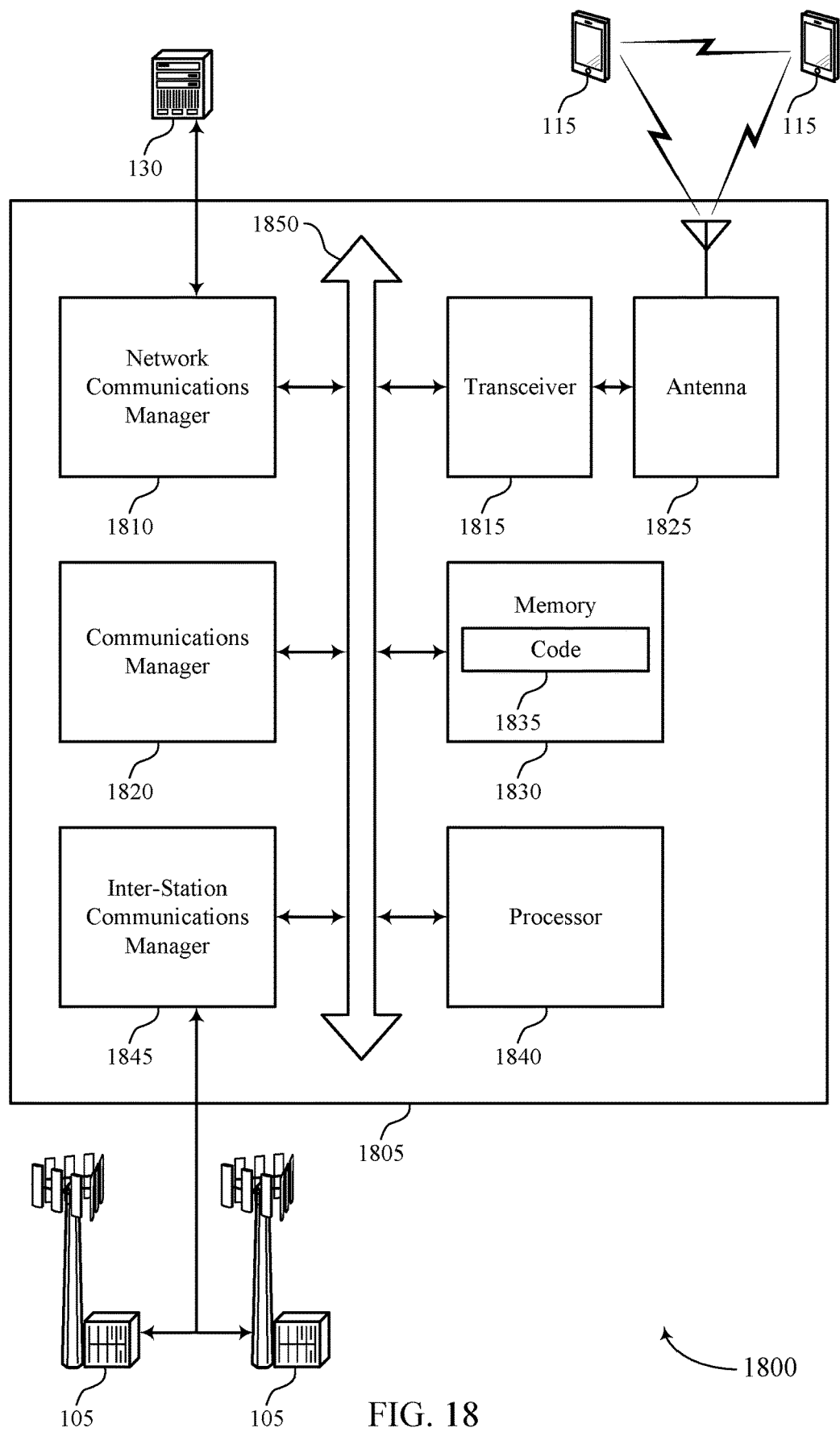
FIG. 18 shows a diagram of a system including a device that supports techniques for determining PTRS density in accordance with aspects of the present disclosure.

FIG. 18 shows a diagram of a system 1800 including a device 1805 that supports techniques for DMRS bundling in wireless communications systems in accordance with aspects of the present disclosure. The device 1805 may be an example of or include the components of a device 1505, a device 1605, a base station 105, or a UE 115 as described herein. The device 1805 may communicate wirelessly with one or more base stations 105, UEs 115, or any combination thereof. The device 1805 may include components for bi-directional voice and data communications including components for transmitting and receiving communications, such as a communications manager 1820, a network communications manager 1810, a transceiver 1815, an antenna 1825, a memory 1830, code 1835, at least one processor 1840, and an inter-station communications manager 1845. These components may be in electronic communication or otherwise coupled (e.g., operatively, communicatively, functionally, electronically, electrically) via one or more buses (e.g., a bus 1850).

The network communications manager 1810 may manage communications with a core network 130 (e.g., via one or more wired backhaul links). For example, the network communications manager 1810 may manage the transfer of data communications for client devices, such as one or more UEs 115.

In some cases, the device 1805 may include a single antenna 1825. However, in some other cases the device 1805 may have more than one antenna 1825, which may be capable of concurrently transmitting or receiving multiple wireless transmissions. The transceiver 1815 may communicate bi-directionally, via the one or more antennas 1825, wired, or wireless links as described herein. For example, the transceiver 1815 may represent a wireless transceiver and may communicate bi-directionally with another wireless transceiver. The transceiver 1815 may also include a modem to modulate the packets, to provide the modulated packets to one or more antennas 1825 for transmission, and to demodulate packets received from the one or more antennas 1825. The transceiver 1815, or the transceiver 1815 and one or more antennas 1825, may be an example of a transmitter 1515, a transmitter 1615, a receiver 1510, a receiver 1610, or any combination thereof or component thereof, as described herein.

The memory 1830 may include RAM and ROM. The memory 1830 may store computer-readable, computer-executable code 1835 including instructions that, when executed by the at least one processor 1840, cause the device 1805 to perform various functions described herein. The code 1835 may be stored in a non-transitory computer-readable medium such as system memory or another type of memory. In some cases, the code 1835 may not be directly executable by the at least one processor 1840 but may cause a computer (e.g., when compiled and executed) to perform functions described herein. In some cases, the memory 1830 may contain, among other things, a BIOS which may control basic hardware or software operation such as the interaction with peripheral components or devices.

The at least one processor 1840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 1840 may be configured to operate a memory array using a memory controller. In some other cases, a memory controller may be integrated into the at least one processor 1840. The at least one processor 1840 may be configured to execute computer-readable instructions stored in a memory (e.g., the memory 1830) to cause the device 1805 to perform various functions (e.g., functions or tasks supporting techniques for DMRS bundling in wireless communications systems). For example, the device 1805 or a component of the device 1805 may include at least one processor 1840 and memory 1830 coupled to the at least one processor 1840, the at least one processor 1840 and memory 1830 configured to perform various functions described herein.

The inter-station communications manager 1845 may manage communications with other base stations 105, and may include a controller or scheduler for controlling communications with UEs 115 in cooperation with other base stations 105. For example, the inter-station communications manager 1845 may coordinate scheduling for transmissions to UEs 115 for various interference mitigation techniques such as beamforming or joint transmission. In some examples, the inter-station communications manager 1845 may provide an X2 interface within an LTE/LTE-A wireless communications network technology to provide communication between base stations 105.

The communications manager 1820 may support wireless communication in accordance with examples as disclosed herein. For example, the communications manager 1820 may be configured as or otherwise support a means for receiving, using a first set of physical shared channel resources, a first DMRS and a first PTRS based on a PTRS configuration. The communications manager 1820 may be configured as or otherwise support a means for receiving, using a second set of physical shared channel resources, a second DMRS and a second PTRS based on the PTRS configuration. The communications manager 1820 may be configured as or otherwise support a means for performing a channel estimation procedure using the first DMRS and the second DMRS based on the first PTRS and the second PTRS.

By including or configuring the communications manager 1820 in accordance with examples as described herein, the device 1805 may support techniques for DMRS bundling based on PTRS configuration, such that the device 1805 may exhibit a reduced processing, a reduced power consumption, an increased efficiency or reliability, or an increased resource utilization, among other benefits.

In some examples, the communications manager 1820 may be configured to perform various operations (e.g., receiving, monitoring, transmitting) using or otherwise in cooperation with the transceiver 1815, the one or more antennas 1825, or any combination thereof. Although the communications manager 1820 is illustrated as a separate component, in some examples, one or more functions described with reference to the communications manager 1820 may be supported by or performed by the at least one processor 1840, the memory 1830, the code 1835, or any combination thereof. For example, the code 1835 may include instructions executable by the at least one processor 1840 to cause the device 1805 to perform various aspects of techniques for DMRS bundling in wireless communications systems as described herein, or the at least one processor 1840 and the memory 1830 may be otherwise configured to perform or support such operations.

Figure 19:
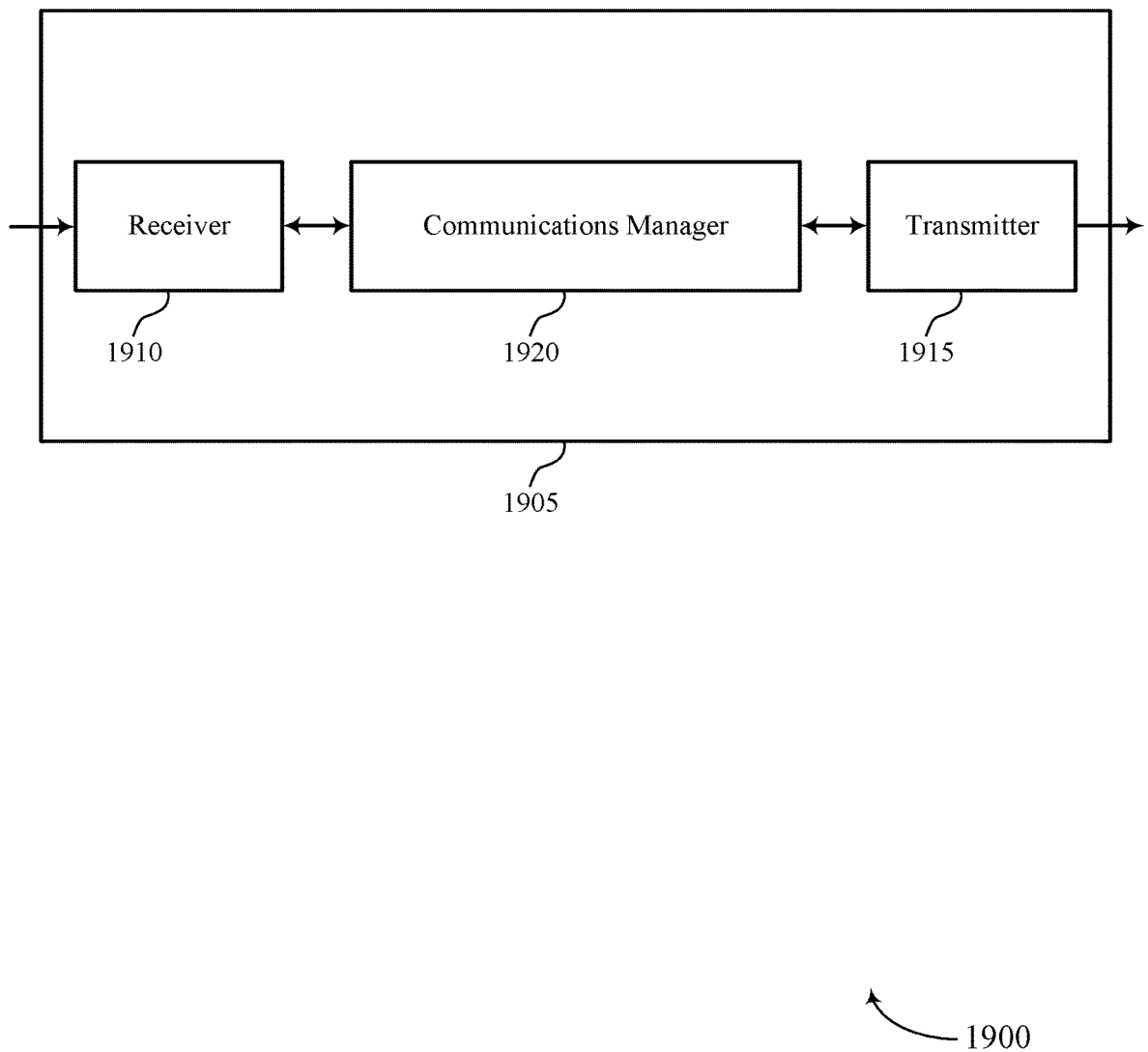
FIGS. 19 and 20 show block diagrams of devices that support techniques for determining PTRS density in accordance with aspects of the present disclosure.

FIG. 19 shows a block diagram 1900 of a device 1905 that supports techniques for DMRS bundling in wireless communications systems in accordance with aspects of the present disclosure. The device 1905 may be an example of aspects of a UE 115 or a base station 105 as described herein. The device 1905 may include a receiver 1910, a transmitter 1915, and a communications manager 1920. The device 1905 may also include at least one processor. Each of these components may be in communication with one another (e.g., via one or more buses).

The receiver 1910 may provide a means for receiving information such as packets, user data, control information, or any combination thereof associated with various information channels (e.g., control channels, data channels, information channels related to techniques for DMRS bundling in wireless communications systems). Information may be passed on to other components of the device 1905. The receiver 1910 may utilize a single antenna or a set of multiple antennas.

The transmitter 1915 may provide a means for transmitting signals generated by other components of the device 1905. For example, the transmitter 1915 may transmit information such as packets, user data, control information, or any combination thereof associated with various information channels (e.g., control channels, data channels, information channels related to techniques for DMRS bundling in wireless communications systems). In some examples, the transmitter 1915 may be co-located with a receiver 1910 in a transceiver module. The transmitter 1915 may utilize a single antenna or a set of multiple antennas.

The communications manager 1920, the receiver 1910, the transmitter 1915, or various combinations thereof or various components thereof may be examples of means for performing various aspects of techniques for DMRS bundling in wireless communications systems as described herein. For example, the communications manager 1920, the receiver 1910, the transmitter 1915, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include at least one processor, a DSP, an ASIC, an FPGA or other programmable logic device, a discrete gate or transistor logic, discrete hardware components, or any combination thereof configured as or otherwise supporting a means for performing the functions described in the present disclosure. In some examples, at least one processor and memory coupled with the at least one processor may be configured to perform one or more of the functions described herein (e.g., by executing, by the at least one processor, instructions stored in the memory).

Additionally or alternatively, in some examples, the communications manager 1920, the receiver 1910, the transmitter 1915, or various combinations or components thereof may be implemented in code (e.g., as communications management software or firmware) executed by at least one processor. If implemented in code executed by at least one processor, the functions of the communications manager 1920, the receiver 1910, the transmitter 1915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1920 may be configured to perform various operations (e.g., receiving, monitoring, transmitting) using or otherwise in cooperation with the receiver 1910, the transmitter 1915, or both. For example, the communications manager 1920 may receive information from the receiver 1910, send information to the transmitter 1915, or be integrated in combination with the receiver 1910, the transmitter 1915, or both to receive information, transmit information, or perform various other operations as described herein.

The communications manager 1920 may support wireless communication in accordance with examples as disclosed herein. For example, the communications manager 1920 may be configured as or otherwise support a means for determining, based on a PTRS configuration, a first set of physical shared channel resources for transmitting a first DMRS and a first PTRS and a second set of physical shared channel resources for transmitting a second DMRS and a second PTRS. The communications manager 1920 may be configured as or otherwise support a means for transmitting, using the first set of physical shared channel resources, the first PTRS and the first DMRS including a cover code. The communications manager 1920 may be configured as or otherwise support a means for transmitting, using the second set of physical shared channel resources, the second PTRS and the second DMRS including the cover code.

By including or configuring the communications manager 1920 in accordance with examples as described herein, the device 1905 (e.g., at least one processor controlling or otherwise coupled to the receiver 1910, the transmitter 1915, the communications manager 1920, or a combination thereof) may support techniques for DMRS bundling based on PTRS configuration, such that the device 1905 may exhibit a reduced processing, a reduced power consumption, an increased efficiency or reliability, or an increased resource utilization, among other benefits.

Figure 20:
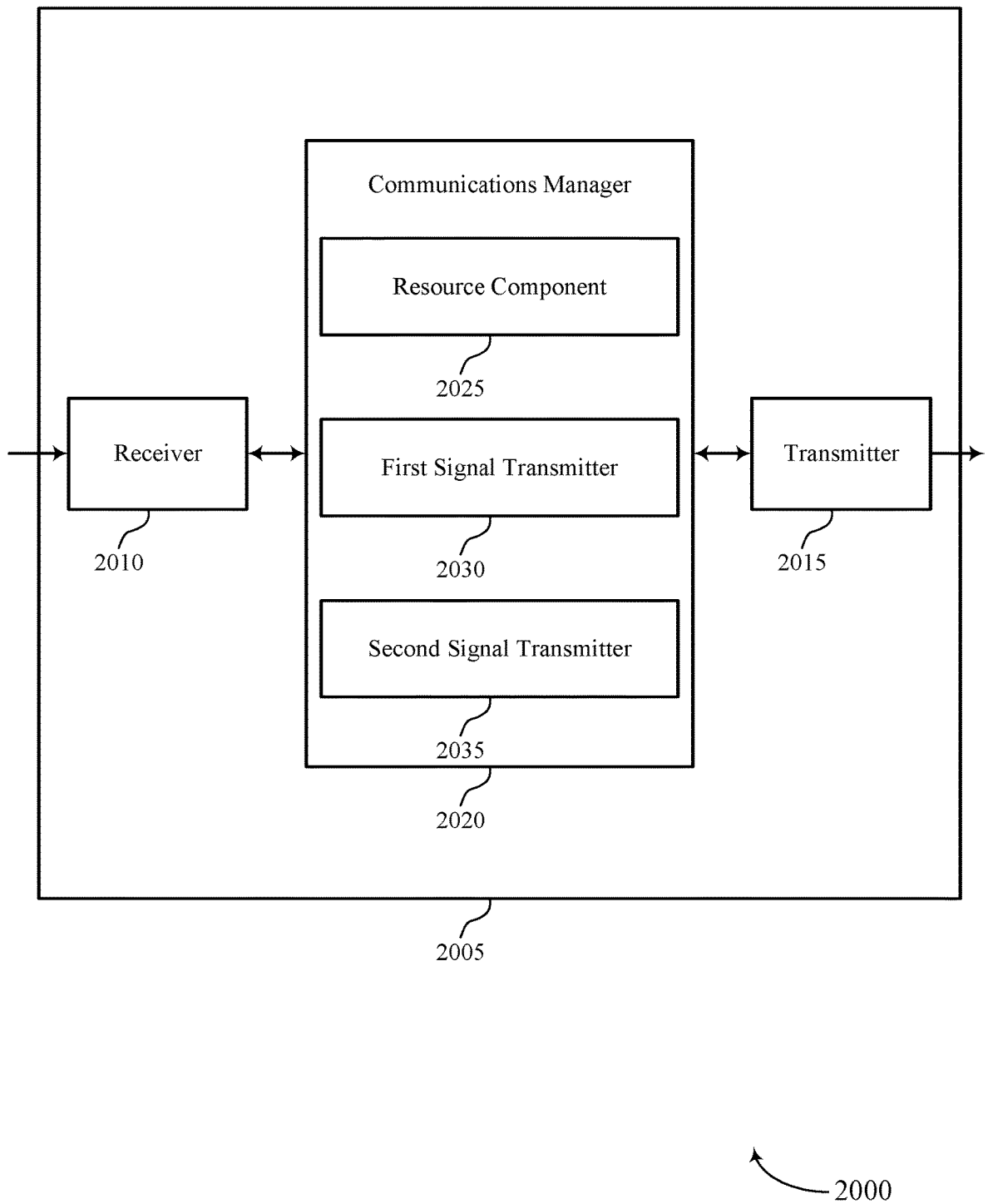

FIG. 20 shows a block diagram 2000 of a device 2005 that supports techniques for DMRS bundling in wireless communications systems in accordance with aspects of the present disclosure. The device 2005 may be an example of aspects of a device 1905. a UE 115, or a base station 105 as described herein. The device 2005 may include a receiver 2010, a transmitter 2015, and a communications manager 2020. The device 2005 may also include at least one processor. Each of these components may be in communication with one another (e.g., via one or more buses).

The receiver 2010 may provide a means for receiving information such as packets, user data, control information, or any combination thereof associated with various information channels (e.g., control channels, data channels, information channels related to techniques for DMRS bundling in wireless communications systems). Information may be passed on to other components of the device 2005. The receiver 2010 may utilize a single antenna or a set of multiple antennas.

The transmitter 2015 may provide a means for transmitting signals generated by other components of the device 2005. For example, the transmitter 2015 may transmit information such as packets, user data, control information, or any combination thereof associated with various information channels (e.g., control channels, data channels, information channels related to techniques for DMRS bundling in wireless communications systems). In some examples, the transmitter 2015 may be co-located with a receiver 2010 in a transceiver module. The transmitter 2015 may utilize a single antenna or a set of multiple antennas.

The device 2005, or various components thereof, may be an example of means for performing various aspects of techniques for DMRS bundling in wireless communications systems as described herein. For example, the communications manager 2020 may include a resource component 2025, a first signal transmitter 2030, a second signal transmitter 2035, or any combination thereof. The communications manager 2020 may be an example of aspects of a communications manager 820 as described herein. In some examples, the communications manager 2020, or various components thereof, may be configured to perform various operations (e.g., receiving, monitoring, transmitting) using or otherwise in cooperation with the receiver 2010, the transmitter 2015, or both. For example, the communications manager 2020 may receive information from the receiver 2010, send information to the transmitter 2015, or be integrated in combination with the receiver 2010, the transmitter 2015, or both to receive information, transmit information, or perform various other operations as described herein.

The communications manager 2020 may support wireless communication in accordance with examples as disclosed herein. The resource component 2025 may be configured as or otherwise support a means for determining, based on a PTRS configuration, a first set of physical shared channel resources for transmitting a first DMRS and a first PTRS and a second set of physical shared channel resources for transmitting a second DMRS and a second PTRS. The first signal transmitter 2030 may be configured as or otherwise support a means for transmitting, using the first set of physical shared channel resources, the first PTRS and the first DMRS including a cover code. The second signal transmitter 2035 may be configured as or otherwise support a means for transmitting, using the second set of physical shared channel resources, the second PTRS and the second DMRS including the cover code.

Figure 21:
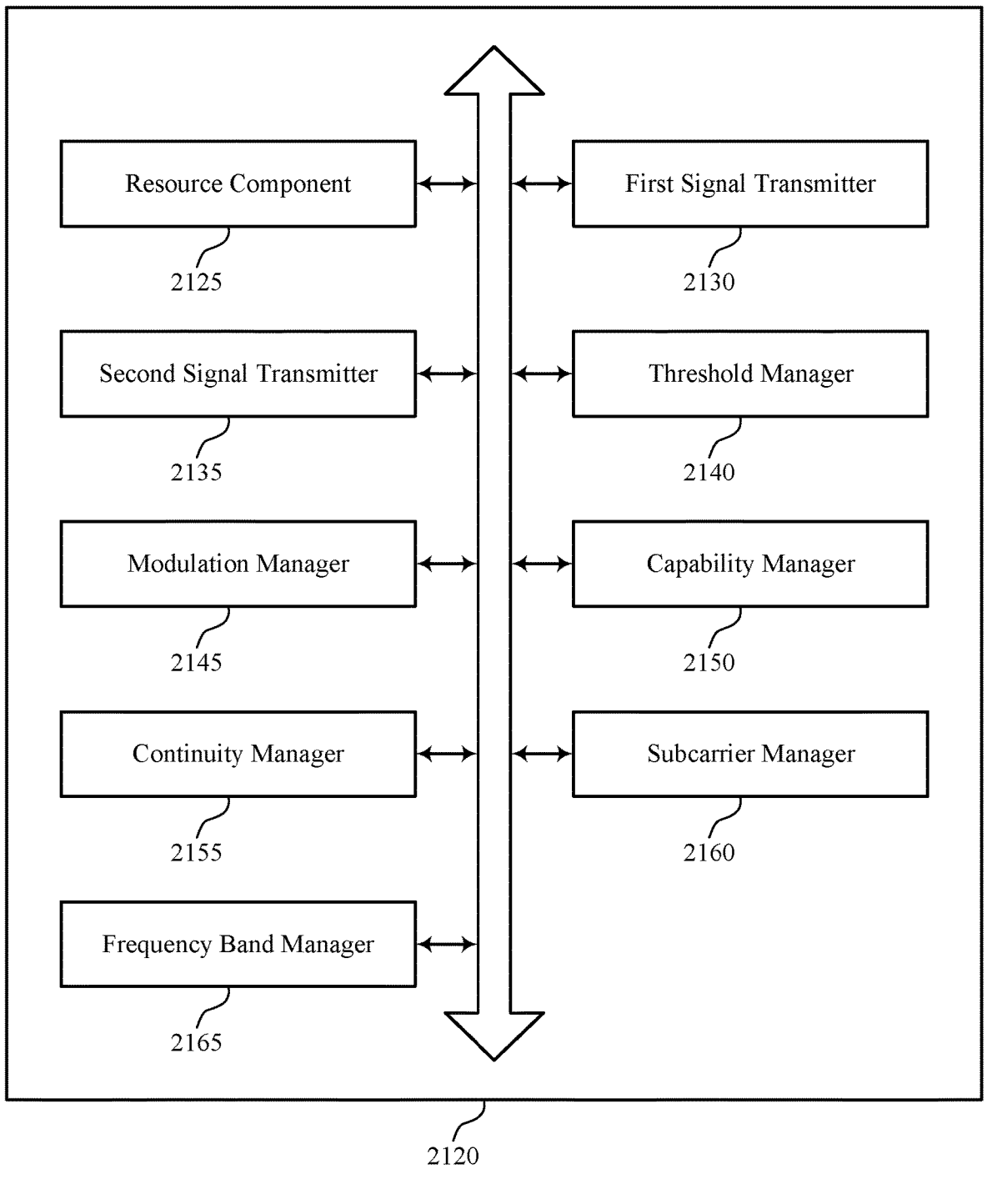
FIG. 21 shows a block diagram of a communications manager that supports techniques for determining PTRS density in accordance with aspects of the present disclosure.

FIG. 21 shows a block diagram 2100 of a communications manager 2120 that supports techniques for DMRS bundling in wireless communications systems in accordance with aspects of the present disclosure. The communications manager 2120 may be an example of aspects of a communications manager 1920, a communications manager 2020, or both, as described herein. The communications manager 2120, or various components thereof, may be an example of means for performing various aspects of techniques for DMRS bundling in wireless communications systems as described herein. For example, the communications manager 2120 may include a resource component 2125, a first signal transmitter 2130, a second signal transmitter 2135, a threshold manager 2140, a modulation manager 2145, a capability manager 2150, a continuity manager 2155, a subcarrier manager 2160, a frequency band manager 2165, or any combination thereof. Each of these components may communicate, directly or indirectly, with one another (e.g., via one or more buses).

The communications manager 2120 may support wireless communication in accordance with examples as disclosed herein. The resource component 2125 may be configured as or otherwise support a means for determining, based on a PTRS configuration, a first set of physical shared channel resources for transmitting a first DMRS and a first PTRS and a second set of physical shared channel resources for transmitting a second DMRS and a second PTRS. The first signal transmitter 2130 may be configured as or otherwise support a means for transmitting, using the first set of physical shared channel resources, the first PTRS and the first DMRS including a cover code. The second signal transmitter 2135 may be configured as or otherwise support a means for transmitting, using the second set of physical shared channel resources, the second PTRS and the second DMRS including the cover code.

In some examples, the threshold manager 2140 may be configured as or otherwise support a means for determining that at least one parameter associated with the PTRS configuration satisfies a threshold, where the second DMRS includes the cover code based on the at least one parameter satisfying the threshold.

In some examples, the at least one parameter includes a time density of PTRSs, or a frequency density of the PTRSs, or both.

In some examples, the subcarrier manager 2160 may be configured as or otherwise support a means for determining a subcarrier spacing associated with the first set of physical shared channel resources, or the second set of physical shared channel resources, or both, where the determining that the at least one parameter associated with the PTRS configuration satisfies the threshold is based on the subcarrier spacing.

In some examples, the frequency band manager 2165 may be configured as or otherwise support a means for determining a radio frequency band associated with the first set of physical shared channel resources, or the second set of physical shared channel resources, or both, where the determining that the at least one parameter associated with the PTRS configuration satisfies the threshold is based on the radio frequency band.

In some examples, the modulation manager 2145 may be configured as or otherwise support a means for determining a modulation and coding scheme associated with the first set of physical shared channel resources, or the second set of physical shared channel resources, or both, where the second DMRS includes the cover code based on the modulation and coding scheme.

In some examples, the second set of physical shared channel resources includes a repetition of the first set of physical shared channel resources.

In some examples, the capability manager 2150 may be configured as or otherwise support a means for determining a transmission continuity capability, where the PTRS configuration is based on the determining.

In some examples, the transmission continuity capability includes one or more of a power continuity capability, a power accuracy capability, or a phase continuity capability.

In some examples, the continuity manager 2155 may be configured as or otherwise support a means for receiving a request to maintain a transmission continuity based on a transmission continuity capability and the PTRS configuration, where transmitting the first DMRS and the second DMRS is based on receiving the request.

In some examples, the capability manager 2150 may be configured as or otherwise support a means for determining that a transmission continuity capability does not satisfy a threshold, where the PTRS configuration is based on the determining.

Figure 22:
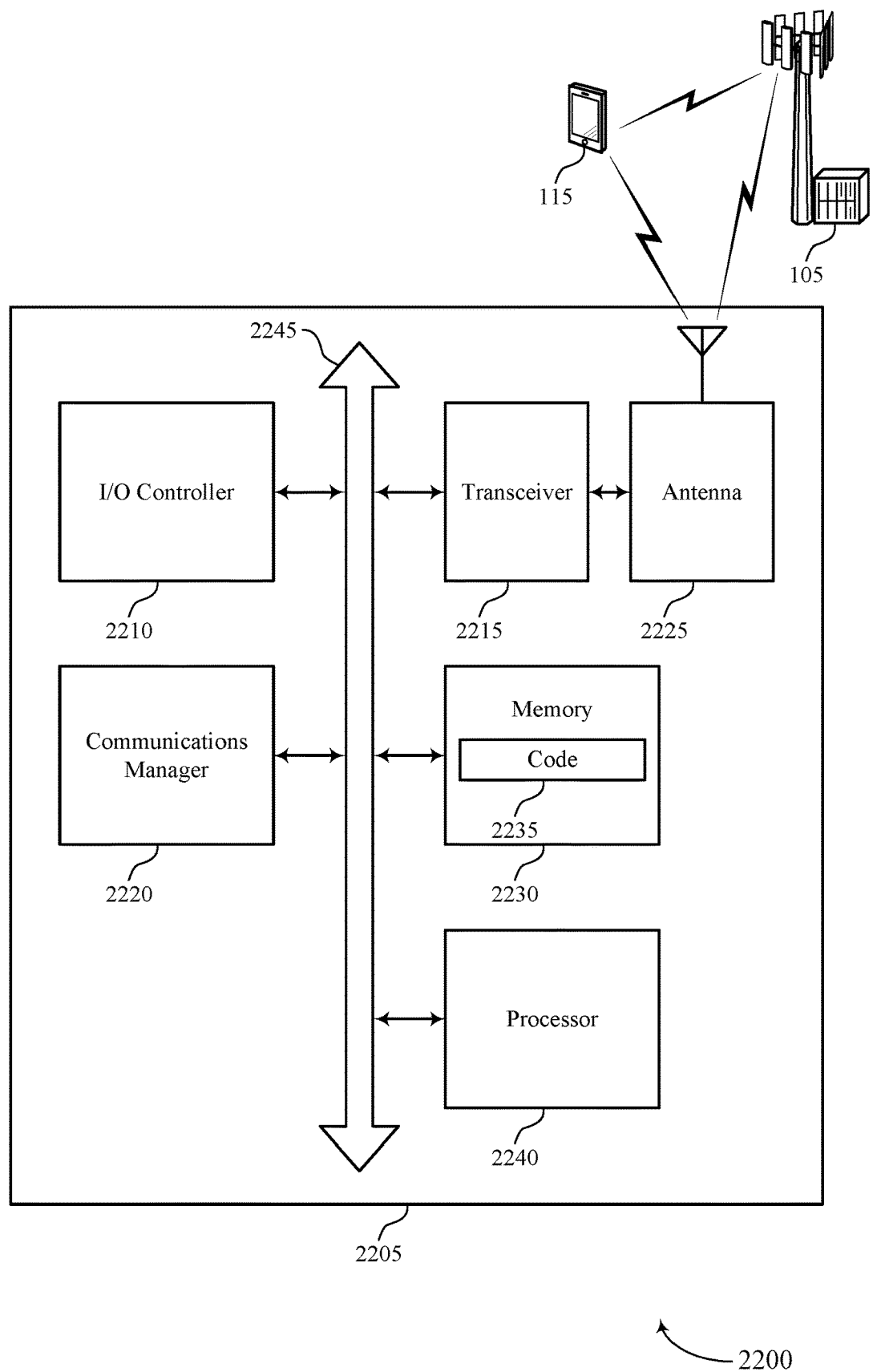
FIG. 22 shows a diagram of a system including a device that supports techniques for determining PTRS density in accordance with aspects of the present disclosure.

FIG. 22 shows a diagram of a system 2200 including a device 2205 that supports techniques for DMRS bundling in wireless communications systems in accordance with aspects of the present disclosure. The device 2205 may be an example of or include the components of a device 1905, a device 2005, a UE 115, or a base station 105 as described herein. The device 2205 may communicate wirelessly with one or more base stations 105, UEs 115, or any combination thereof. The device 2205 may include components for bi-directional voice and data communications including components for transmitting and receiving communications, such as a communications manager 2220, an input/output (I/O) controller 2210, a transceiver 2215, an antenna 2225, a memory 2230, code 2235, and at least one processor 2240. These components may be in electronic communication or otherwise coupled (e.g., operatively, communicatively, functionally, electronically, electrically) via one or more buses (e.g., a bus 2245).

The I/O controller 2210 may manage input and output signals for the device 2205. The I/O controller 2210 may also manage peripherals not integrated into the device 2205. In some cases, the I/O controller 2210 may represent a physical connection or port to an external peripheral. In some cases, the I/O controller 2210 may utilize an operating system such as iOS®, ANDROID®, MS-DOS®, MS-WINDOWS®, OS/2®, UNIX®, LINUX®, or another known operating system. Additionally or alternatively, the I/O controller 2210 may represent or interact with a modem, a keyboard, a mouse, a touchscreen, or a similar device. In some cases, the I/O controller 2210 may be implemented as part of at least one processor, such as the at least one processor 2240. In some cases, a user may interact with the device 2205 via the I/O controller 2210 or via hardware components controlled by the I/O controller 2210.

In some cases, the device 2205 may include a single antenna 2225. However, in some other cases, the device 2205 may have more than one antenna 2225, which may be capable of concurrently transmitting or receiving multiple wireless transmissions. The transceiver 2215 may communicate bi-directionally, via the one or more antennas 2225, wired, or wireless links as described herein. For example, the transceiver 2215 may represent a wireless transceiver and may communicate bi-directionally with another wireless transceiver. The transceiver 2215 may also include a modem to modulate the packets, to provide the modulated packets to one or more antennas 2225 for transmission, and to demodulate packets received from the one or more antennas 2225. The transceiver 2215, or the transceiver 2215 and one or more antennas 2225, may be an example of a transmitter 1915, a transmitter 2015, a receiver 1910, a receiver 2010, or any combination thereof or component thereof, as described herein.

The memory 2230 may include RAM and ROM. The memory 2230 may store computer-readable, computer-executable code 2235 including instructions that, when executed by the at least one processor 2240, cause the device 2205 to perform various functions described herein. The code 2235 may be stored in a non-transitory computer-readable medium such as system memory or another type of memory. In some cases, the code 2235 may not be directly executable by the at least one processor 2240 but may cause a computer (e.g., when compiled and executed) to perform functions described herein. In some cases, the memory 2230 may contain, among other things, a basic I/O system (BIOS) which may control basic hardware or software operation such as the interaction with peripheral components or devices.

The at least one processor 2240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 2240 may be configured to operate a memory array using a memory controller. In some other cases, a memory controller may be integrated into the at least one processor 2240. The at least one processor 2240 may be configured to execute computer-readable instructions stored in a memory (e.g., the memory 2230) to cause the device 2205 to perform various functions (e.g., functions or tasks supporting techniques for DMRS bundling in wireless communications systems). For example, the device 2205 or a component of the device 2205 may include at least one processor 2240 and memory 2230 coupled to the at least one processor 2240, the at least one processor 2240 and memory 2230 configured to perform various functions described herein.

The communications manager 2220 may support wireless communication in accordance with examples as disclosed herein. For example, the communications manager 2220 may be configured as or otherwise support a means for determining, based on a PTRS configuration, a first set of physical shared channel resources for transmitting a first DMRS and a first PTRS and a second set of physical shared channel resources for transmitting a second DMRS and a second PTRS. The communications manager 2220 may be configured as or otherwise support a means for transmitting, using the first set of physical shared channel resources, the first PTRS and the first DMRS including a cover code. The communications manager 2220 may be configured as or otherwise support a means for transmitting, using the second set of physical shared channel resources, the second PTRS and the second DMRS including the cover code.

By including or configuring the communications manager 2220 in accordance with examples as described herein, the device 2205 may support techniques for DMRS bundling based on PTRS configuration, such that the device 2205 may exhibit a reduced processing, a reduced power consumption, an increased efficiency or reliability, or an increased resource utilization, among other benefits.

In some examples, the communications manager 2220 may be configured to perform various operations (e.g., receiving, monitoring, transmitting) using or otherwise in cooperation with the transceiver 2215, the one or more antennas 2225, or any combination thereof. Although the communications manager 2220 is illustrated as a separate component, in some examples, one or more functions described with reference to the communications manager 2220 may be supported by or performed by the at least one processor 2240, the memory 2230, the code 2235, or any combination thereof. For example, the code 2235 may include instructions executable by the at least one processor 2240 to cause the device 2205 to perform various aspects of techniques for DMRS bundling in wireless communications systems as described herein, or the at least one processor 2240 and the memory 2230 may be otherwise configured to perform or support such operations.

Figure 23:
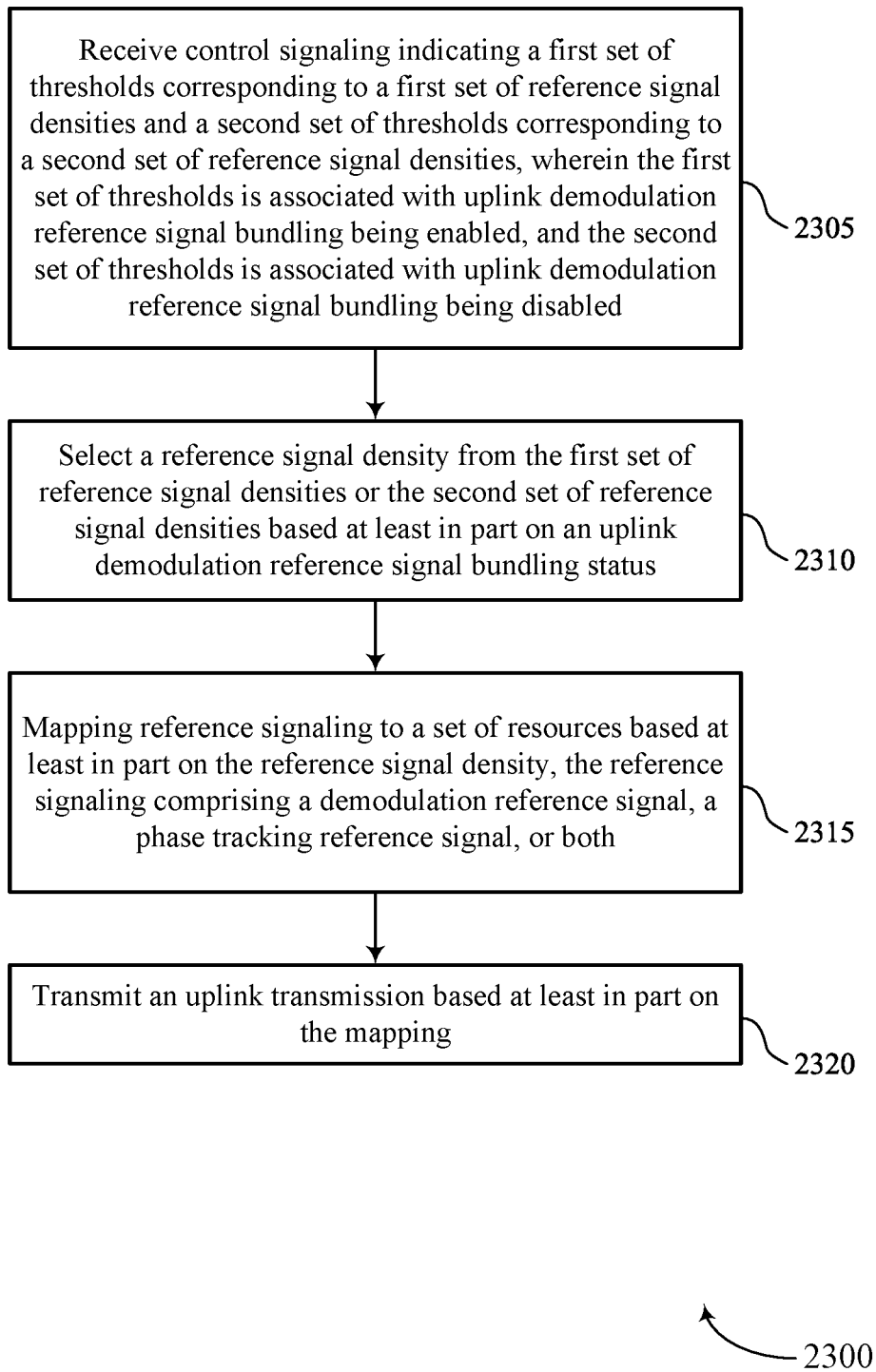
FIGS. 23 through 30 show flowcharts illustrating methods that support techniques for determining PTRS density in accordance with aspects of the present disclosure.

FIG. 23 shows a flowchart illustrating a method 2300 that supports techniques for determining PTRS density in accordance with aspects of the present disclosure. The operations of the method 2300 may be implemented by a UE or its components as described herein. For example, the operations of the method 2300 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 2305, the method may include receiving control signaling indicating a first set of thresholds corresponding to a first set of reference signal densities and a second set of thresholds corresponding to a second set of reference signal densities, where the first set of thresholds is associated with uplink DMRS bundling being enabled, and the second set of thresholds is associated with uplink DMRS bundling being disabled. The operations of 2305 may be performed in accordance with examples as disclosed herein. In some examples, aspects of the operations of 2305 may be performed by a threshold indication reception manager 925 as described with reference to FIG. 9.

At 2310, the method may include selecting a reference signal density from the first set of reference signal densities or the second set of reference signal densities based on an uplink DMRS bundling status. The operations of 2310 may be performed in accordance with examples as disclosed herein. In some examples, aspects of the operations of 2310 may be performed by a density selection manager 930 as described with reference to FIG. 9.

At 2315, the method may include mapping reference signaling to a set of resources based on the reference signal density, the reference signaling including a DMRS, a PTRS, or both. The operations of 2315 may be performed in accordance with examples as disclosed herein. In some examples, aspects of the operations of 2315 may be performed by a reference signal mapping manager 935 as described with reference to FIG. 9.

At 2320, the method may include transmitting an uplink transmission based on the mapping. The operations of 2320 may be performed in accordance with examples as disclosed herein. In some examples, aspects of the operations of 2320 may be performed by an uplink transmission manager 940 as described with reference to FIG. 9.

Figure 24:
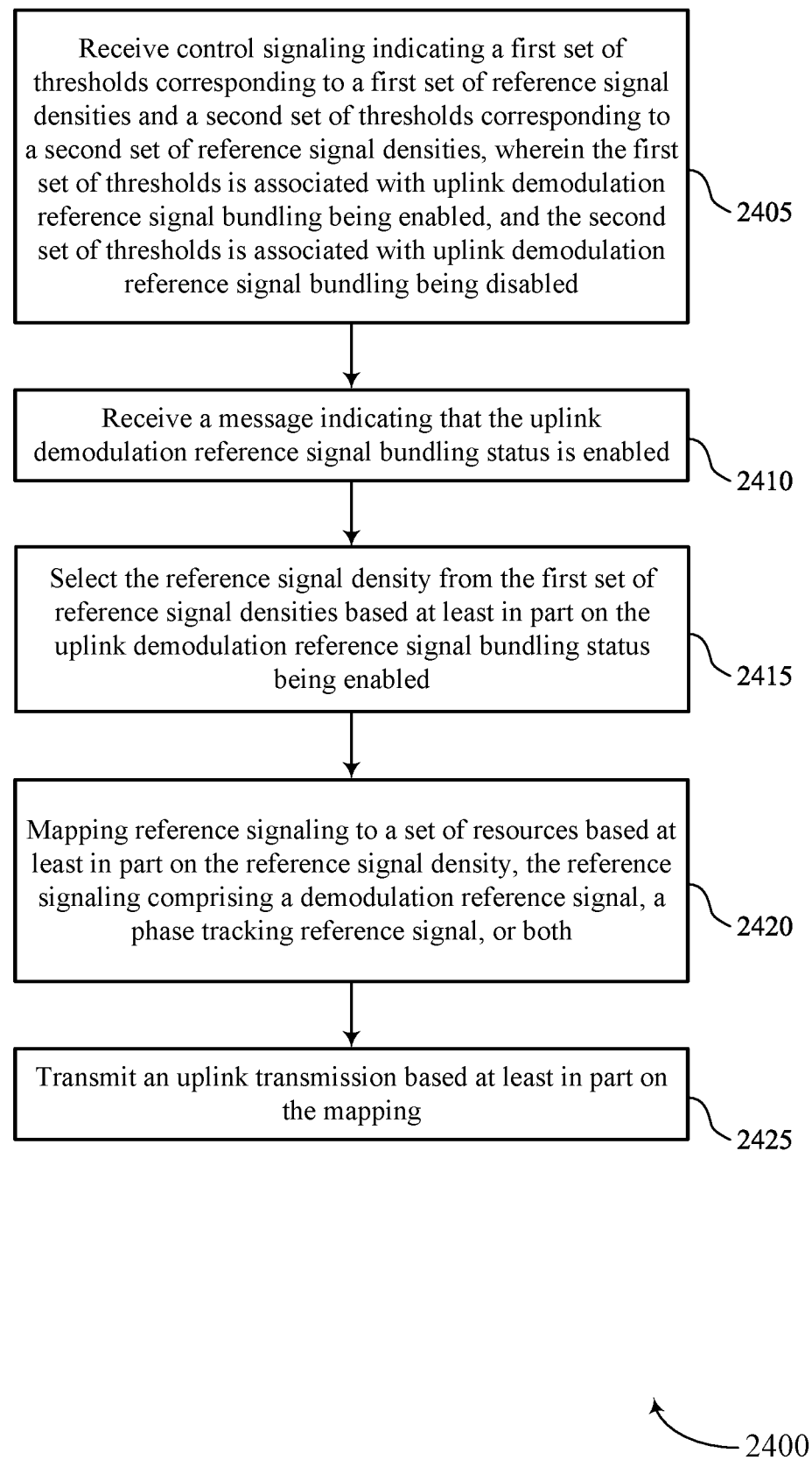

FIG. 24 shows a flowchart illustrating a method 2400 that supports techniques for determining PTRS density in accordance with aspects of the present disclosure. The operations of the method 2400 may be implemented by a UE or its components as described herein. For example, the operations of the method 2400 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 2405, the method may include receiving control signaling indicating a first set of thresholds corresponding to a first set of reference signal densities and a second set of thresholds corresponding to a second set of reference signal densities, where the first set of thresholds is associated with uplink DMRS bundling being enabled, and the second set of thresholds is associated with uplink DMRS bundling being disabled. The operations of 2405 may be performed in accordance with examples as disclosed herein. In some examples, aspects of the operations of 2405 may be performed by a threshold indication reception manager 925 as described with reference to FIG. 9.

At 2410, the method may include receiving a message indicating that the uplink DMRS bundling status is enabled. The operations of 2410 may be performed in accordance with examples as disclosed herein. In some examples, aspects of the operations of 2410 may be performed by a DMRS bundling status manager 945 as described with reference to FIG. 9.

At 2415, the method may include selecting the reference signal density from the first set of reference signal densities based on the uplink DMRS bundling status being enabled. The operations of 2415 may be performed in accordance with examples as disclosed herein. In some examples, aspects of the operations of 2415 may be performed by a density selection manager 930 as described with reference to FIG. 9.

At 2420, the method may include mapping reference signaling to a set of resources based on the reference signal density, the reference signaling including a DMRS, a PTRS, or both. The operations of 2420 may be performed in accordance with examples as disclosed herein. In some examples, aspects of the operations of 2420 may be performed by a reference signal mapping manager 935 as described with reference to FIG. 9.

At 2425, the method may include transmitting an uplink transmission based on the mapping. The operations of 2425 may be performed in accordance with examples as disclosed herein. In some examples, aspects of the operations of 2425 may be performed by an uplink transmission manager 940 as described with reference to FIG. 9.

Figure 25:
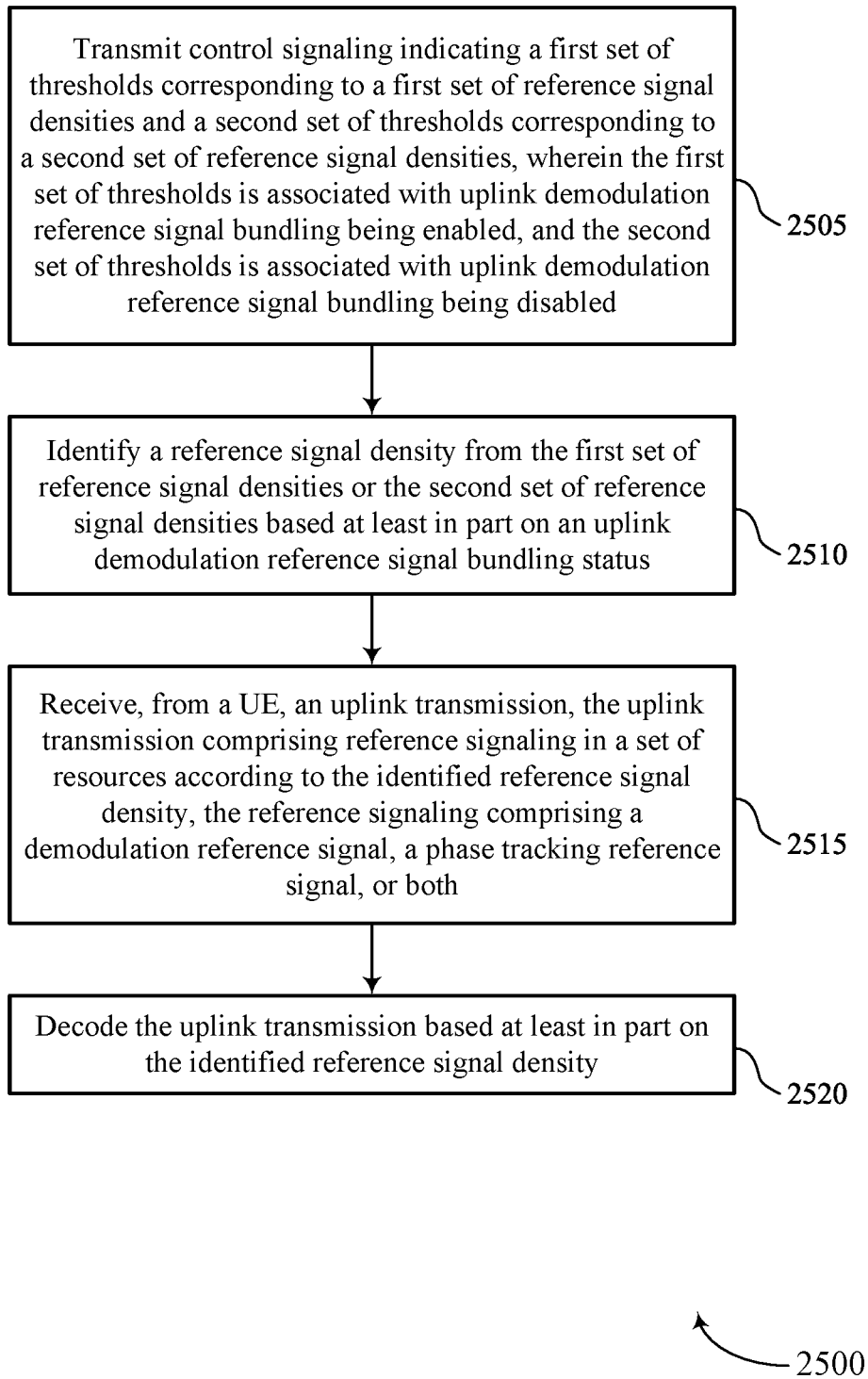

FIG. 25 shows a flowchart illustrating a method 2500 that supports techniques for determining PTRS density in accordance with aspects of the present disclosure. The operations of the method 2500 may be implemented by a base station or its components as described herein. For example, the operations of the method 2500 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 2505, the method may include transmitting control signaling indicating a first set of thresholds corresponding to a first set of reference signal densities and a second set of thresholds corresponding to a second set of reference signal densities, where the first set of thresholds is associated with uplink DMRS bundling being enabled, and the second set of thresholds is associated with uplink DMRS bundling being disabled. The operations of 2505 may be performed in accordance with examples as disclosed herein. In some examples, aspects of the operations of 2505 may be performed by a threshold indication component 1325 as described with reference to FIG. 13.

At 2510, the method may include identifying a reference signal density from the first set of reference signal densities or the second set of reference signal densities based on an uplink DMRS bundling status. The operations of 2510 may be performed in accordance with examples as disclosed herein. In some examples, aspects of the operations of 2510 may be performed by a density identifying component 1330 as described with reference to FIG. 13.

At 2515, the method may include receiving, from a UE, an uplink transmission, the uplink transmission including reference signaling in a set of resources according to the identified reference signal density, the reference signaling including a DMRS, a PTRS, or both. The operations of 2515 may be performed in accordance with examples as disclosed herein. In some examples, aspects of the operations of 2515 may be performed by an uplink transmission reception component 1335 as described with reference to FIG. 13.

At 2520, the method may include decoding the uplink transmission based on the identified reference signal density. The operations of 2520 may be performed in accordance with examples as disclosed herein. In some examples, aspects of the operations of 2520 may be performed by a transmission decoding component 1340 as described with reference to FIG. 13.

Figure 26:
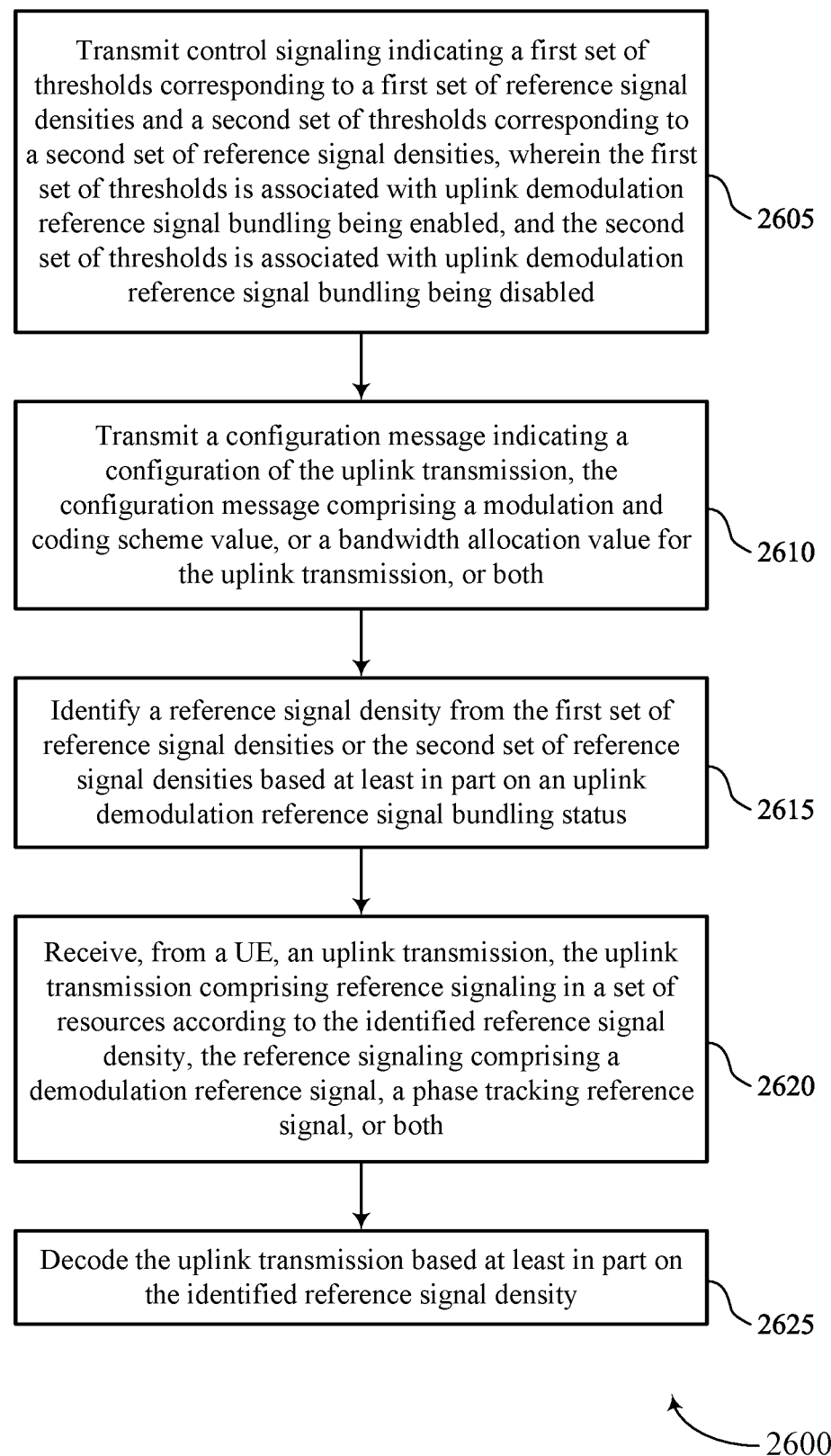

FIG. 26 shows a flowchart illustrating a method 2600 that supports techniques for determining PTRS density in accordance with aspects of the present disclosure. The operations of the method 2600 may be implemented by a base station or its components as described herein. For example, the operations of the method 2600 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 2605, the method may include transmitting control signaling indicating a first set of thresholds corresponding to a first set of reference signal densities and a second set of thresholds corresponding to a second set of reference signal densities, where the first set of thresholds is associated with uplink DMRS bundling being enabled, and the second set of thresholds is associated with uplink DMRS bundling being disabled. The operations of 2605 may be performed in accordance with examples as disclosed herein. In some examples, aspects of the operations of 2605 may be performed by a threshold indication component 1325 as described with reference to FIG. 13.

At 2610, the method may include transmitting a configuration message indicating a configuration of the uplink transmission, the configuration message including a modulation and coding scheme value, or a bandwidth allocation value for the uplink transmission, or both. The operations of 2610 may be performed in accordance with examples as disclosed herein. In some examples, aspects of the operations of 2610 may be performed by an uplink transmission configuration component 1350 as described with reference to FIG. 13.

At 2615, the method may include identifying a reference signal density from the first set of reference signal densities or the second set of reference signal densities based on an uplink DMRS bundling status. The operations of 2615 may be performed in accordance with examples as disclosed herein. In some examples, aspects of the operations of 2615 may be performed by a density identifying component 1330 as described with reference to FIG. 13.

At 2620, the method may include receiving, from a UE, an uplink transmission, the uplink transmission including reference signaling in a set of resources according to the identified reference signal density, the reference signaling including a DMRS, a PTRS, or both. The operations of 2620 may be performed in accordance with examples as disclosed herein. In some examples, aspects of the operations of 2620 may be performed by an uplink transmission reception component 1335 as described with reference to FIG. 13.

At 2625, the method may include decoding the uplink transmission based on the identified reference signal density. The operations of 2625 may be performed in accordance with examples as disclosed herein. In some examples, aspects of the operations of 2625 may be performed by a transmission decoding component 1340 as described with reference to FIG. 13.

Figure 27:
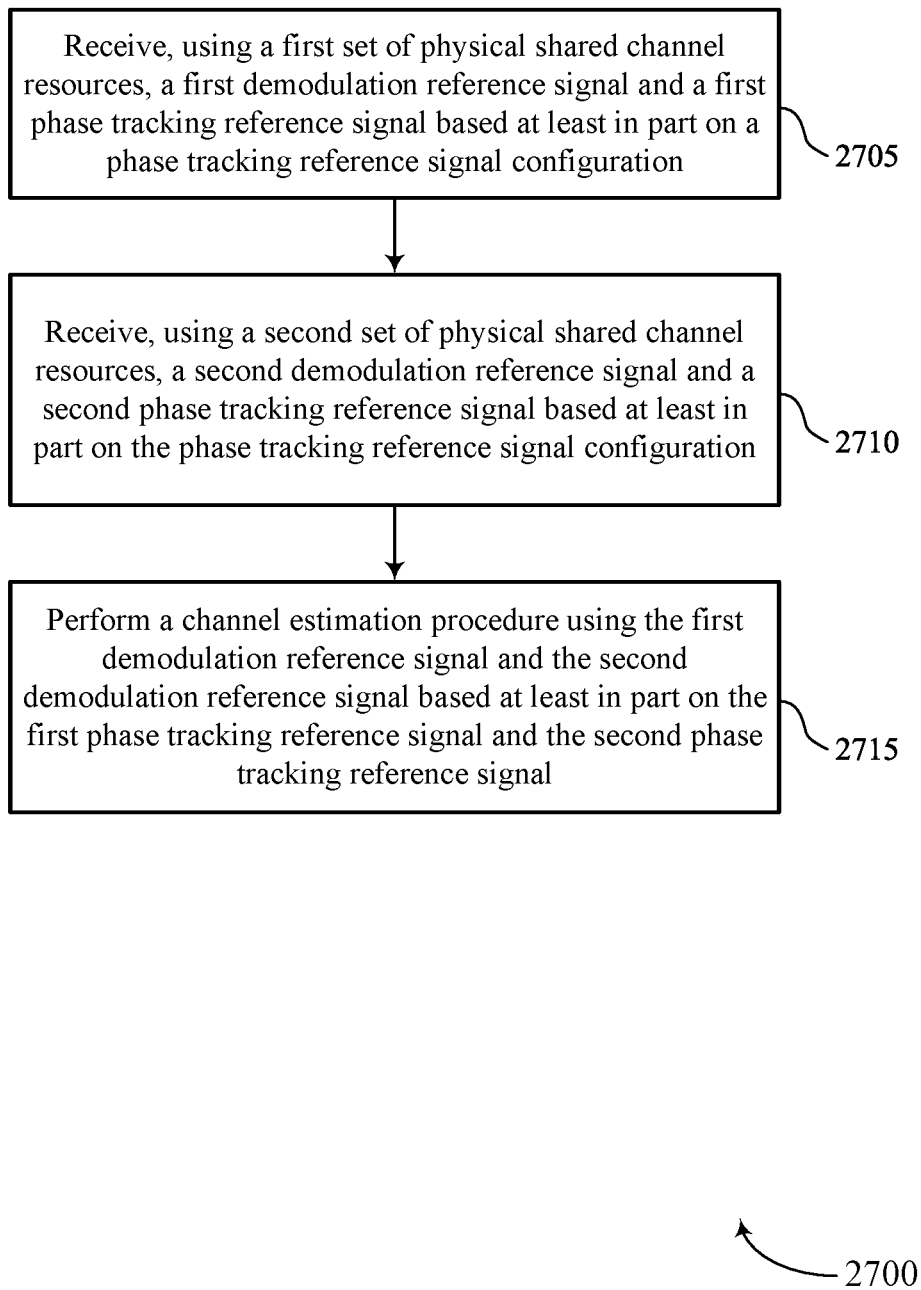

FIG. 27 shows a flowchart illustrating a method 2700 that supports techniques for determining PTRS density in accordance with aspects of the present disclosure. The operations of the method 2700 may be implemented by a base station or its components as described herein. For example, the operations of the method 2700 may be performed by a base station 105 as described with reference to FIGS. 1 through 6 and 15 through 18. In some examples, a base station may execute a set of instructions to control the functional elements of the base station to perform the described functions. Additionally or alternatively, the base station may perform aspects of the described functions using special-purpose hardware.

At 2705, the method may include receiving, using a first set of physical shared channel resources, a first DMRS and a first PTRS based on a PTRS configuration. The operations of 2705 may be performed in accordance with examples as disclosed herein. In some examples, aspects of the operations of 2705 may be performed by a first signal receiver 1625 as described with reference to FIG. 16.

At 2710, the method may include receiving, using a second set of physical shared channel resources, a second DMRS and a second PTRS based on the PTRS configuration. The operations of 2710 may be performed in accordance with examples as disclosed herein. In some examples, aspects of the operations of 2710 may be performed by a second signal receiver 1630 as described with reference to FIG. 16.

At 2715, the method may include performing a channel estimation procedure using the first DMRS and the second DMRS based on the first PTRS and the second PTRS. The operations of 2715 may be performed in accordance with examples as disclosed herein. In some examples, aspects of the operations of 2715 may be performed by an estimation component 1635 as described with reference to FIG. 16.

Figure 28:
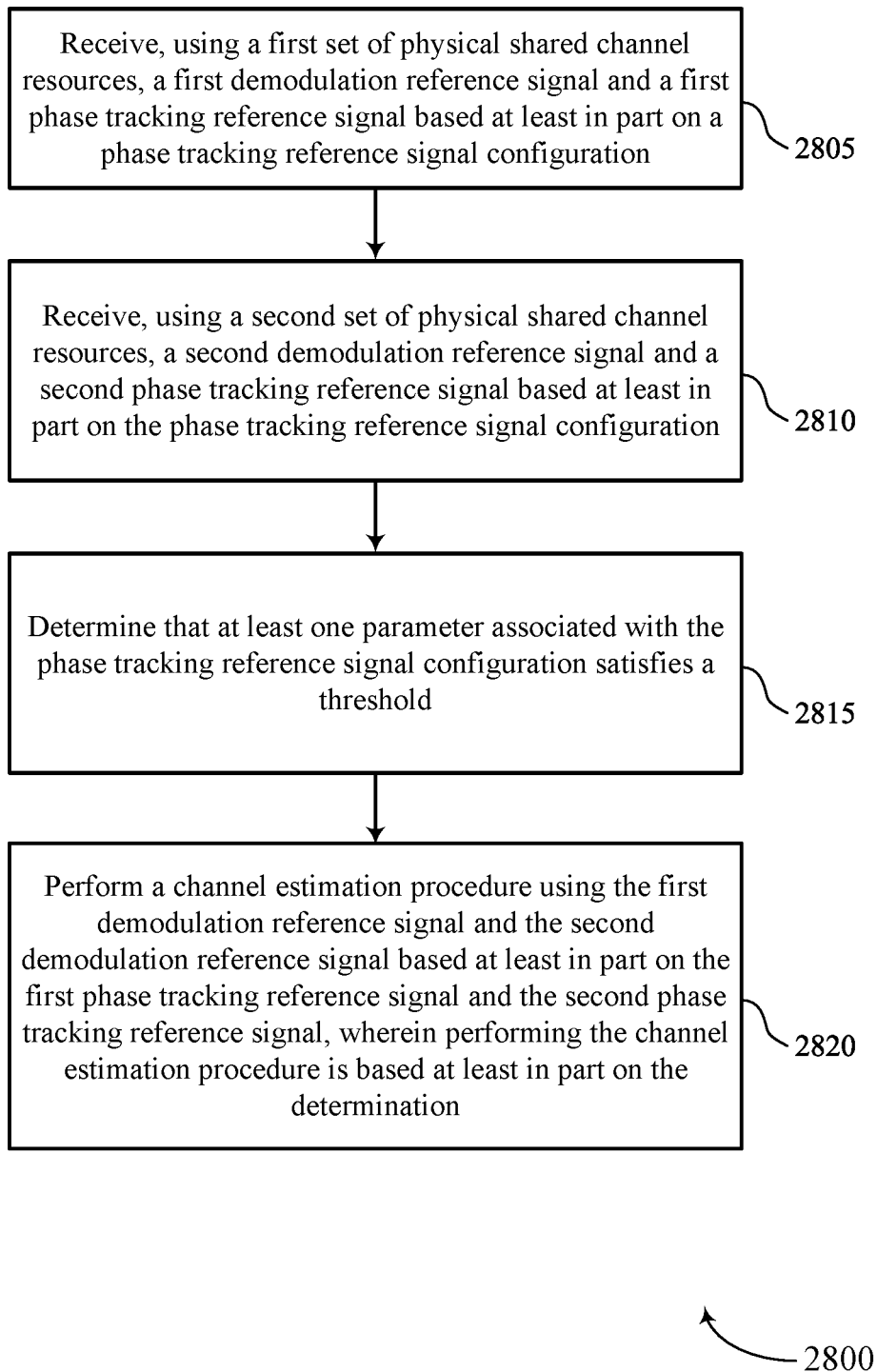

FIG. 28 shows a flowchart illustrating a method 2800 that supports techniques for determining PTRS density in accordance with aspects of the present disclosure. The operations of the method 2800 may be implemented by a base station or its components as described herein. For example, the operations of the method 2800 may be performed by a base station 105 as described with reference to FIGS. 1 through 6 and 15 through 18. In some examples, a base station may execute a set of instructions to control the functional elements of the base station to perform the described functions. Additionally or alternatively, the base station may perform aspects of the described functions using special-purpose hardware.

At 2805, the method may include receiving, using a first set of physical shared channel resources, a first DMRS and a first PTRS based on a PTRS configuration. The operations of 2805 may be performed in accordance with examples as disclosed herein. In some examples, aspects of the operations of 2805 may be performed by a first signal receiver 1625 as described with reference to FIG. 16.

At 2810, the method may include receiving, using a second set of physical shared channel resources, a second DMRS and a second PTRS based on the PTRS configuration. The operations of 2810 may be performed in accordance with examples as disclosed herein. In some examples, aspects of the operations of 2810 may be performed by a second signal receiver 1630 as described with reference to FIG. 16.

At 2815, the method may include determining that at least one parameter associated with the PTRS configuration satisfies a threshold, where performing the channel estimation procedure is based on the determining. The operations of 2815 may be performed in accordance with examples as disclosed herein. In some examples, aspects of the operations of 2815 may be performed by a threshold component 1740 as described with reference to FIG. 17.

At 2820, the method may include performing a channel estimation procedure using the first DMRS and the second DMRS based on the first PTRS and the second PTRS. The operations of 2820 may be performed in accordance with examples as disclosed herein. In some examples, aspects of the operations of 2820 may be performed by an estimation component 1635 as described with reference to FIG. 16.

Figure 29:
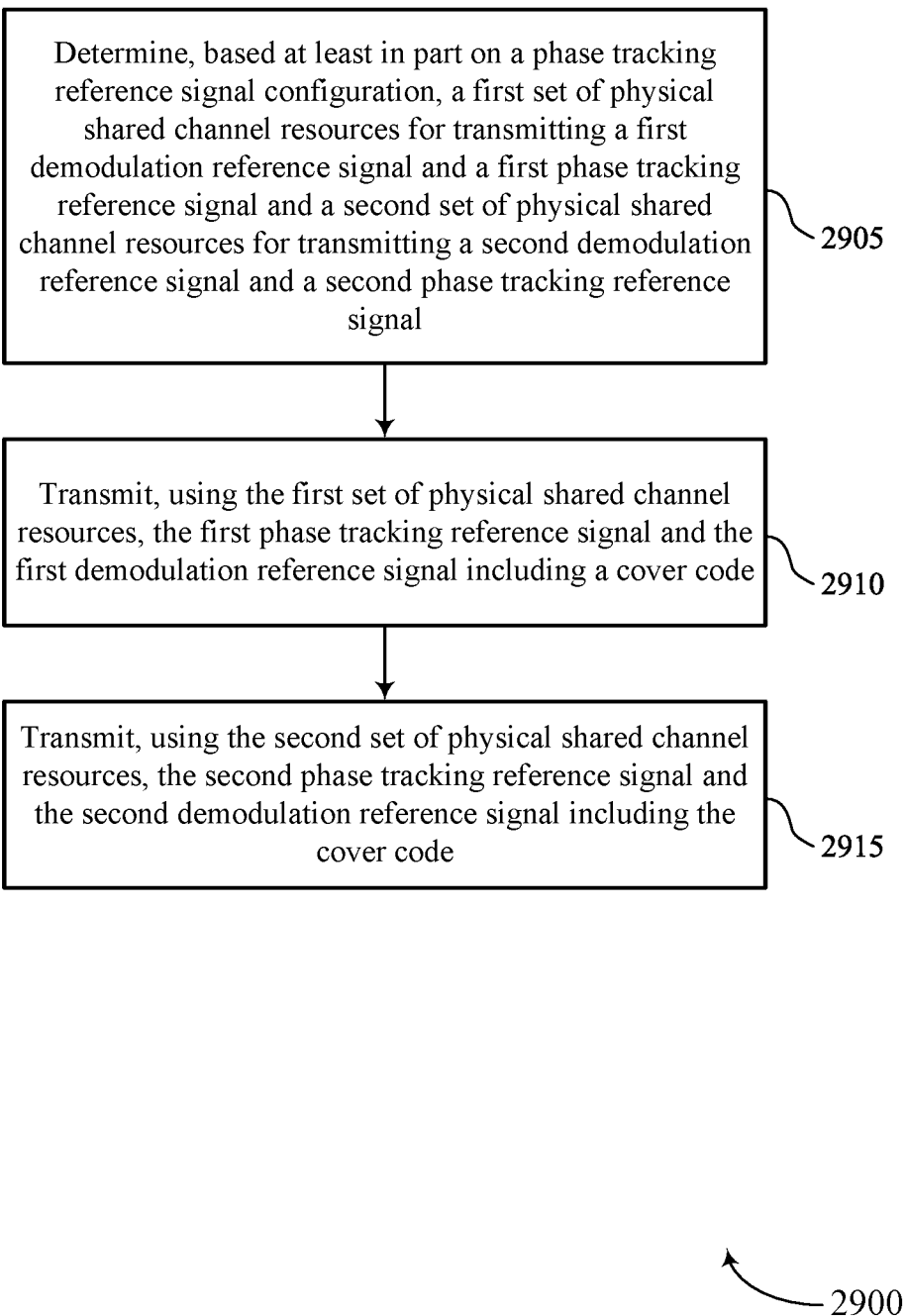

FIG. 29 shows a flowchart illustrating a method 2900 that supports techniques for determining PTRS density in accordance with aspects of the present disclosure. The operations of the method 2900 may be implemented by a UE or its components as described herein. For example, the operations of the method 2900 may be performed by a UE 115 as described with reference to FIGS. 1 through 6 and 19 through 22. In some examples, a UE may execute a set of instructions to control the functional elements of the UE to perform the described functions. Additionally or alternatively, the UE may perform aspects of the described functions using special-purpose hardware.

At 2905, the method may include determining, based on a PTRS configuration, a first set of physical shared channel resources for transmitting a first DMRS and a first PTRS and a second set of physical shared channel resources for transmitting a second DMRS and a second PTRS. The operations of 2905 may be performed in accordance with examples as disclosed herein. In some examples, aspects of the operations of 2905 may be performed by a resource component 2025 as described with reference to FIG. 20.

At 2910, the method may include transmitting, using the first set of physical shared channel resources, the first PTRS and the first DMRS including a cover code. The operations of 2910 may be performed in accordance with examples as disclosed herein. In some examples, aspects of the operations of 2910 may be performed by a first signal transmitter 2030 as described with reference to FIG. 20.

At 2915, the method may include transmitting, using the second set of physical shared channel resources, the second PTRS and the second DMRS including the cover code. The operations of 2915 may be performed in accordance with examples as disclosed herein. In some examples, aspects of the operations of 2915 may be performed by a second signal transmitter 2035 as described with reference to FIG. 20.

Figure 30:
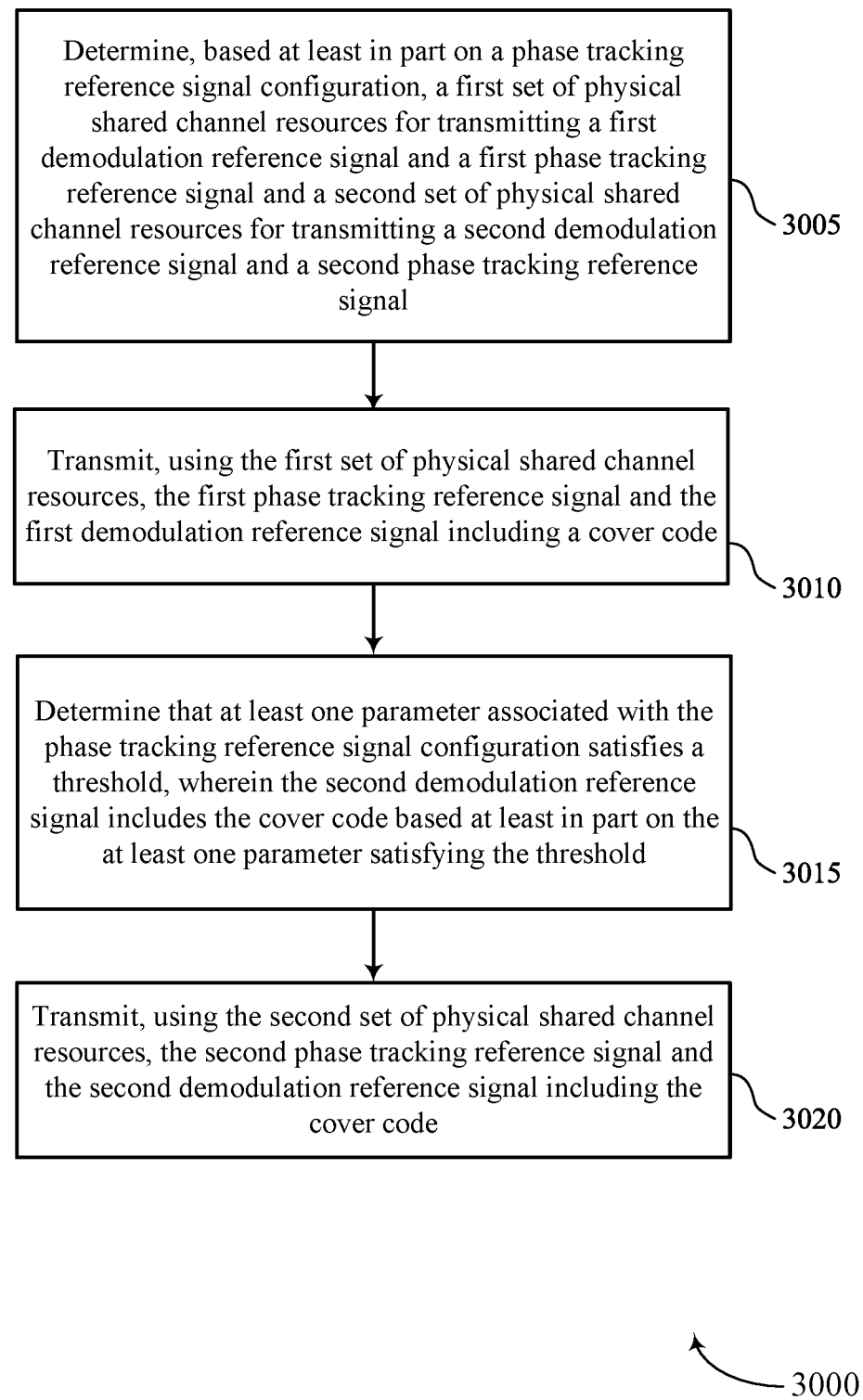

FIG. 30 shows a flowchart illustrating a method 3000 that supports techniques for determining PTRS density in accordance with aspects of the present disclosure. The operations of the method 3000 may be implemented by a UE or its components as described herein. For example, the operations of the method 3000 may be performed by a UE 115 as described with reference to FIGS. 1 through 6 and 19 through 30. In some examples, a UE may execute a set of instructions to control the functional elements of the UE to perform the described functions. Additionally or alternatively, the UE may perform aspects of the described functions using special-purpose hardware.

At 3005, the method may include determining, based on a PTRS configuration, a first set of physical shared channel resources for transmitting a first DMRS and a first PTRS and a second set of physical shared channel resources for transmitting a second DMRS and a second PTRS. The operations of 3005 may be performed in accordance with examples as disclosed herein. In some examples, aspects of the operations of 3005 may be performed by a resource component 2025 as described with reference to FIG. 20.

At 3010, the method may include transmitting, using the first set of physical shared channel resources, the first PTRS and the first DMRS including a cover code. The operations of 3010 may be performed in accordance with examples as disclosed herein. In some examples, aspects of the operations of 3010 may be performed by a first signal transmitter 2030 as described with reference to FIG. 20.

At 3015, the method may include determining that at least one parameter associated with the PTRS configuration satisfies a threshold, where the second DMRS includes the cover code based on the at least one parameter satisfying the threshold. The operations of 3015 may be performed in accordance with examples as disclosed herein. In some examples, aspects of the operations of 3015 may be performed by a threshold manager 2140 as described with reference to FIG. 21.

At 3020, the method may include transmitting, using the second set of physical shared channel resources, the second PTRS and the second DMRS including the cover code. The operations of 3020 may be performed in accordance with examples as disclosed herein. In some examples, aspects of the operations of 3020 may be performed by a second signal transmitter 2035 as described with reference to FIG. 20.

The following provides an overview of aspects of the present disclosure:

Aspect 1: A method for wireless communications at a UE, comprising: receiving control signaling indicating a first set of thresholds corresponding to a first set of reference signal densities and a second set of thresholds corresponding to a second set of reference signal densities, wherein the first set of thresholds is associated with uplink demodulation reference signal bundling being enabled, and the second set of thresholds is associated with uplink demodulation reference signal bundling being disabled; selecting a reference signal density from the first set of reference signal densities or the second set of reference signal densities based at least in part on an uplink demodulation reference signal bundling status; mapping reference signaling to a set of resources based at least in part on the reference signal density, the reference signaling comprising a demodulation reference signal, a phase tracking reference signal, or both; and transmitting an uplink transmission based at least in part on the mapping.

Aspect 2: The method of aspect 1, further comprising: receiving a message indicating that the uplink demodulation reference signal bundling status is enabled; and selecting the reference signal density from the first set of reference signal densities based at least in part on the uplink demodulation reference signal bundling status being enabled.

Aspect 3: The method of aspect 2, wherein receiving the control signaling indicating the first set of thresholds further comprises: receiving an indication of the first set of thresholds, wherein the first set of thresholds comprises a set of modulation and coding scheme thresholds corresponding to a set of phase tracking reference signal time density values.

Aspect 4: The method of aspect 3, further comprising: receiving a configuration message indicating a configuration of the uplink transmission, the configuration message comprising a modulation and coding scheme value; and identifying a modulation and coding scheme threshold from the set of modulation and coding scheme thresholds based at least in part on the modulation and coding scheme value, wherein the reference signal density is based at least in part on a phase tracking reference signal time density value corresponding to the identified modulation and coding scheme threshold.

Aspect 5: The method of any of aspects 2 through 4, wherein receiving the control signaling indicating the first set of thresholds further comprises: receiving an indication of the first set of thresholds, wherein the first set of thresholds comprises a set of bandwidth allocation thresholds corresponding to a set of frequency density values.

Aspect 6: The method of aspect 5, further comprising: receiving a configuration message indicating a configuration of the uplink transmission, the configuration message comprising a bandwidth allocation value for transmitting the uplink transmission; and identifying a bandwidth allocation threshold from the set of bandwidth allocation thresholds based at least in part on the bandwidth allocation value, wherein the reference signal density is based at least in part on a frequency density value corresponding to the bandwidth allocation threshold.

Aspect 7: The method of any of aspects 1 through 6, further comprising: receiving a message indicating that the uplink demodulation reference signal bundling status is disabled; and selecting the reference signal density from the second set of reference signal densities based at least in part on the uplink demodulation reference signal bundling status being disabled.

Aspect 8: The method of any of aspects 1 through 7, wherein the reference signal density corresponds to a phase tracking reference signal density, wherein the method further comprises: identifying a demodulation reference signal density based at least in part on the phase tracking reference signal density.

Aspect 9: The method of any of aspects 1 through 8, wherein receiving the control signaling indicating the first set of thresholds further comprises: receiving a plurality of subsets of reference signal thresholds, each subset of the plurality of subsets associated with a bundling parameter of the uplink transmission; and selecting the reference signal density from a subset of reference signal thresholds based at least in part on the uplink demodulation reference signal bundling status being enabled and the bundling parameter.

Aspect 10: The method of aspect 9, wherein the bundling parameter corresponds to uplink shared channel repetition, uplink control channel repetition, adjacent slot bundling, multi-slot bundling, multi-segment bundling, contiguous bundling, non-contiguous bundling, or a combination thereof.

Aspect 11: The method of any of aspects 1 through 10, further comprising: transmitting an indication of a capability of the UE associated with phase continuity maintenance, wherein the uplink demodulation reference signal bundling status is based at least in part on the capability of the UE.

Aspect 12: The method of any of aspects 1 through 11, wherein the first set of reference signal densities and the second set of reference signal densities comprise phase tracking reference signal densities and the reference signaling comprises phase tracking reference signal signaling.

Aspect 13: The method of any of aspects 1 through 12, wherein the first set of reference signal densities and the second set of reference signal densities comprise demodulation reference signal densities and the reference signaling comprises demodulation reference signal signaling.

Aspect 14: A method for wireless communications at a base station, comprising: transmitting control signaling indicating a first set of thresholds corresponding to a first set of reference signal densities and a second set of thresholds corresponding to a second set of reference signal densities, wherein the first set of thresholds is associated with uplink demodulation reference signal bundling being enabled, and the second set of thresholds is associated with uplink demodulation reference signal bundling being disabled; identifying a reference signal density from the first set of reference signal densities or the second set of reference signal densities based at least in part on an uplink demodulation reference signal bundling status; receiving, from a UE, an uplink transmission, the uplink transmission comprising reference signaling in a set of resources according to the identified reference signal density, the reference signaling comprising a demodulation reference signal, a phase tracking reference signal, or both; and decoding the uplink transmission based at least in part on the identified reference signal density.

Aspect 15: The method of aspect 14, further comprising: transmitting a message indicating that the uplink demodulation reference signal bundling status is enabled; and identifying the reference signal density from the first set of reference signal densities based at least in part on the uplink demodulation reference signal bundling status being enabled.

Aspect 16: The method of any of aspects 14 through 15, further comprising: transmitting a message indicating that the uplink demodulation reference signal bundling status is disabled; and identifying the reference signal density from the second set of reference signal densities based at least in part on the uplink demodulation reference signal bundling status being disabled.

Aspect 17: The method of any of aspects 14 through 16, wherein transmitting the control signaling indicating the first set of thresholds further comprises: transmitting an indication of the first set of thresholds, wherein the first set of thresholds comprises a set of modulation and coding scheme thresholds corresponding to a set of phase tracking reference signal time density values.

Aspect 18: The method of any of aspects 14 through 17, wherein transmitting the control signaling indicating the first set of thresholds further comprises: transmitting an indication of the first set of thresholds, wherein the first set of thresholds comprises a set of bandwidth allocation thresholds corresponding to a set of frequency density values.

Aspect 19: The method of any of aspects 14 through 18, further comprising: transmitting a configuration message indicating a configuration of the uplink transmission, the configuration message comprising a modulation and coding scheme value, or a bandwidth allocation value for the uplink transmission, or both.

Aspect 20: The method of any of aspects 14 through 19, wherein transmitting the control signaling indicating the first set of thresholds further comprises: transmitting a plurality of subsets of reference signal thresholds, each subset of the plurality of subsets associated with a bundling parameter of the uplink transmission; and identifying the reference signal density from a subset of reference signal thresholds based at least in part on the uplink demodulation reference signal bundling status being enabled and the bundling parameter.

Aspect 21: The method of aspect 20, wherein the bundling parameter corresponds to uplink shared channel repetition, uplink control channel repetition, adjacent slot bundling, multi-slot bundling, multi-segment bundling, contiguous bundling, non-contiguous bundling, or a combination thereof.

Aspect 22: The method of any of aspects 14 through 21, further comprising: receiving an indication of a capability of the UE associated with phase continuity maintenance, wherein the uplink demodulation reference signal bundling status is based at least in part on the capability of the UE.

Aspect 23: The method of any of aspects 14 through 22, wherein the first set of reference signal densities and the second set of reference signal densities comprise phase tracking reference signal densities.

Aspect 24: The method of any of aspects 14 through 23, wherein the first set of reference signal densities and the second set of reference signal densities comprise demodulation reference signal densities.

Aspect 25: A method for wireless communication, comprising: receiving, using a first set of physical shared channel resources, a first demodulation reference signal and a first phase tracking reference signal based at least in part on a phase tracking reference signal configuration; receiving, using a second set of physical shared channel resources, a second demodulation reference signal and a second phase tracking reference signal based at least in part on the phase tracking reference signal configuration; and performing a channel estimation procedure using the first demodulation reference signal and the second demodulation reference signal based at least in part on the first phase tracking reference signal and the second phase tracking reference signal.

Aspect 26: The method of aspect 25, further comprising: determining that at least one parameter associated with the phase tracking reference signal configuration satisfies a threshold, wherein performing the channel estimation procedure is based at least in part on the determining.

Aspect 27: The method of aspect 26, wherein the at least one parameter comprises a time density of phase tracking reference signals, or a frequency density of the phase tracking reference signals, or both.

Aspect 28: The method of any of aspects 26 through 27, further comprising: determining a subcarrier spacing associated with the first set of physical shared channel resources, or the second set of physical shared channel resources, or both, wherein the determining that the at least one parameter associated with the phase tracking reference signal configuration satisfies the threshold is based at least in part on the subcarrier spacing.

Aspect 29: The method of any of aspects 26 through 28, further comprising: determining a radio frequency band associated with the first set of physical shared channel resources, or the second set of physical shared channel resources, or both, wherein the determining that the at least one parameter associated with the phase tracking reference signal configuration satisfies the threshold is based at least in part on the radio frequency band.

Aspect 30: The method of any of aspects 25 through 29, further comprising: determining a modulation and coding scheme associated with the first set of physical shared channel resources, or the second set of physical shared channel resources, or both, wherein performing the channel estimation procedure is based at least in part on the modulation and coding scheme.

Aspect 31: The method of any of aspects 25 through 30, further comprising: determining a transmission continuity capability, wherein performing the channel estimation procedure is based at least in part on the transmission continuity capability.

Aspect 32: The method of aspect 31, wherein the transmission continuity capability comprises one or more of a power continuity capability, a power accuracy capability, or a phase continuity capability.

Aspect 33: The method of any of aspects 25 through 32, further comprising: transmitting a request to maintain a transmission continuity based at least in part on a transmission continuity capability and the phase tracking reference signal configuration, wherein receiving the first demodulation reference signal and the second demodulation reference signal is based at least in part on transmitting the request.

Aspect 34: The method of any of aspects 25 through 33, further comprising: determining that a transmission continuity capability does not satisfy a threshold, wherein performing the channel estimation procedure is based at least in part on the determining and the phase tracking reference signal configuration.

Aspect 35: The method of any of aspects 25 through 34, wherein the second set of physical shared channel resources comprises a repetition of the first set of physical shared channel resources.

Aspect 36: The method of any of aspects 25 through 35, wherein performing the channel estimation procedure comprises: performing a joint channel estimation procedure using the first demodulation reference signal and the second demodulation reference signal based at least in part on the first phase tracking reference signal and the second phase tracking reference signal.

Aspect 37: The method of any of aspects 25 through 36, further comprising: receiving the first demodulation reference signal comprises receiving the first demodulation reference signal including a cover code; and receiving the second demodulation reference signal comprises receiving the second demodulation reference signal including the cover code.

Aspect 38: The method of any of aspects 25 through 37, further comprising: transmitting signaling on a third set of physical shared channel resources subsequent to the first set of physical shared channel resources and prior to the second set of physical shared channel resources, wherein performing the channel estimation procedure is based at least in part on the transmitting the signaling and the phase tracking reference signal configuration.

Aspect 39: The method of any of aspects 25 through 38, further comprising: receiving signaling on a third set of physical shared channel resources subsequent to the first set of physical shared channel resources and prior to the second set of physical shared channel resources, wherein performing the channel estimation procedure is based at least in part on the receiving the signaling and the phase tracking reference signal configuration.

Aspect 40: The method of any of aspects 25 through 39, further comprising: communicating signaling based at least in part on performing the channel estimation procedure.

Aspect 41: A method for wireless communication, comprising: determining, based at least in part on a phase tracking reference signal configuration, a first set of physical shared channel resources for transmitting a first demodulation reference signal and a first phase tracking reference signal and a second set of physical shared channel resources for transmitting a second demodulation reference signal and a second phase tracking reference signal; transmitting, using the first set of physical shared channel resources, the first phase tracking reference signal and the first demodulation reference signal including a cover code; and transmitting, using the second set of physical shared channel resources, the second phase tracking reference signal and the second demodulation reference signal including the cover code.

Aspect 42: The method of aspect 41, further comprising: determining that at least one parameter associated with the phase tracking reference signal configuration satisfies a threshold, wherein the second demodulation reference signal includes the cover code based at least in part on the at least one parameter satisfying the threshold.

Aspect 43: The method of aspect 42, wherein the at least one parameter comprises a time density of phase tracking reference signals, or a frequency density of the phase tracking reference signals, or both.

Aspect 44: The method of any of aspects 42 through 43, further comprising: determining a subcarrier spacing associated with the first set of physical shared channel resources, or the second set of physical shared channel resources, or both, wherein the determining that the at least one parameter associated with the phase tracking reference signal configuration satisfies the threshold is based at least in part on the subcarrier spacing.

Aspect 45: The method of any of aspects 42 through 44, further comprising: determining a radio frequency band associated with the first set of physical shared channel resources, or the second set of physical shared channel resources, or both, wherein the determining that the at least one parameter associated with the phase tracking reference signal configuration satisfies the threshold is based at least in part on the radio frequency band.

Aspect 46: The method of any of aspects 41 through 45, further comprising: determining a modulation and coding scheme associated with the first set of physical shared channel resources, or the second set of physical shared channel resources, or both, wherein the second demodulation reference signal includes the cover code based at least in part on the modulation and coding scheme.

Aspect 47: The method of any of aspects 41 through 46, wherein the second set of physical shared channel resources comprises a repetition of the first set of physical shared channel resources.

Aspect 48: The method of any of aspects 41 through 47, further comprising: determining a transmission continuity capability, wherein the phase tracking reference signal configuration is based at least in part on the determining.

Aspect 49: The method of aspect 48, wherein the transmission continuity capability comprises one or more of a power continuity capability, a power accuracy capability, or a phase continuity capability.

Aspect 50: The method of any of aspects 41 through 49, further comprising: receiving a request to maintain a transmission continuity based at least in part on a transmission continuity capability and the phase tracking reference signal configuration, wherein transmitting the first demodulation reference signal and the second demodulation reference signal is based at least in part on receiving the request.

Aspect 51: The method of any of aspects 41 through 50, further comprising: determining that a transmission continuity capability does not satisfy a threshold, wherein the phase tracking reference signal configuration is based at least in part on the determining.

Aspect 52: An apparatus for wireless communications at a UE, comprising at least one processor; memory coupled with the at least one processor; and instructions stored in the memory and executable by the at least one processor to cause the apparatus to perform a method of any of aspects 1 through 13.

Aspect 53: An apparatus for wireless communications at a UE, comprising at least one means for performing a method of any of aspects 1 through 13.

Aspect 54: A non-transitory computer-readable medium storing code for wireless communications at a UE, the code comprising instructions executable by at least one processor to perform a method of any of aspects 1 through 13.

Aspect 55: An apparatus for wireless communications at a base station, comprising at least one processor; memory coupled with the at least one processor; and instructions stored in the memory and executable by the at least one processor to cause the apparatus to perform a method of any of aspects 14 through 24.

Aspect 56: An apparatus for wireless communications at a base station, comprising at least one means for performing a method of any of aspects 14 through 24.

Aspect 57: A non-transitory computer-readable medium storing code for wireless communications at a base station, the code comprising instructions executable by at least one processor to perform a method of any of aspects 14 through 24.

Aspect 58: An apparatus for wireless communication, comprising at least one processor; memory coupled with the at least one processor; and instructions stored in the memory and executable by the at least one processor to cause the apparatus to perform a method of any of aspects 25 through 40.

Aspect 59: An apparatus for wireless communication, comprising at least one means for performing a method of any of aspects 25 through 40.

Aspect 60: A non-transitory computer-readable medium storing code for wireless communication, the code comprising instructions executable by at least one processor to perform a method of any of aspects 25 through 40.

Aspect 61: An apparatus for wireless communication, comprising at least one processor; memory coupled with the at least one processor; and instructions stored in the memory and executable by the at least one processor to cause the apparatus to perform a method of any of aspects 41 through 51.

Aspect 62: An apparatus for wireless communication, comprising at least one means for performing a method of any of aspects 41 through 51.

Aspect 63: A non-transitory computer-readable medium storing code for wireless communication, the code comprising instructions executable by at least one processor to perform a method of any of aspects 41 through 51.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the at least one processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   at least one processor;
   memory coupled with the at least one processor; and
   instructions stored in the memory and executable by the at least one processor to cause the apparatus to:
   receive control signaling indicating a first set of thresholds corresponding to a first set of reference signal densities and a second set of thresholds corresponding to a second set of reference signal densities, wherein the first set of thresholds is associated with uplink demodulation reference signal bundling being enabled, and the second set of thresholds is associated with uplink demodulation reference signal bundling being disabled;
   select a reference signal density from the first set of reference signal densities or the second set of reference signal densities based at least in part on an uplink demodulation reference signal bundling status;
   map reference signaling to a set of resources based at least in part on the reference signal density, the reference signaling comprising a demodulation reference signal, a phase tracking reference signal, or both; and
   transmit an uplink transmission based at least in part on the mapping.

2. The apparatus of claim 1, wherein the instructions are further executable by the at least one processor to cause the apparatus to:
   receive a message indicating that the uplink demodulation reference signal bundling status is enabled; and
   select the reference signal density from the first set of reference signal densities based at least in part on the uplink demodulation reference signal bundling status being enabled.

3. The apparatus of claim 2, wherein the instructions to receive the control signaling indicating the first set of thresholds are further executable by the at least one processor to cause the apparatus to:
   receive an indication of the first set of thresholds, wherein the first set of thresholds comprises a set of modulation and coding scheme thresholds corresponding to a set of phase tracking reference signal time density values.

4. The apparatus of claim 3, wherein the instructions are further executable by the at least one processor to cause the apparatus to:
   receive a configuration message indicating a configuration of the uplink transmission, the configuration message comprising a modulation and coding scheme value; and
   identify a modulation and coding scheme threshold from the set of modulation and coding scheme thresholds based at least in part on the modulation and coding scheme value, wherein the reference signal density is based at least in part on a phase tracking reference signal time density value corresponding to the modulation and coding scheme threshold.

5. The apparatus of claim 2, wherein the instructions to receive the control signaling indicating the first set of thresholds are further executable by the at least one processor to cause the apparatus to:
   receive an indication of the first set of thresholds, wherein the first set of thresholds comprises a set of bandwidth allocation thresholds corresponding to a set of frequency density values.

6. The apparatus of claim 5, wherein the instructions are further executable by the at least one processor to cause the apparatus to:
   receive a configuration message indicating a configuration of the uplink transmission, the configuration message comprising a bandwidth allocation value for transmitting the uplink transmission; and
   identify a bandwidth allocation threshold from the set of bandwidth allocation thresholds based at least in part on the bandwidth allocation value, wherein the reference signal density is based at least in part on a frequency density value corresponding to the bandwidth allocation threshold.

7. The apparatus of claim 1, wherein the instructions are further executable by the at least one processor to cause the apparatus to:
   receive a message indicating that the uplink demodulation reference signal bundling status is disabled; and
   select the reference signal density from the second set of reference signal densities based at least in part on the uplink demodulation reference signal bundling status being disabled.

8. The apparatus of claim 1, wherein the reference signal density corresponds to a phase tracking reference signal density, and the instructions are further executable by the at least one processor to cause the apparatus to:
   identify a demodulation reference signal density based at least in part on the phase tracking reference signal density.

9. The apparatus of claim 1, wherein the instructions to receive the control signaling indicating the first set of thresholds are further executable by the at least one processor to cause the apparatus to:
   receive a plurality of subsets of reference signal thresholds, each subset of the plurality of subsets associated with a bundling parameter of the uplink transmission; and
   select the reference signal density from a subset of reference signal thresholds based at least in part on the uplink demodulation reference signal bundling status being enabled and the bundling parameter.

10. The apparatus of claim 1, wherein the instructions are further executable by the at least one processor to cause the apparatus to:
transmit an indication of a capability of the UE associated with phase continuity maintenance, wherein the uplink demodulation reference signal bundling status is based at least in part on the capability of the UE.

11. The apparatus of claim 1, wherein:
the first set of reference signal densities and the second set of reference signal densities comprise phase tracking reference signal densities, demodulation reference signal densities, or a combination thereof, and
the reference signaling comprises phase tracking reference signal signaling, demodulation reference signal signaling, or a combination thereof.

12. A method for wireless communications at a user equipment (UE), comprising:
receiving control signaling indicating a first set of thresholds corresponding to a first set of reference signal densities and a second set of thresholds corresponding to a second set of reference signal densities, wherein the first set of thresholds is associated with uplink demodulation reference signal bundling being enabled, and the second set of thresholds is associated with uplink demodulation reference signal bundling being disabled;
selecting a reference signal density from the first set of reference signal densities or the second set of reference signal densities based at least in part on an uplink demodulation reference signal bundling status;
mapping reference signaling to a set of resources based at least in part on the reference signal density, the reference signaling comprising a demodulation reference signal, a phase tracking reference signal, or both; and
transmitting an uplink transmission based at least in part on the mapping.

13. The method of claim 12, further comprising:
receiving a message indicating that the uplink demodulation reference signal bundling status is enabled; and
selecting the reference signal density from the first set of reference signal densities based at least in part on the uplink demodulation reference signal bundling status being enabled.

14. The method of claim 13, wherein receiving the control signaling indicating the first set of thresholds further comprises:
receiving an indication of the first set of thresholds, wherein the first set of thresholds comprises a set of modulation and coding scheme thresholds corresponding to a set of phase tracking reference signal time density values.

15. The method of claim 14, further comprising:
receiving a configuration message indicating a configuration of the uplink transmission, the configuration message comprising a modulation and coding scheme value; and
identifying a modulation and coding scheme threshold from the set of modulation and coding scheme thresholds based at least in part on the modulation and coding scheme value, wherein the reference signal density is based at least in part on a phase tracking reference signal time density value corresponding to the modulation and coding scheme threshold.

16. The method of claim 13, wherein receiving the control signaling indicating the first set of thresholds further comprises:
receiving an indication of the first set of thresholds, wherein the first set of thresholds comprises a set of bandwidth allocation thresholds corresponding to a set of frequency density values.

17. The method of claim 16, further comprising:
receiving a configuration message indicating a configuration of the uplink transmission, the configuration message comprising a bandwidth allocation value for transmitting the uplink transmission; and
identifying a bandwidth allocation threshold from the set of bandwidth allocation thresholds based at least in part on the bandwidth allocation value, wherein the reference signal density is based at least in part on a frequency density value corresponding to the bandwidth allocation threshold.

18. The method of claim 12, further comprising:
receive a message indicating that the uplink demodulation reference signal bundling status is disabled; and
select the reference signal density from the second set of reference signal densities based at least in part on the uplink demodulation reference signal bundling status being disabled.

19. The method of claim 12, wherein the reference signal density corresponds to a phase tracking reference signal density, wherein the method further comprises:
identifying a demodulation reference signal density based at least in part on the phase tracking reference signal density.

20. The method of claim 12, wherein receiving the control signaling indicating the first set of thresholds further comprises:
receiving a plurality of subsets of reference signal thresholds, each subset of the plurality of subsets associated with a bundling parameter of the uplink transmission; and
selecting the reference signal density from a subset of reference signal thresholds based at least in part on the uplink demodulation reference signal bundling status being enabled and the bundling parameter.

21. The method of claim 12, further comprising:
transmitting an indication of a capability of the UE associated with phase continuity maintenance, wherein the uplink demodulation reference signal bundling status is based at least in part on the capability of the UE.

22. The method of claim 12, wherein:
the first set of reference signal densities and the second set of reference signal densities comprise phase tracking reference signal densities, demodulation reference signal densities, or a combination thereof, and
the reference signaling comprises phase tracking reference signal signaling, demodulation reference signal signaling, or a combination thereof.

23. A non-transitory computer-readable medium storing code for wireless communications at a user equipment (UE), the code comprising instructions executable by one or more processors to:
receive control signaling indicating a first set of thresholds corresponding to a first set of reference signal densities and a second set of thresholds corresponding to a second set of reference signal densities, wherein the first set of thresholds is associated with uplink demodulation reference signal bundling being enabled, and the second set of thresholds is associated with uplink demodulation reference signal bundling being disabled;
select a reference signal density from the first set of reference signal densities or the second set of reference signal densities based at least in part on an uplink demodulation reference signal bundling status;

map reference signaling to a set of resources based at least in part on the reference signal density, the reference signaling comprising a demodulation reference signal, a phase tracking reference signal, or both; and transmit an uplink transmission based at least in part on the mapping.

24. The non-transitory computer-readable medium of claim 23, wherein the instructions are further executable by the one or more processors to:

receive a message indicating that the uplink demodulation reference signal bundling status is enabled; and select the reference signal density from the first set of reference signal densities based at least in part on the uplink demodulation reference signal bundling status being enabled.

25. The non-transitory computer-readable medium of claim 24, wherein the instructions to receive the control signaling indicating the first set of thresholds are further executable by the one or more processors to:

receive an indication of the first set of thresholds, wherein the first set of thresholds comprises a set of modulation and coding scheme thresholds corresponding to a set of phase tracking reference signal time density values.

26. The non-transitory computer-readable medium of claim 25, wherein the instructions are further executable by the one or more processors to:

receive a configuration message indicating a configuration of the uplink transmission, the configuration message comprising a modulation and coding scheme value; and identify a modulation and coding scheme threshold from the set of modulation and coding scheme thresholds based at least in part on the modulation and coding scheme value, wherein the reference signal density is based at least in part on a phase tracking reference signal time density value corresponding to the modulation and coding scheme threshold.

27. The non-transitory computer-readable medium of claim 24, wherein the instructions to receive the control signaling indicating the first set of thresholds are further executable by the one or more processors to:

receive an indication of the first set of thresholds, wherein the first set of thresholds comprises a set of bandwidth allocation thresholds corresponding to a set of frequency density values.

28. The non-transitory computer-readable medium of claim 27, wherein the instructions are further executable by the one or more processors to:

receive a configuration message indicating a configuration of the uplink transmission, the configuration message comprising a bandwidth allocation value for transmitting the uplink transmission; and identify a bandwidth allocation threshold from the set of bandwidth allocation thresholds based at least in part on the bandwidth allocation value, wherein the reference signal density is based at least in part on a frequency density value corresponding to the bandwidth allocation threshold.

29. The non-transitory computer-readable medium of claim 23, wherein the instructions are further executable by the one or more processors to:

receive a message indicating that the uplink demodulation reference signal bundling status is disabled; and select the reference signal density from the second set of reference signal densities based at least in part on the uplink demodulation reference signal bundling status being disabled.

30. An apparatus for wireless communications at a user equipment (UE), comprising:

means for receiving control signaling indicating a first set of thresholds corresponding to a first set of reference signal densities and a second set of thresholds corresponding to a second set of reference signal densities, wherein the first set of thresholds is associated with uplink demodulation reference signal bundling being enabled, and the second set of thresholds is associated with uplink demodulation reference signal bundling being disabled;

means for selecting a reference signal density from the first set of reference signal densities or the second set of reference signal densities based at least in part on an uplink demodulation reference signal bundling status;

means for mapping reference signaling to a set of resources based at least in part on the reference signal density, the reference signaling comprising a demodulation reference signal, a phase tracking reference signal, or both; and means for transmitting an uplink transmission based at least in part on the mapping.

* * * * *